United States Patent
Saeki et al.

(10) Patent No.: US 10,075,208 B2
(45) Date of Patent: Sep. 11, 2018

(54) TRANSMITTER AND COMMUNICATION SYSTEM

(71) Applicant: Sony Corporation, Tokyo (JP)

(72) Inventors: Takanori Saeki, Kanagawa (JP); Hironobu Konishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/313,024

(22) PCT Filed: May 7, 2015

(86) PCT No.: PCT/JP2015/002329
§ 371 (c)(1),
(2) Date: Nov. 21, 2016

(87) PCT Pub. No.: WO2015/194089
PCT Pub. Date: Dec. 23, 2015

(65) Prior Publication Data
US 2017/0187413 A1    Jun. 29, 2017

(30) Foreign Application Priority Data

Jun. 20, 2014 (JP) ................ 2014-127246

(51) Int. Cl.
*H03B 1/00* (2006.01)
*H03K 3/00* (2006.01)
*H04B 1/40* (2015.01)
*H04N 5/232* (2006.01)
*H04N 5/374* (2011.01)

(52) U.S. Cl.
CPC ........... *H04B 1/40* (2013.01); *H04N 5/23241* (2013.01); *H04N 5/374* (2013.01)

(58) Field of Classification Search
CPC ... H04B 1/40; H04N 5/23241; H04L 25/0272
USPC .................................................. 327/109–110
See application file for complete search history.

(56) References Cited

U.S. PATENT DOCUMENTS

| | | |
|---|---|---|
| 2008/0304578 A1 | 12/2008 | Matsubara et al. |
| 2010/0027706 A1 | 2/2010 | Tanimoto et al. |
| 2013/0241759 A1 | 9/2013 | Wiley et al. |

FOREIGN PATENT DOCUMENTS

| | | |
|---|---|---|
| JP | 2008-011559 A | 1/2008 |
| JP | 2010-520715 A | 6/2010 |
| JP | 2011-517159 A | 5/2011 |
| WO | WO-2014/005117 A1 | 1/2014 |

OTHER PUBLICATIONS

Japanese Office Action dated Nov. 21, 2017 for corresponding Japanese Application No. 2014-127246.

*Primary Examiner* — Lincoln Donovan
*Assistant Examiner* — Metasebia Retebo
(74) *Attorney, Agent, or Firm* — Michael Best & Friedrich LLP

(57) ABSTRACT

A three-phase transmitter that sets voltages of first, second, and third output terminals based on first, second, and third signals. The transmitter includes a first transmitting section configured to set the voltage of the first output terminal based on the first and third signals; a second transmitting section configured to set the voltage of the second output terminal based on the first and second signals; and a third transmitting section configured to set the voltage of the third output terminal based on the second and third signals.

20 Claims, 51 Drawing Sheets

[ FIG. 1 ]
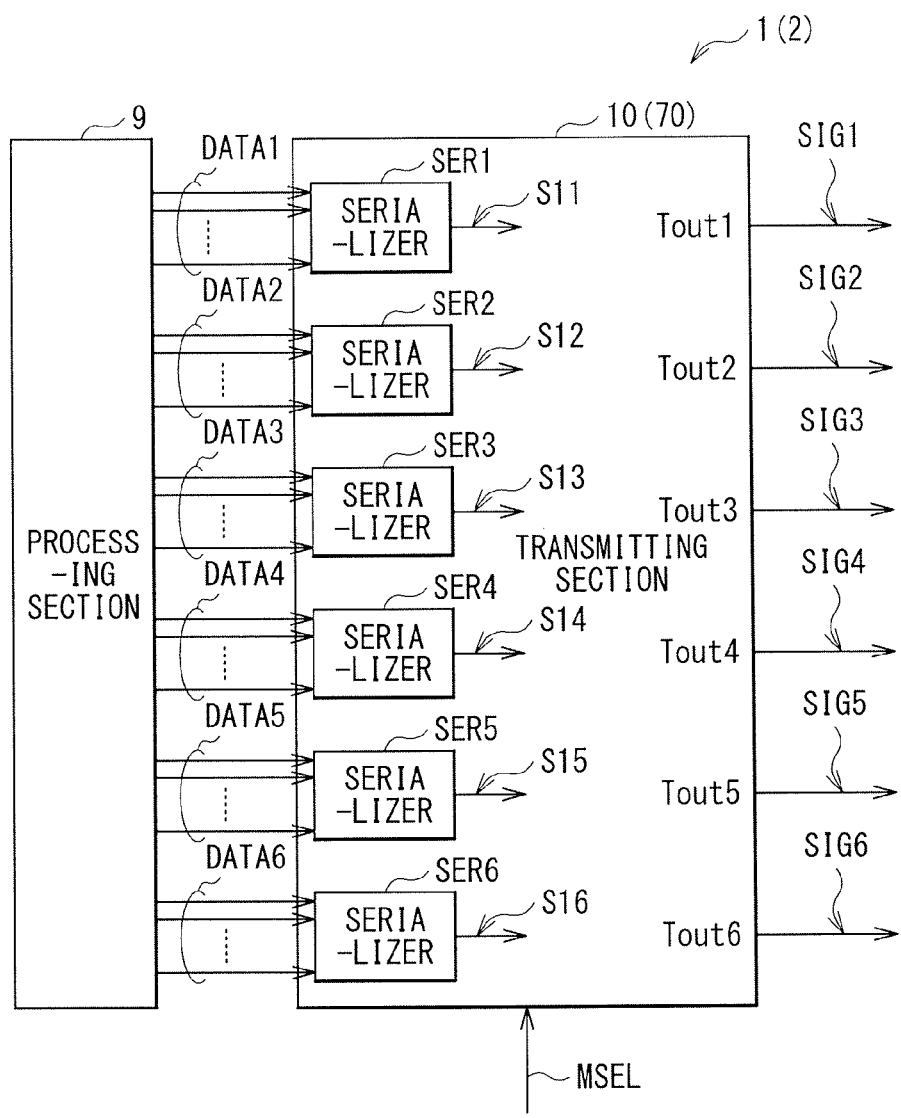

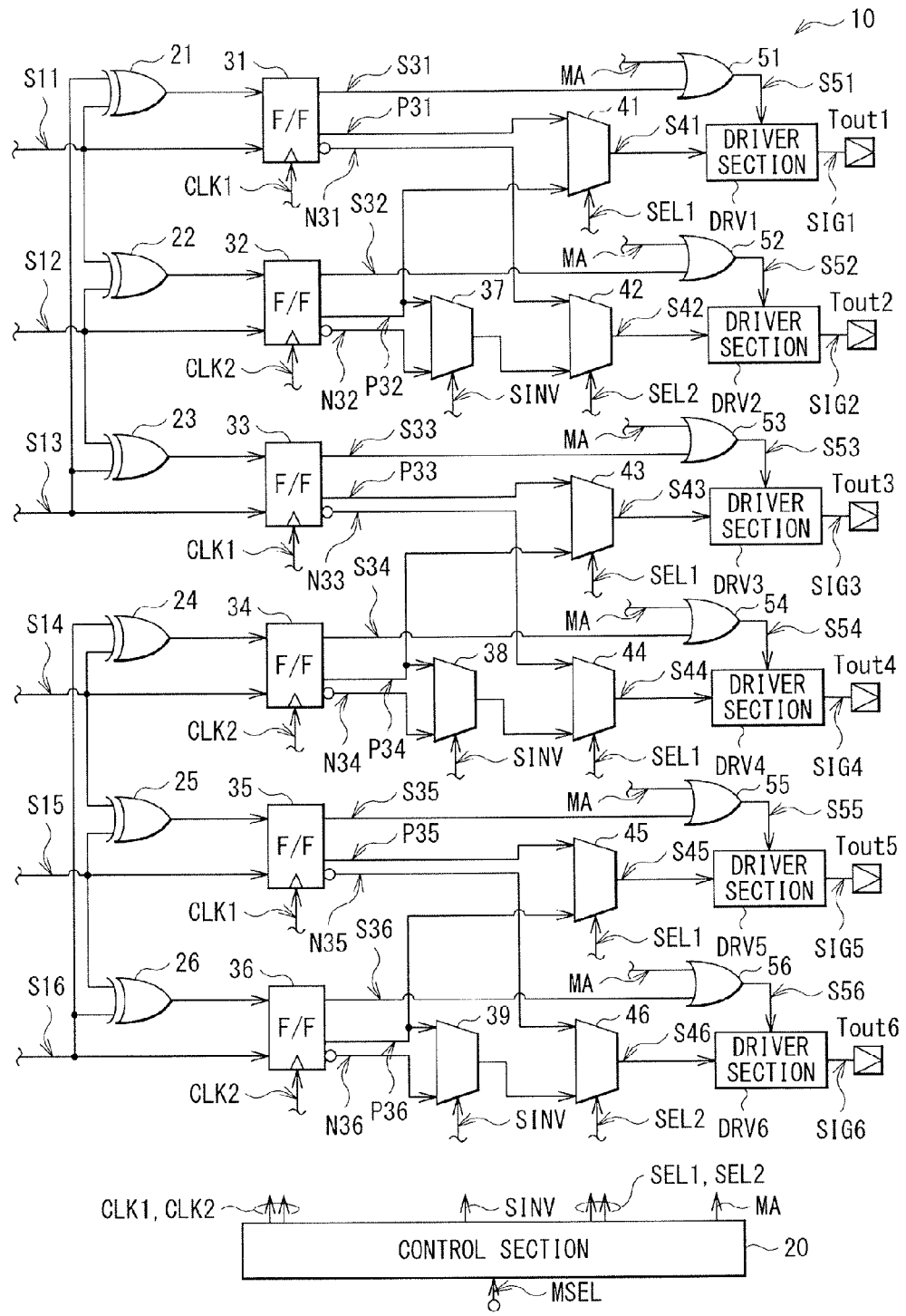
[FIG. 2]

[ FIG. 3 ]
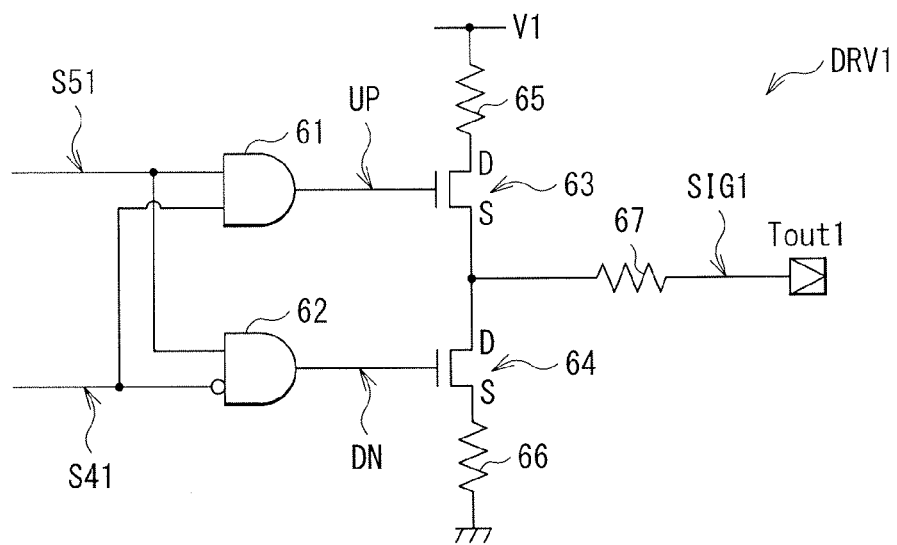

[FIG. 4]
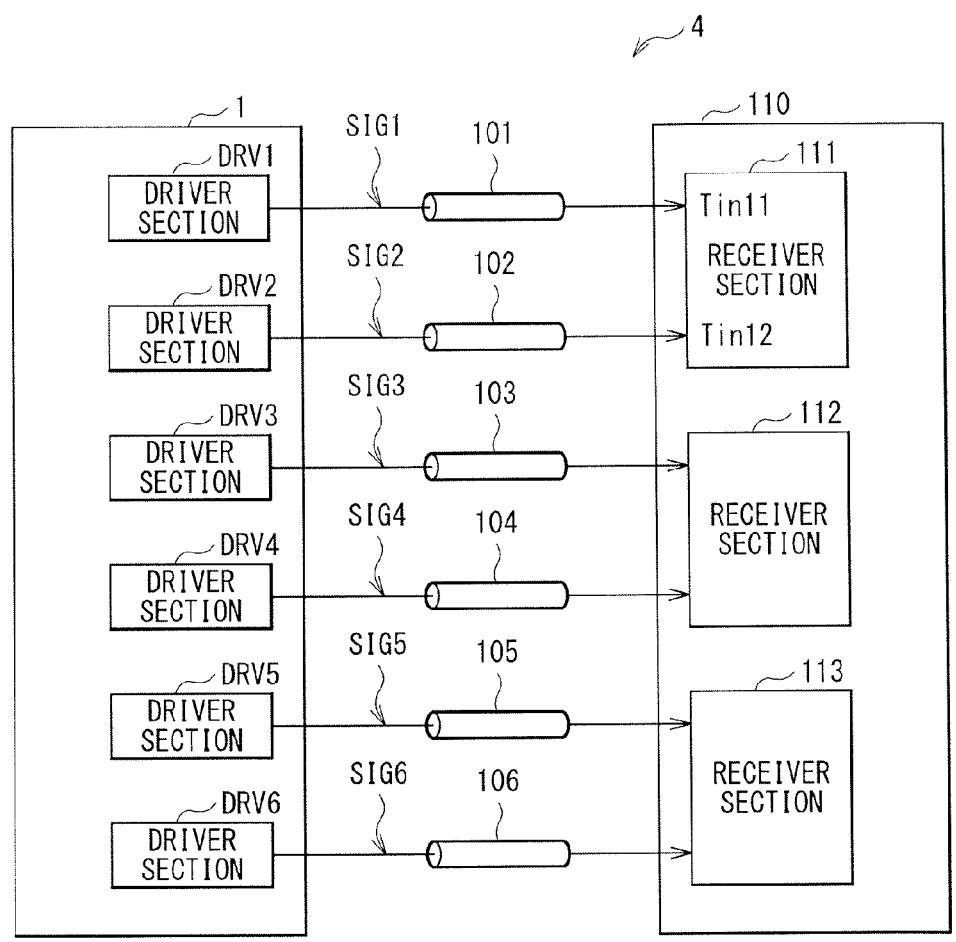
[FIG. 5]
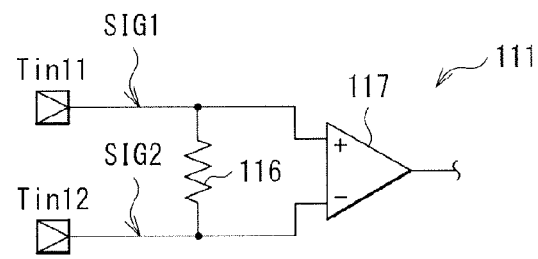

[ FIG. 6 ]
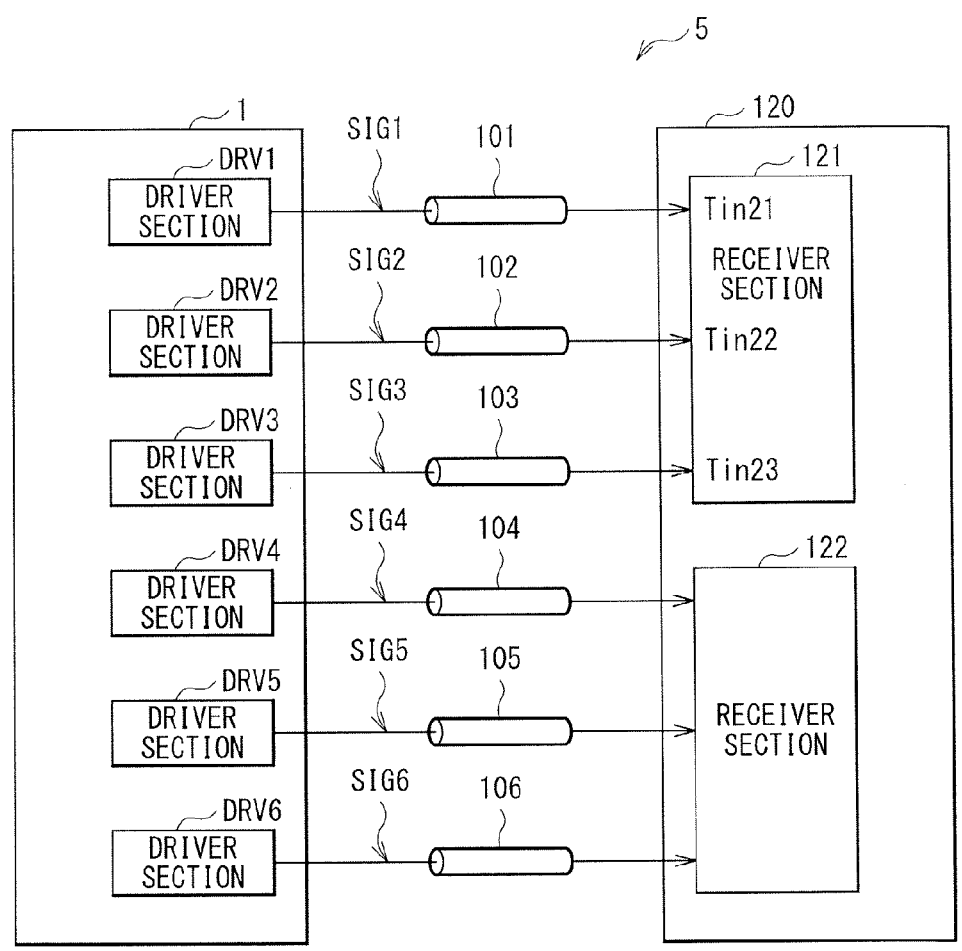

[ FIG. 7 ]
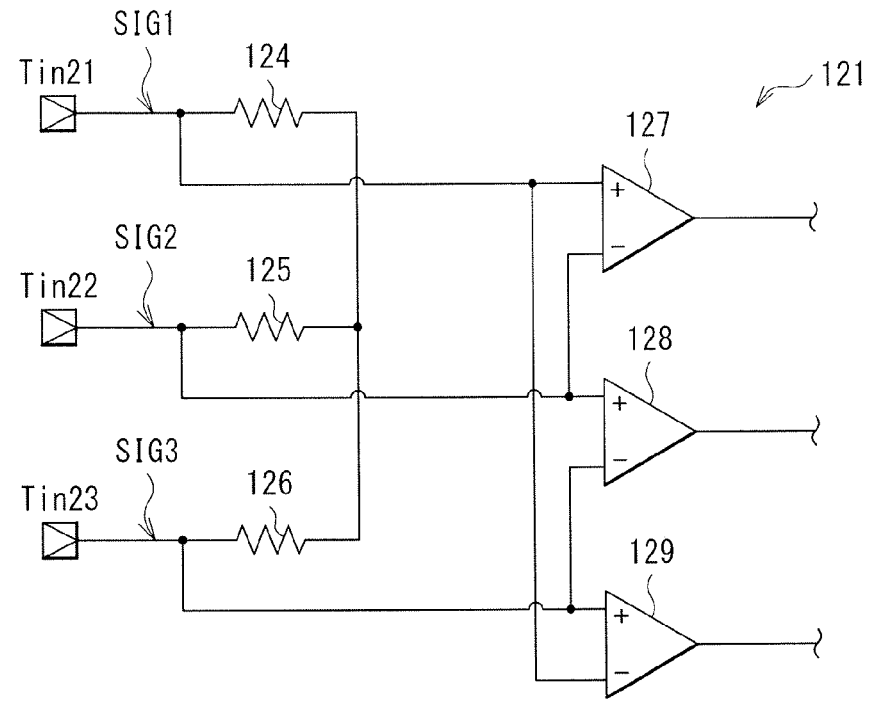
[ FIG. 8 ]
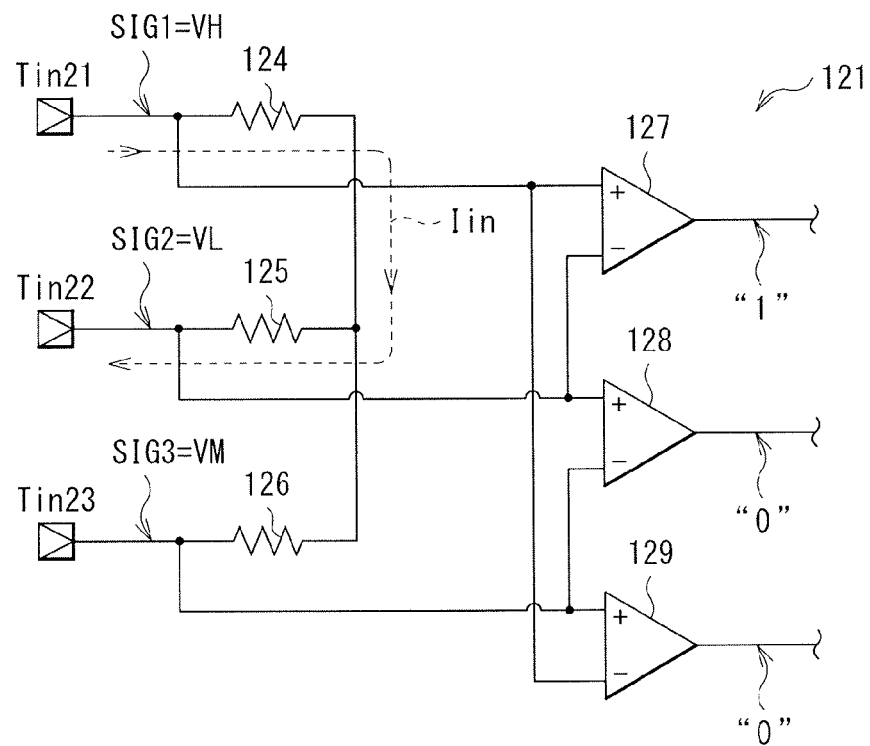

[ FIG. 9 ]
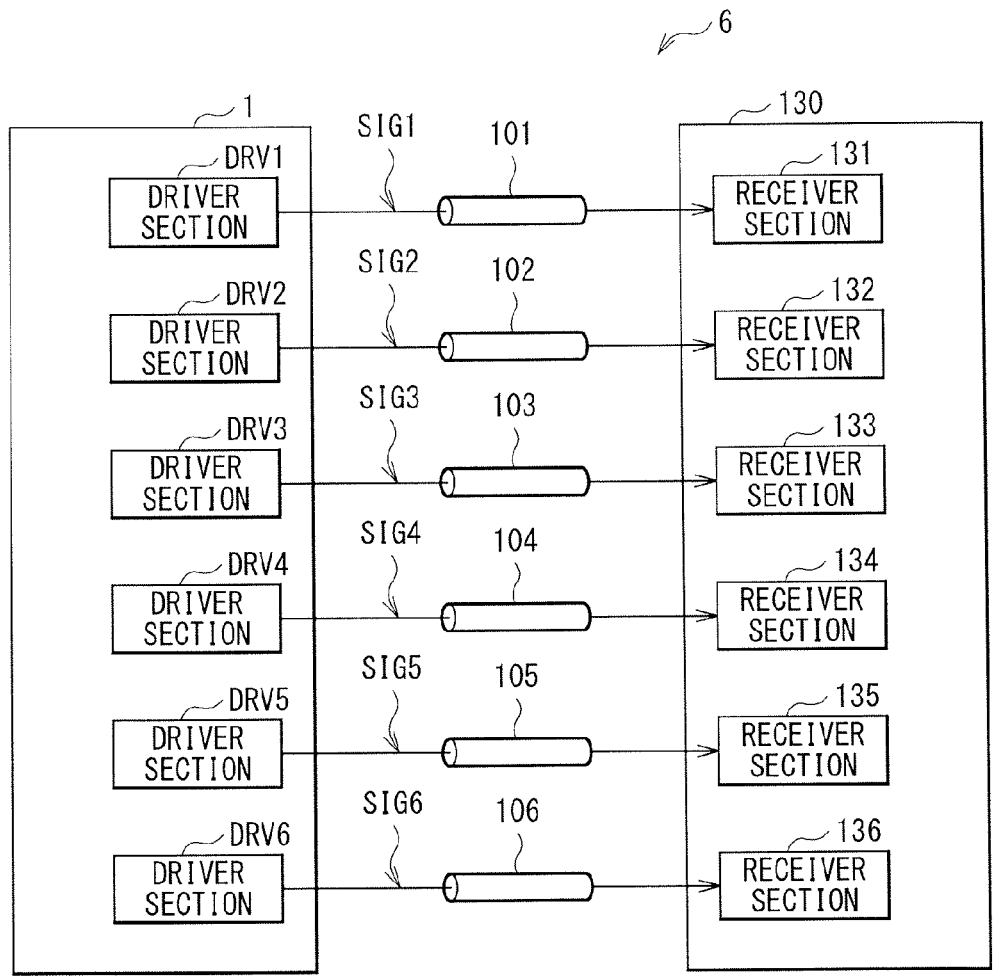
[ FIG. 10 ]
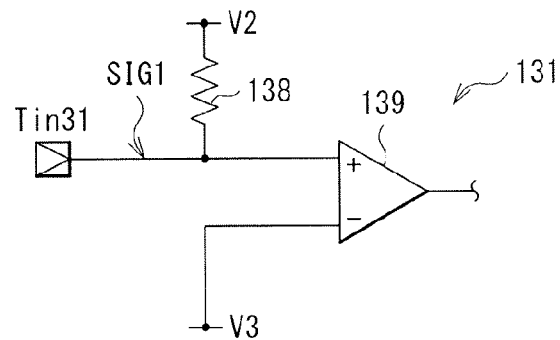

[FIG. 11]
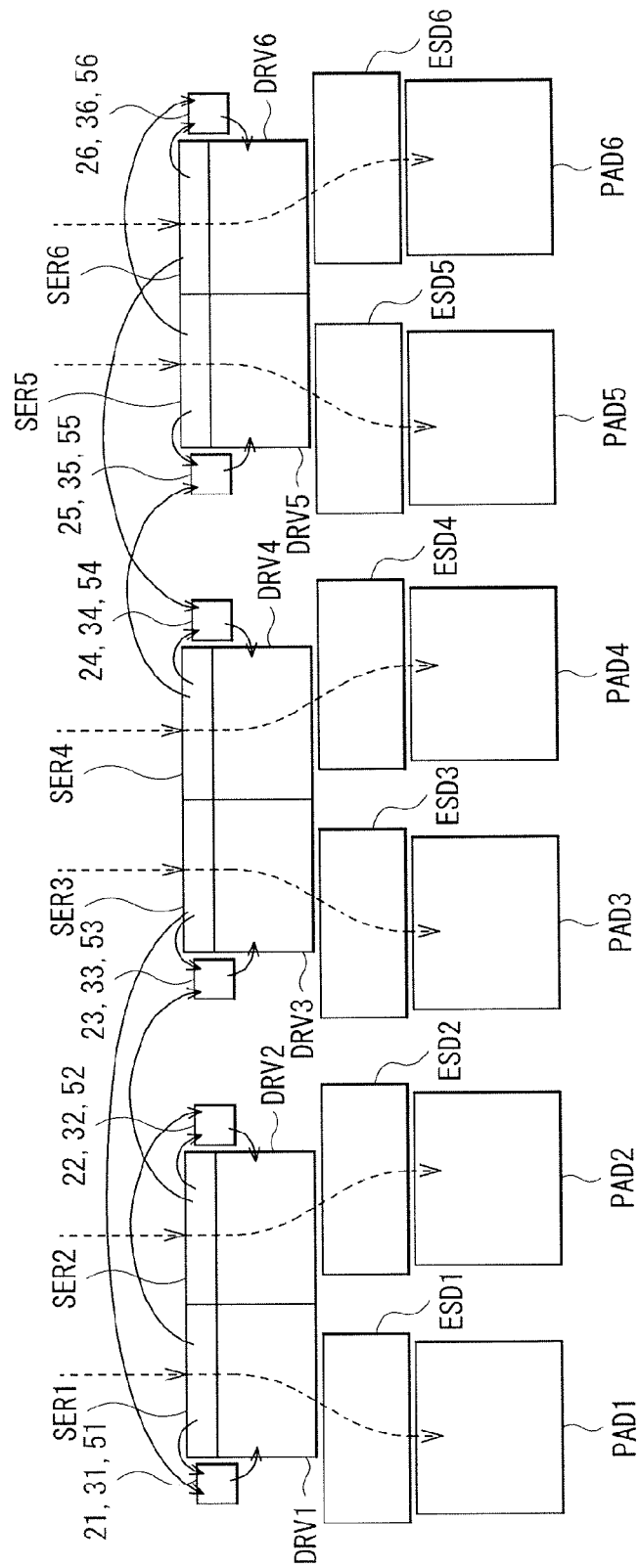

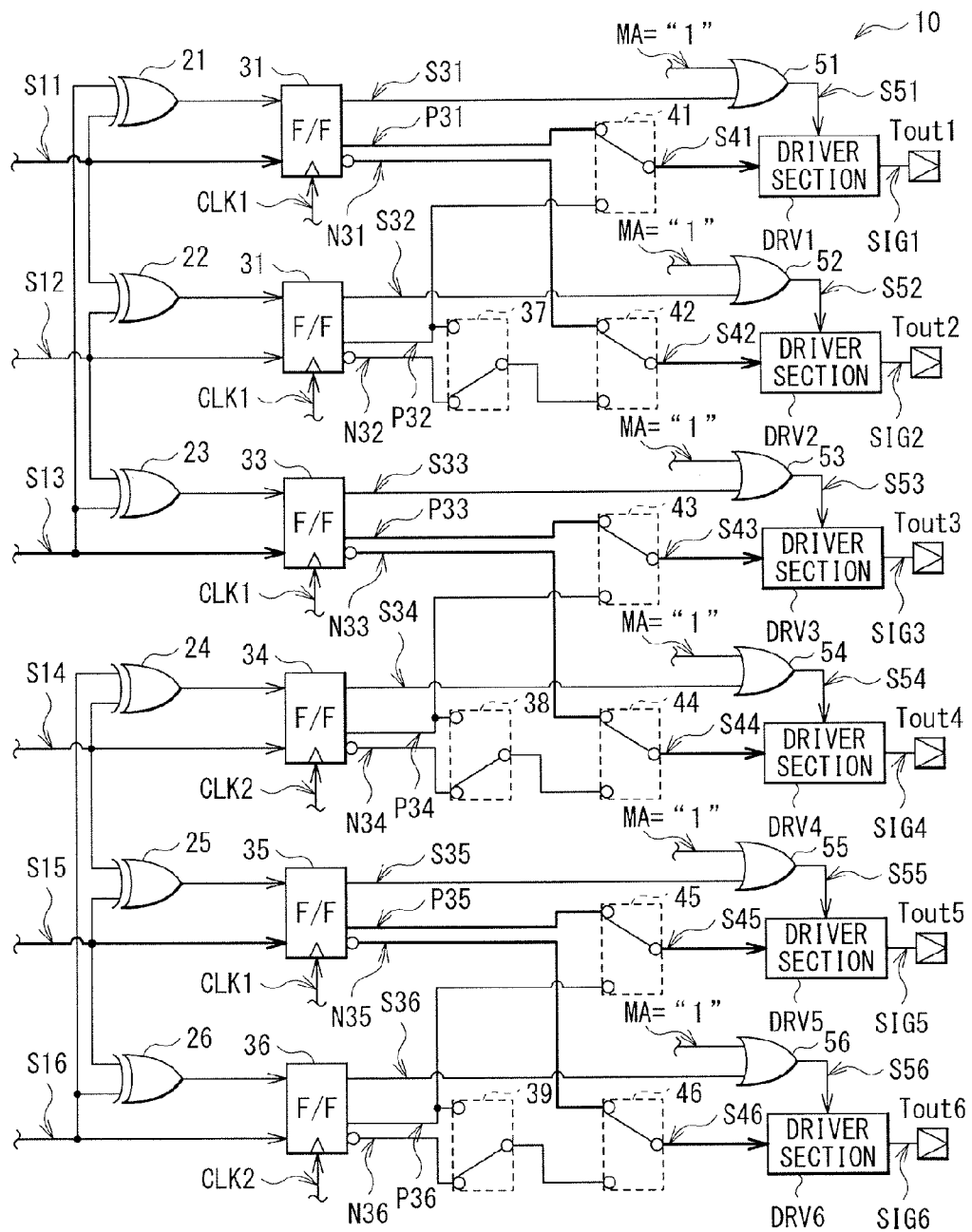
[ FIG. 12A ]

[ FIG. 12B ]
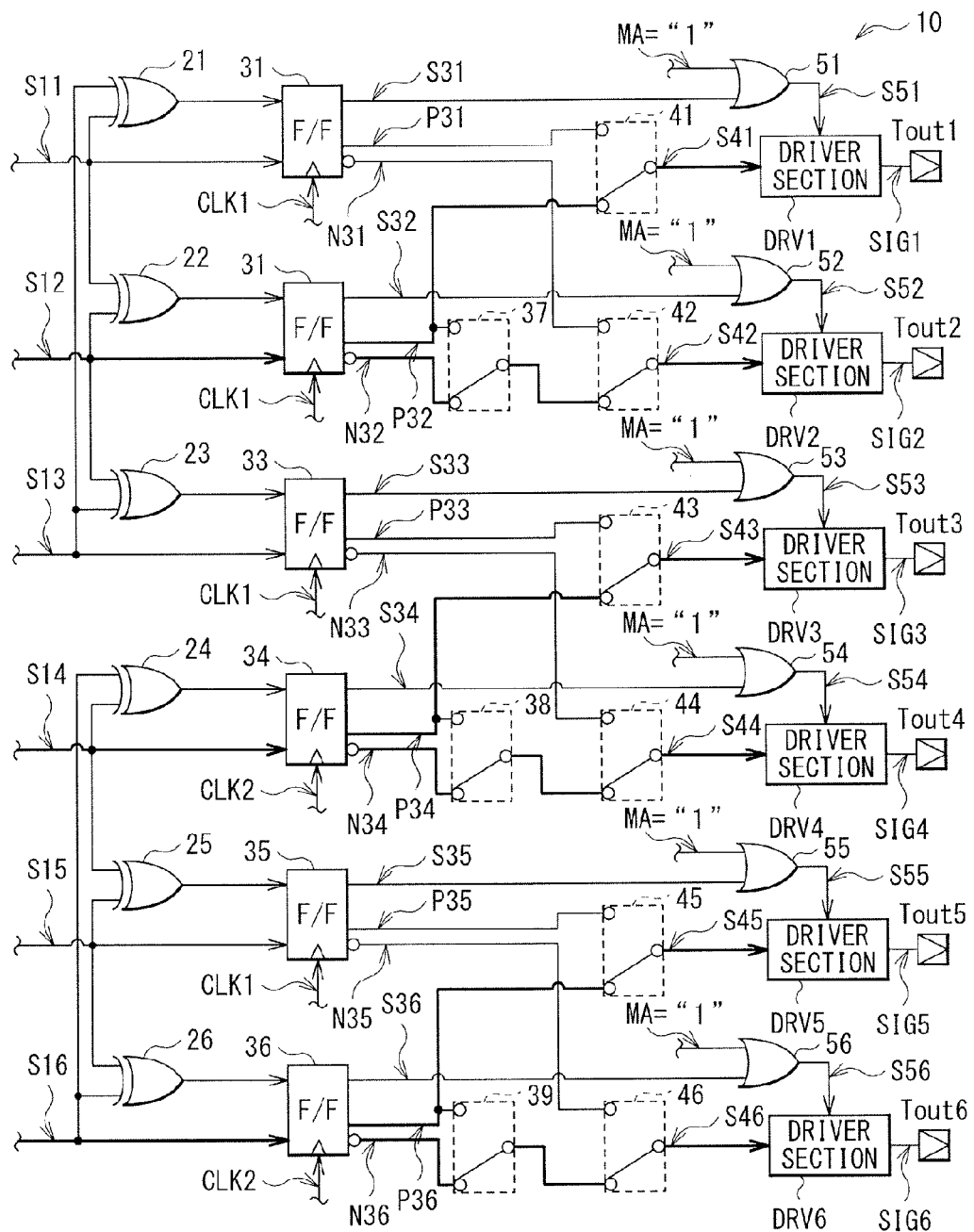

[ FIG. 13 ]
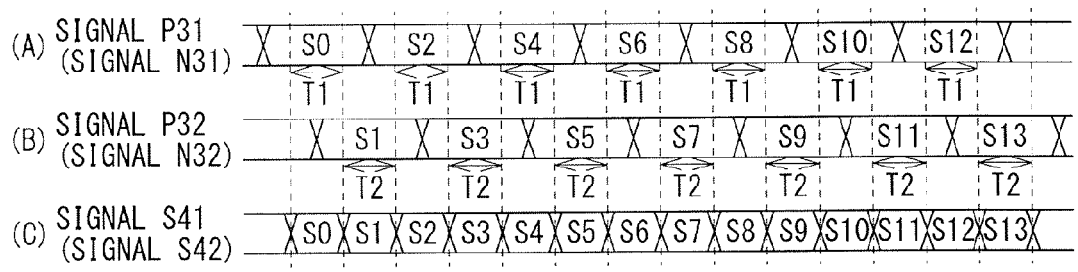

[FIG. 14]
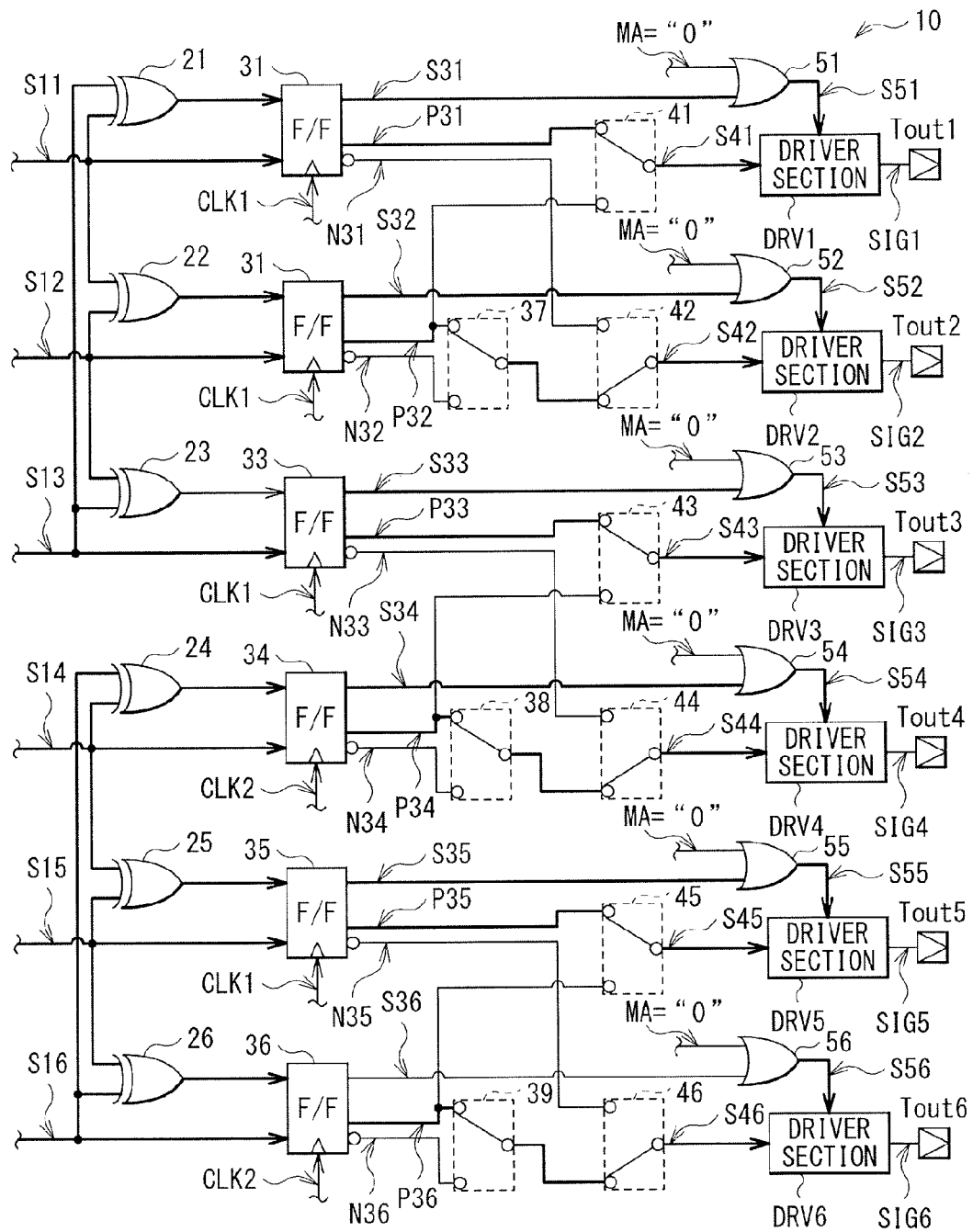

[ FIG. 15 ]

| SIGNAL S11 | SIGNAL S12 | SIGNAL S13 | SIGNAL S51 | SIGNAL S52 | SIGNAL S53 | SIGNAL SIG1 | SIGNAL SIG2 | SIGNAL SIG3 |
|---|---|---|---|---|---|---|---|---|
| 1 | 0 | 0 | 1 | 1 | 0 | VH | VL | VM |
| 0 | 1 | 1 | 1 | 1 | 0 | VL | VH | VM |
| 0 | 1 | 0 | 0 | 1 | 1 | VM | VH | VL |
| 1 | 0 | 1 | 0 | 1 | 1 | VM | VL | VH |
| 0 | 0 | 1 | 1 | 0 | 1 | VL | VM | VH |
| 1 | 1 | 0 | 1 | 0 | 1 | VH | VM | VL |

[ FIG. 16 ]
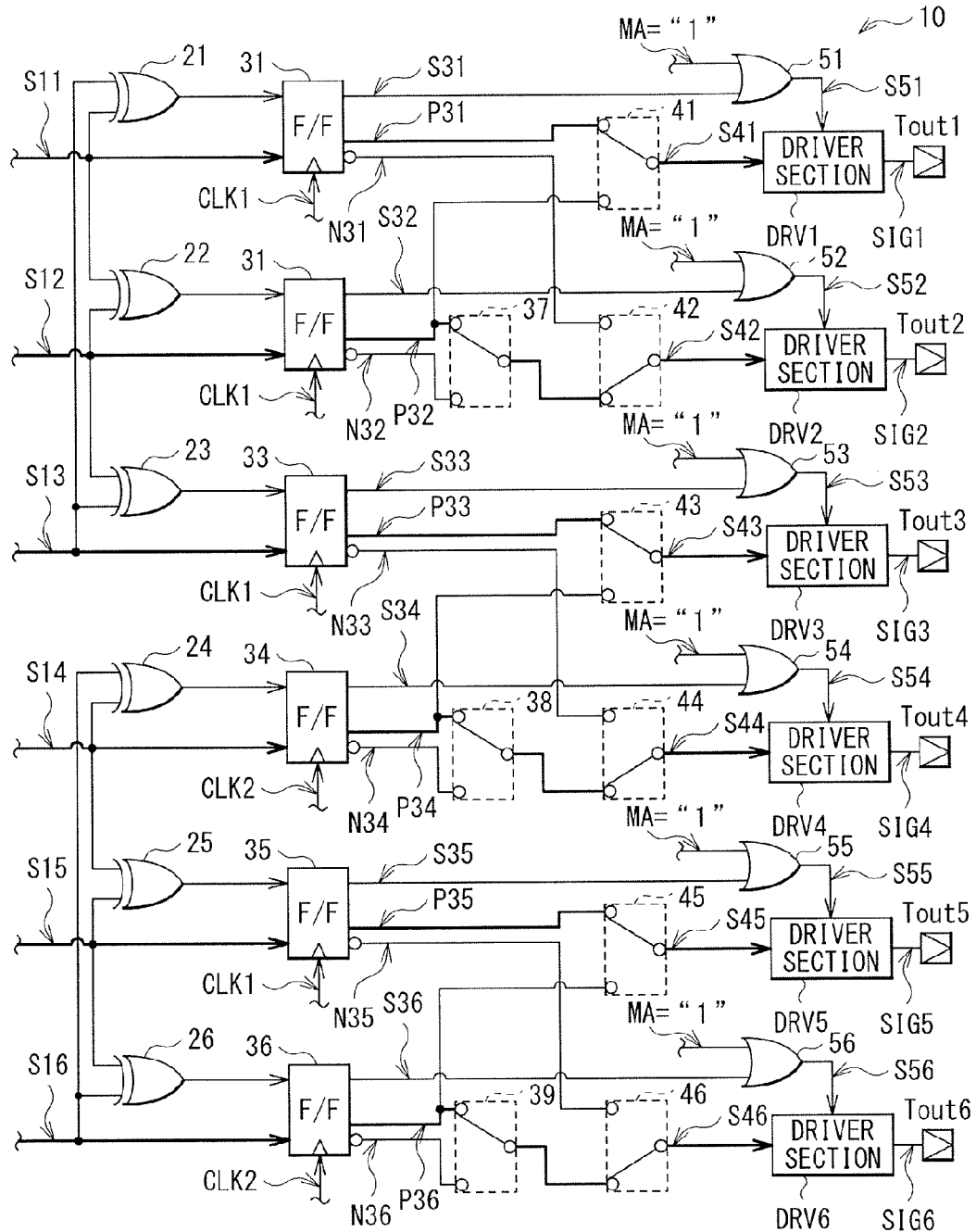

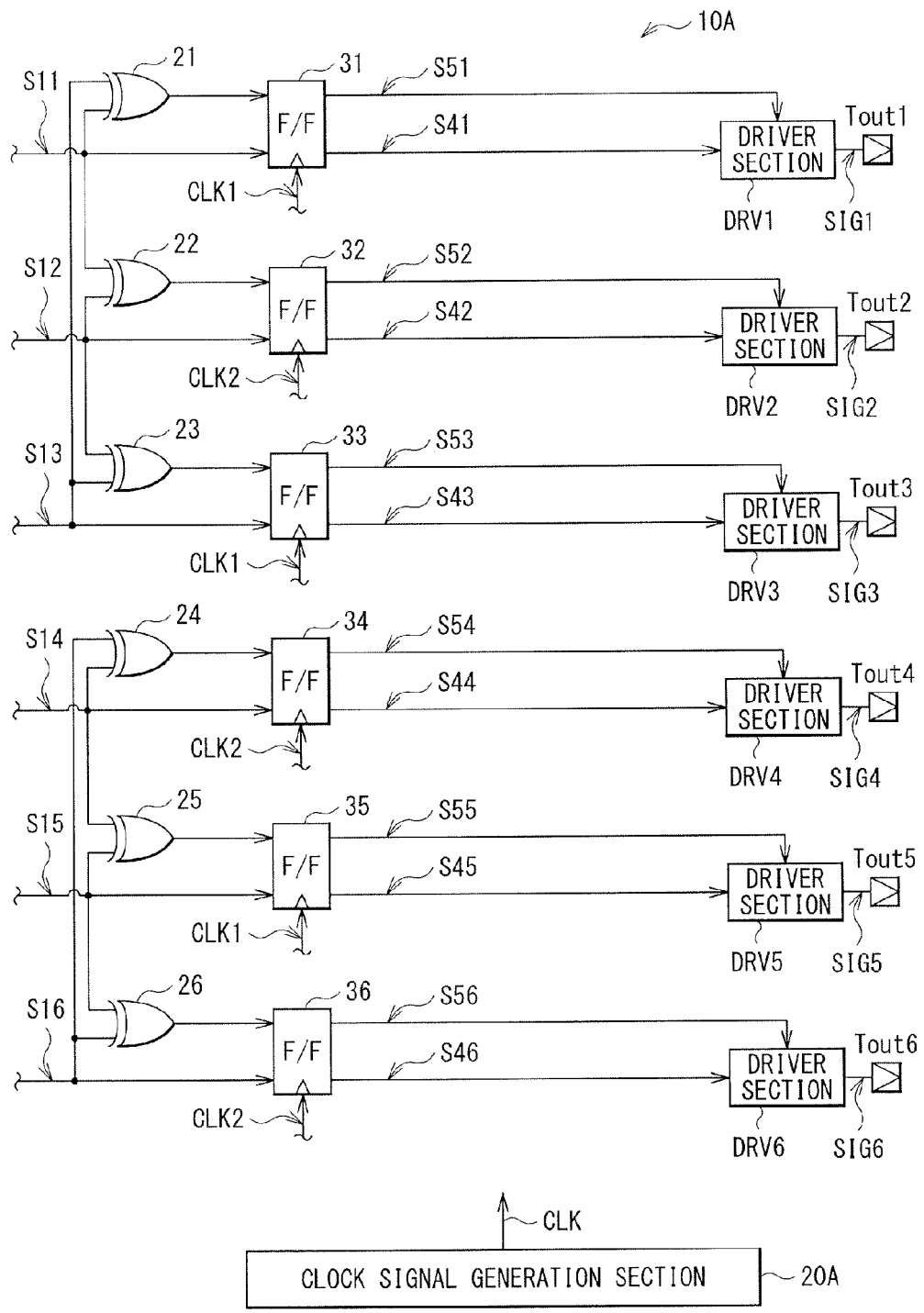
[ FIG. 17 ]

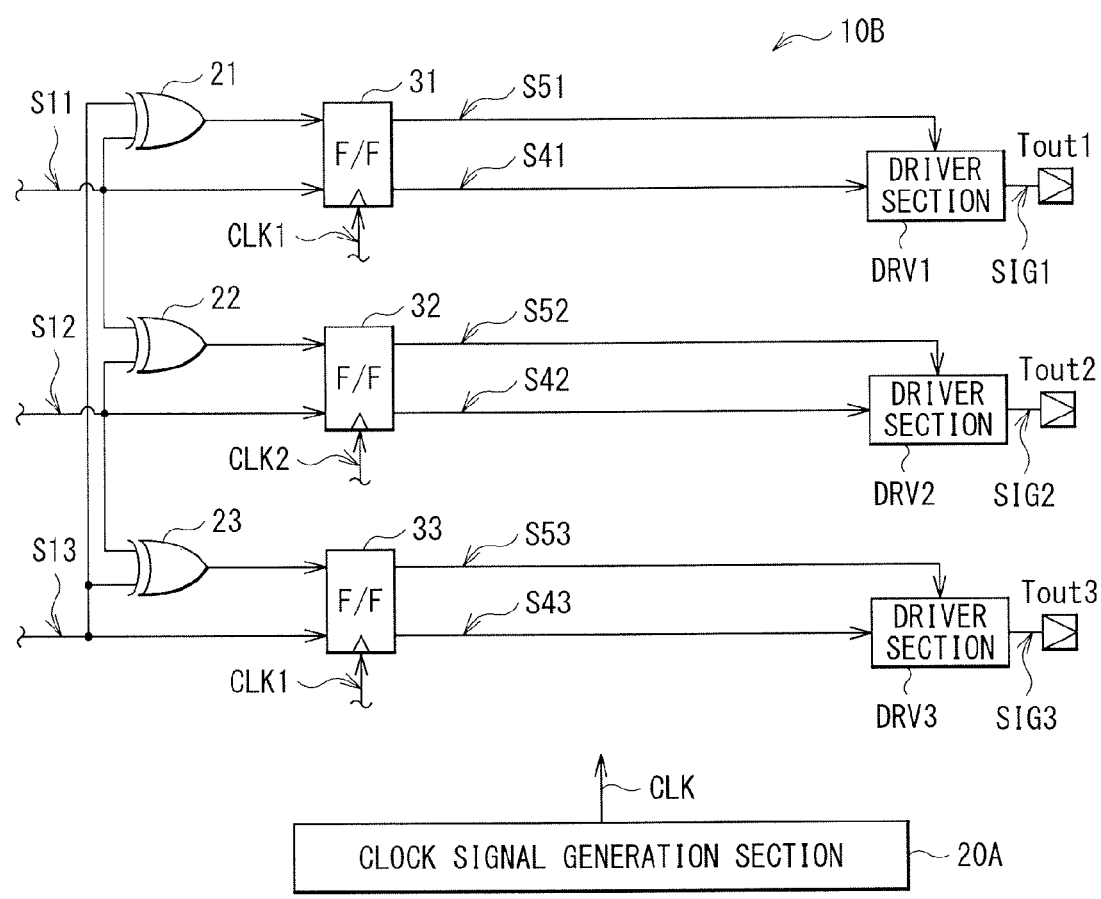
[FIG. 18]

[ FIG. 19 ]
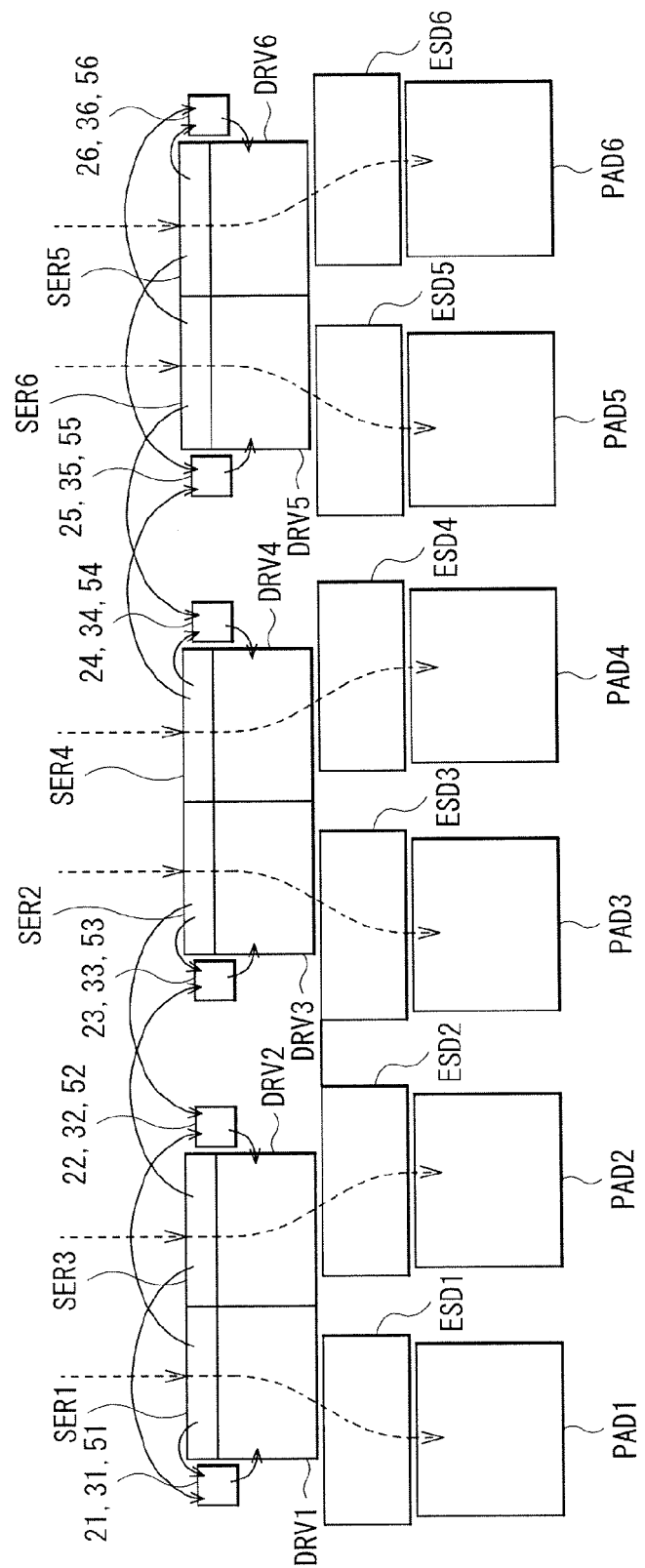

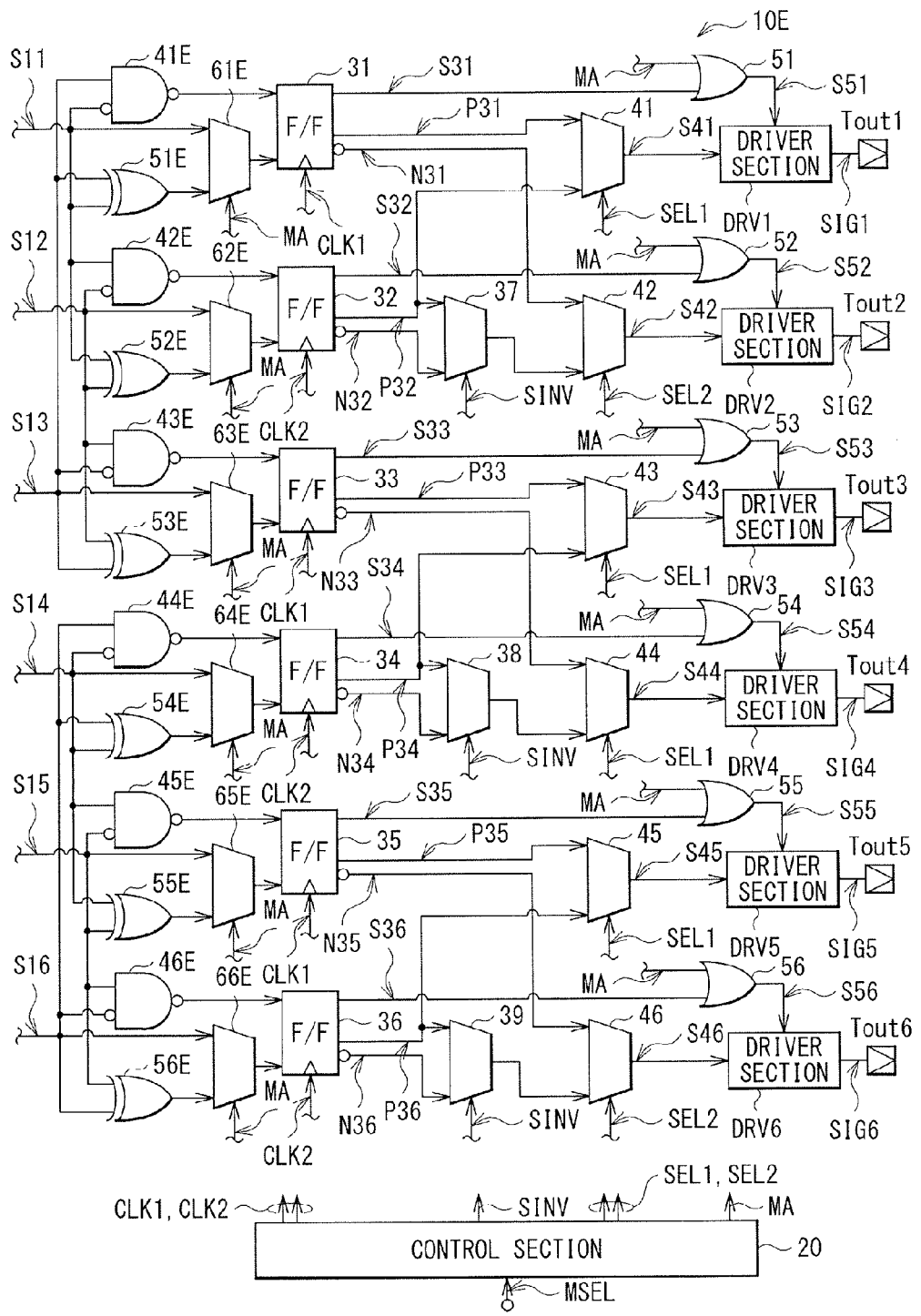
[ FIG. 20 ]

[ FIG. 21A ]
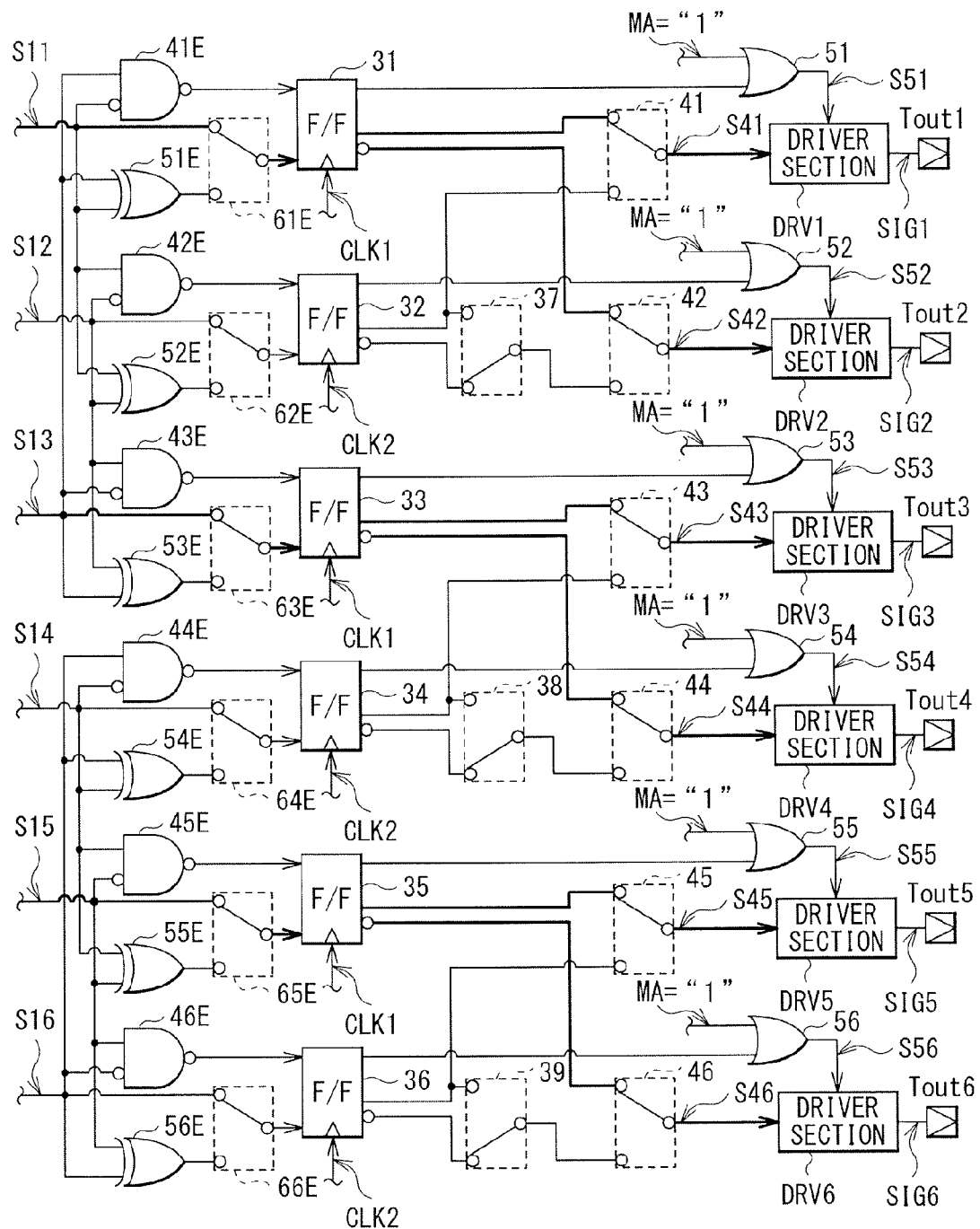

[ FIG. 21B ]
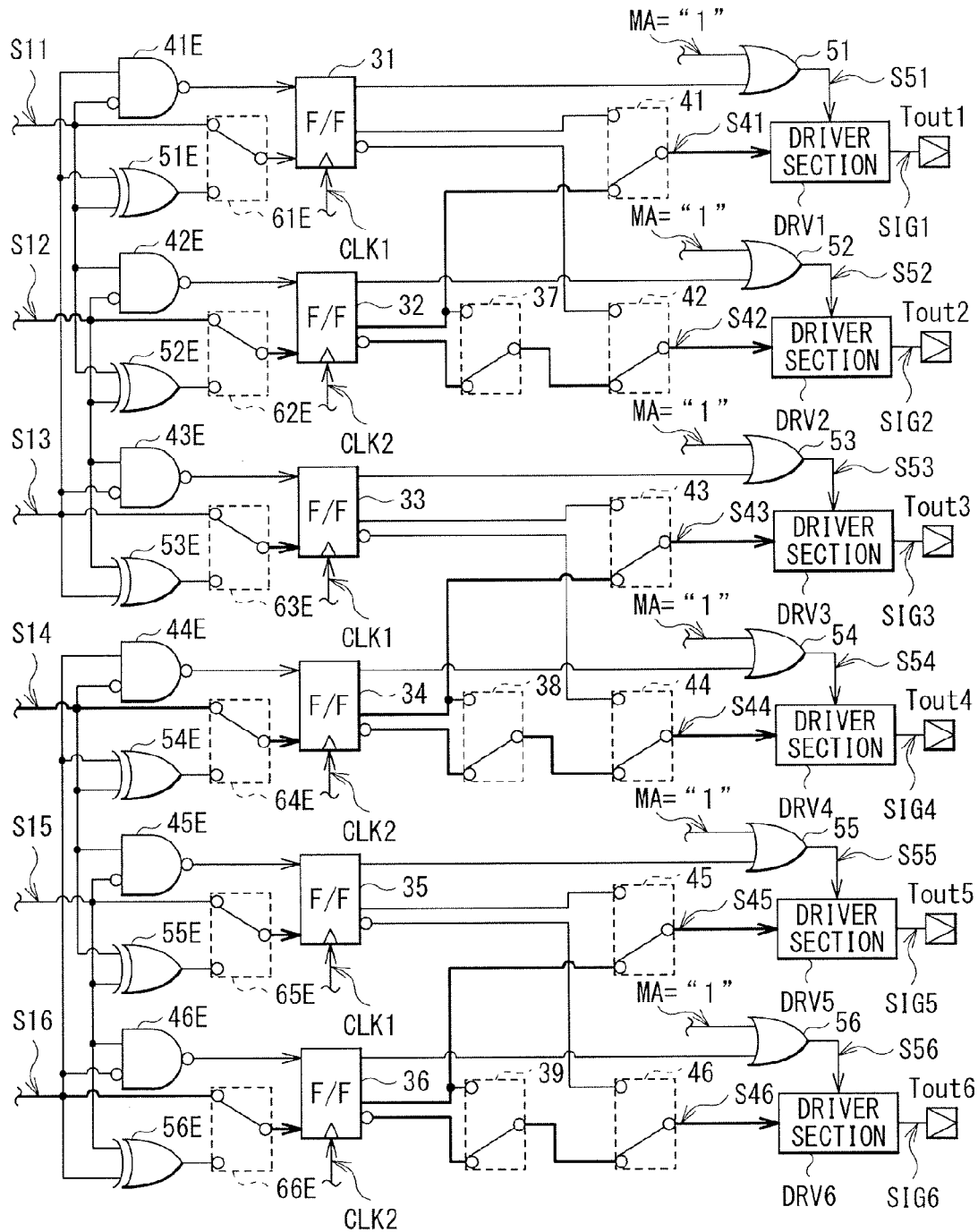

[ FIG. 22 ]
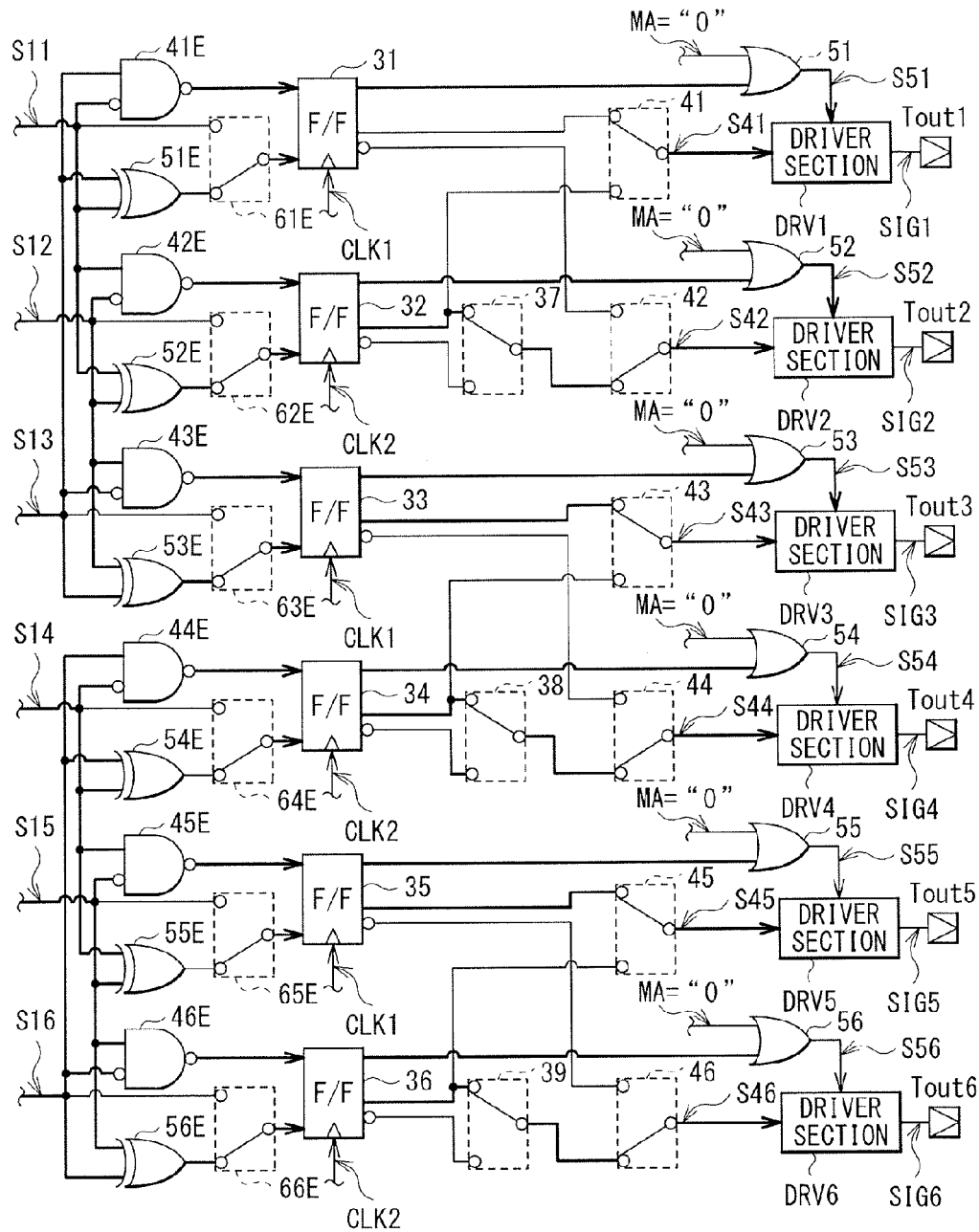

[ FIG. 23 ]

| SIGNAL S11 | SIGNAL S12 | SIGNAL S13 | SIGNAL S41 | SIGNAL S42 | SIGNAL S43 | SIGNAL S51 | SIGNAL S52 | SIGNAL S53 | SIGNAL SIG1 | SIGNAL SIG2 | SIGNAL SIG3 |
|---|---|---|---|---|---|---|---|---|---|---|---|
| 1 | 1 | 0 | 1 | 0 | 1 | 1 | 1 | 0 | VH | VL | VM |
| 0 | 1 | 0 | 0 | 1 | 1 | 1 | 1 | 0 | VL | VH | VM |
| 0 | 1 | 1 | 1 | 1 | 0 | 0 | 1 | 1 | VM | VH | VL |
| 0 | 0 | 1 | 1 | 0 | 1 | 0 | 1 | 1 | VM | VL | VH |
| 1 | 0 | 1 | 0 | 1 | 1 | 1 | 0 | 1 | VL | VM | VH |
| 1 | 0 | 0 | 1 | 1 | 1 | 1 | 0 | 1 | VH | VM | VL |

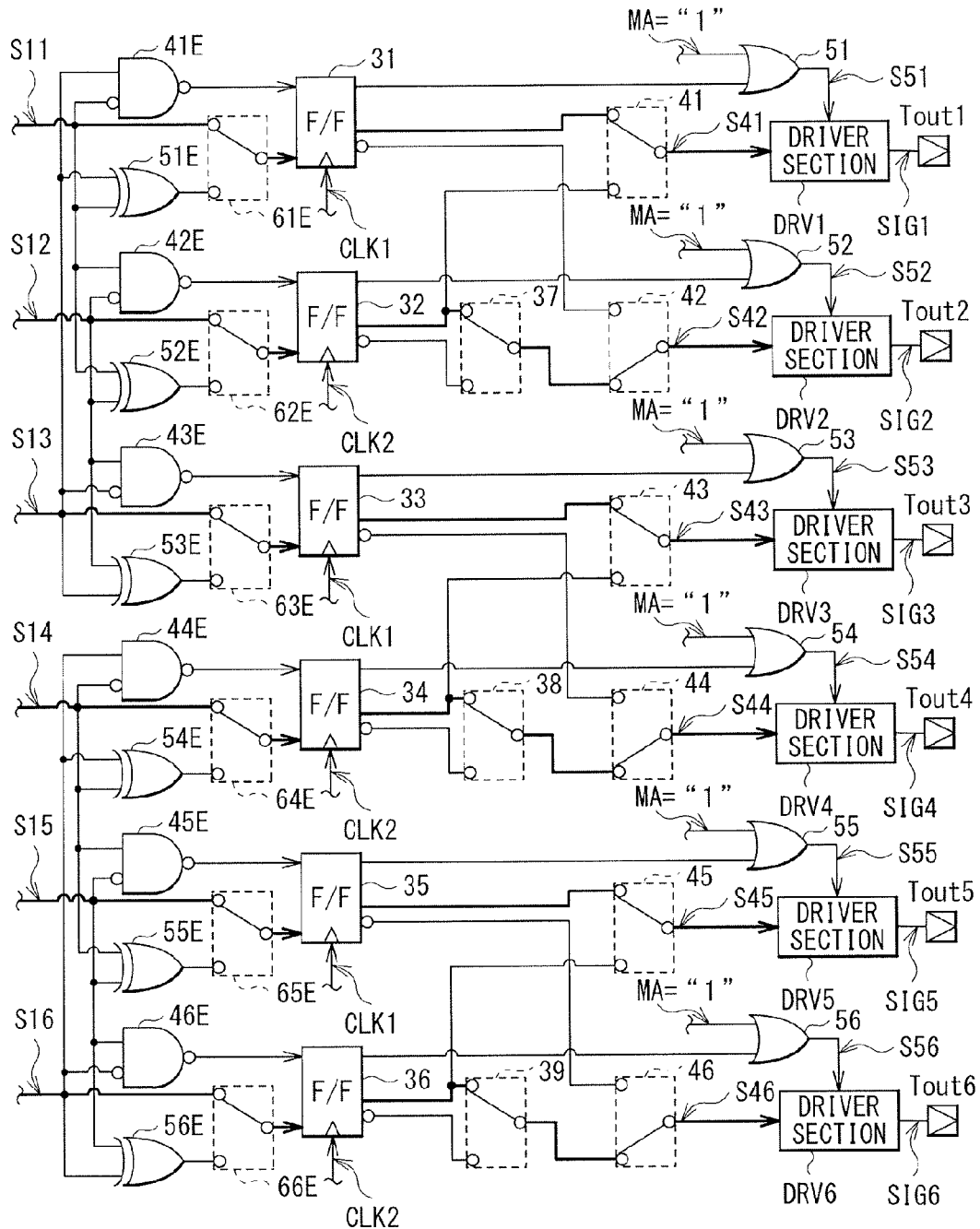
[FIG. 24]

[FIG. 25]
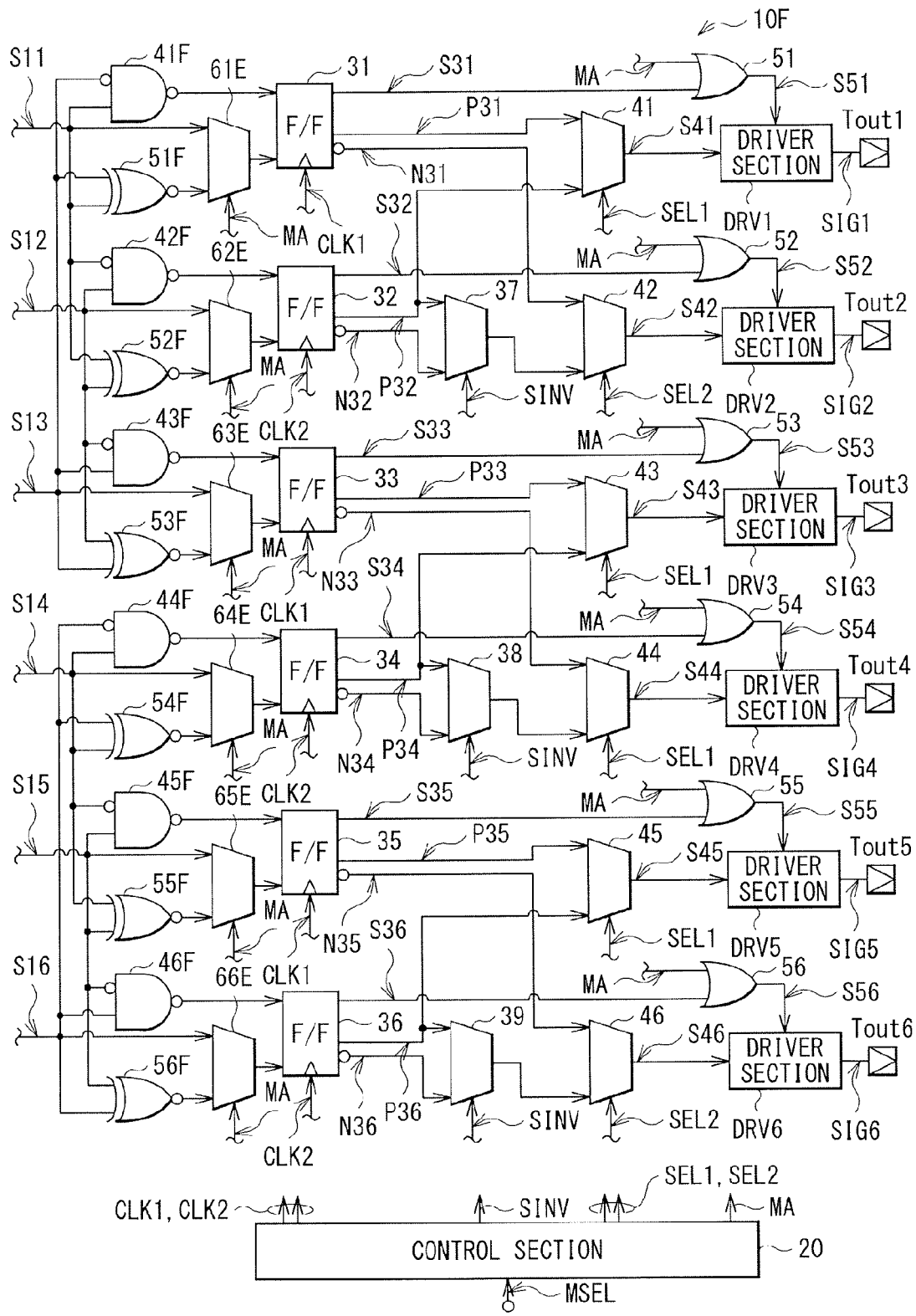

[ FIG. 26 ]

| SIGNAL S11 | SIGNAL S12 | SIGNAL S13 | SIGNAL S41 | SIGNAL S42 | SIGNAL S43 | SIGNAL S51 | SIGNAL S52 | SIGNAL S53 | SIGNAL SIG1 | SIGNAL SIG2 | SIGNAL SIG3 |
|---|---|---|---|---|---|---|---|---|---|---|---|
| 1 | 0 | 1 | 1 | 0 | 0 | 1 | 1 | 0 | VH | VL | VM |
| 0 | 0 | 1 | 0 | 1 | 0 | 1 | 1 | 0 | VL | VH | VM |
| 1 | 1 | 0 | 0 | 1 | 0 | 0 | 1 | 1 | VM | VH | VL |
| 1 | 0 | 0 | 0 | 0 | 1 | 0 | 1 | 1 | VM | VL | VH |
| 0 | 1 | 1 | 0 | 0 | 1 | 1 | 0 | 1 | VL | VM | VH |
| 0 | 1 | 0 | 1 | 0 | 0 | 1 | 0 | 1 | VH | VM | VL |

[FIG. 27]
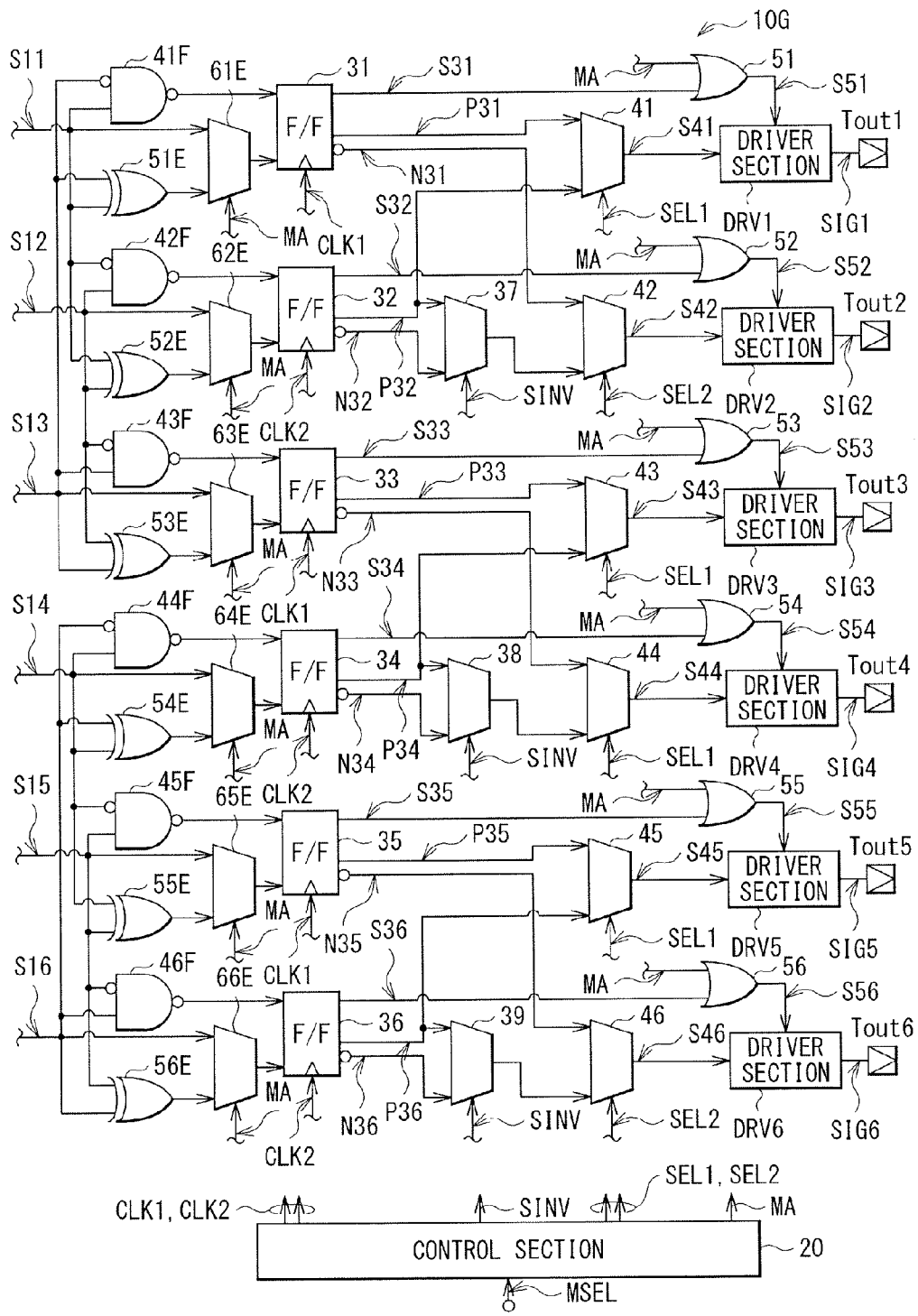

[ FIG. 28 ]

| SIGNAL S11 | SIGNAL S12 | SIGNAL S13 | SIGNAL S41 | SIGNAL S42 | SIGNAL S43 | SIGNAL S51 | SIGNAL S52 | SIGNAL S53 | SIGNAL SIG1 | SIGNAL SIG2 | SIGNAL SIG3 |
|---|---|---|---|---|---|---|---|---|---|---|---|
| 0 | 0 | 1 | 1 | 0 | 1 | 1 | 1 | 0 | VH | VL | VM |
| 1 | 0 | 1 | 0 | 1 | 1 | 1 | 1 | 0 | VL | VH | VM |
| 1 | 0 | 0 | 1 | 1 | 0 | 0 | 1 | 1 | VM | VH | VL |
| 1 | 1 | 0 | 1 | 0 | 1 | 0 | 1 | 1 | VM | VL | VH |
| 0 | 1 | 0 | 0 | 1 | 1 | 1 | 0 | 1 | VL | VM | VH |
| 0 | 1 | 1 | 1 | 1 | 0 | 1 | 0 | 1 | VH | VM | VL |

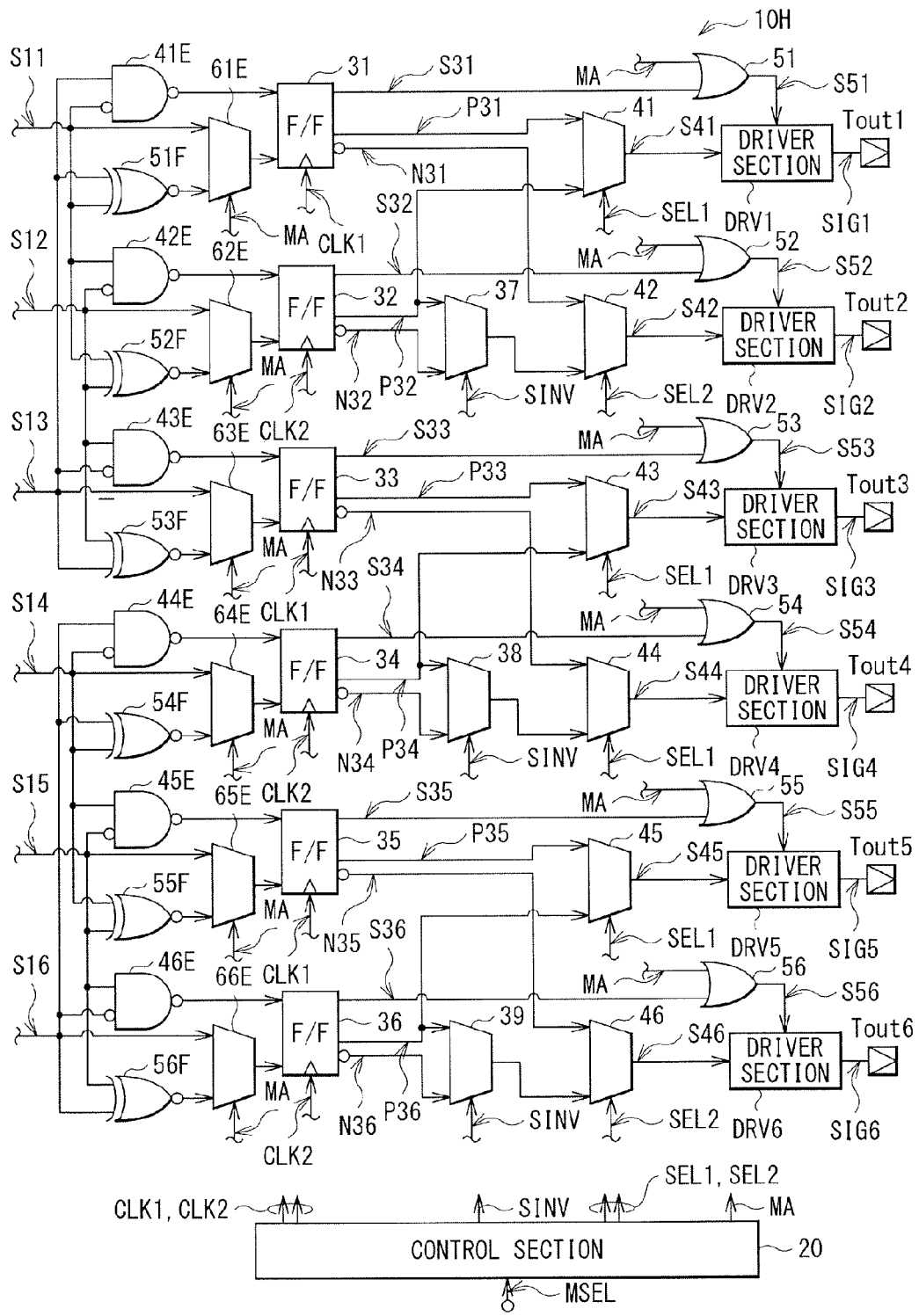
[FIG. 29]

[ FIG. 30 ]

| SIGNAL S11 | SIGNAL S12 | SIGNAL S13 | SIGNAL S41 | SIGNAL S42 | SIGNAL S43 | SIGNAL S51 | SIGNAL S52 | SIGNAL S53 | SIGNAL SIG1 | SIGNAL SIG2 | SIGNAL SIG3 |
|---|---|---|---|---|---|---|---|---|---|---|---|
| 0 | 1 | 0 | 1 | 0 | 0 | 1 | 1 | 0 | VH | VL | VM |
| 1 | 1 | 0 | 0 | 1 | 0 | 1 | 1 | 0 | VL | VH | VM |
| 0 | 0 | 1 | 0 | 1 | 0 | 0 | 1 | 1 | VM | VH | VL |
| 0 | 1 | 1 | 0 | 0 | 1 | 0 | 1 | 1 | VM | VL | VH |
| 1 | 0 | 0 | 0 | 0 | 1 | 1 | 0 | 1 | VL | VM | VH |
| 1 | 0 | 1 | 1 | 0 | 0 | 1 | 0 | 1 | VH | VM | VL |

[ FIG. 31 ]
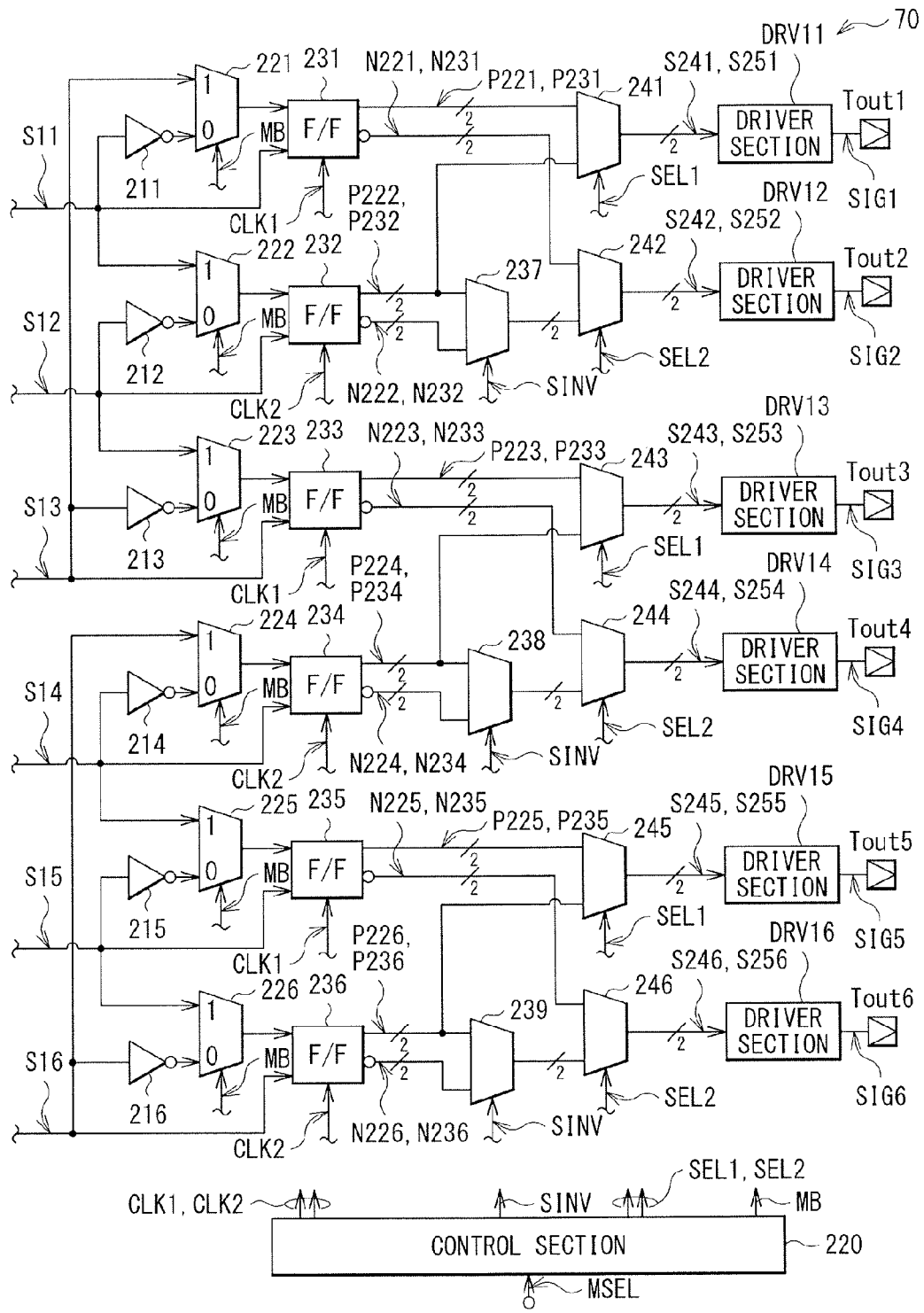

[ FIG. 32 ]
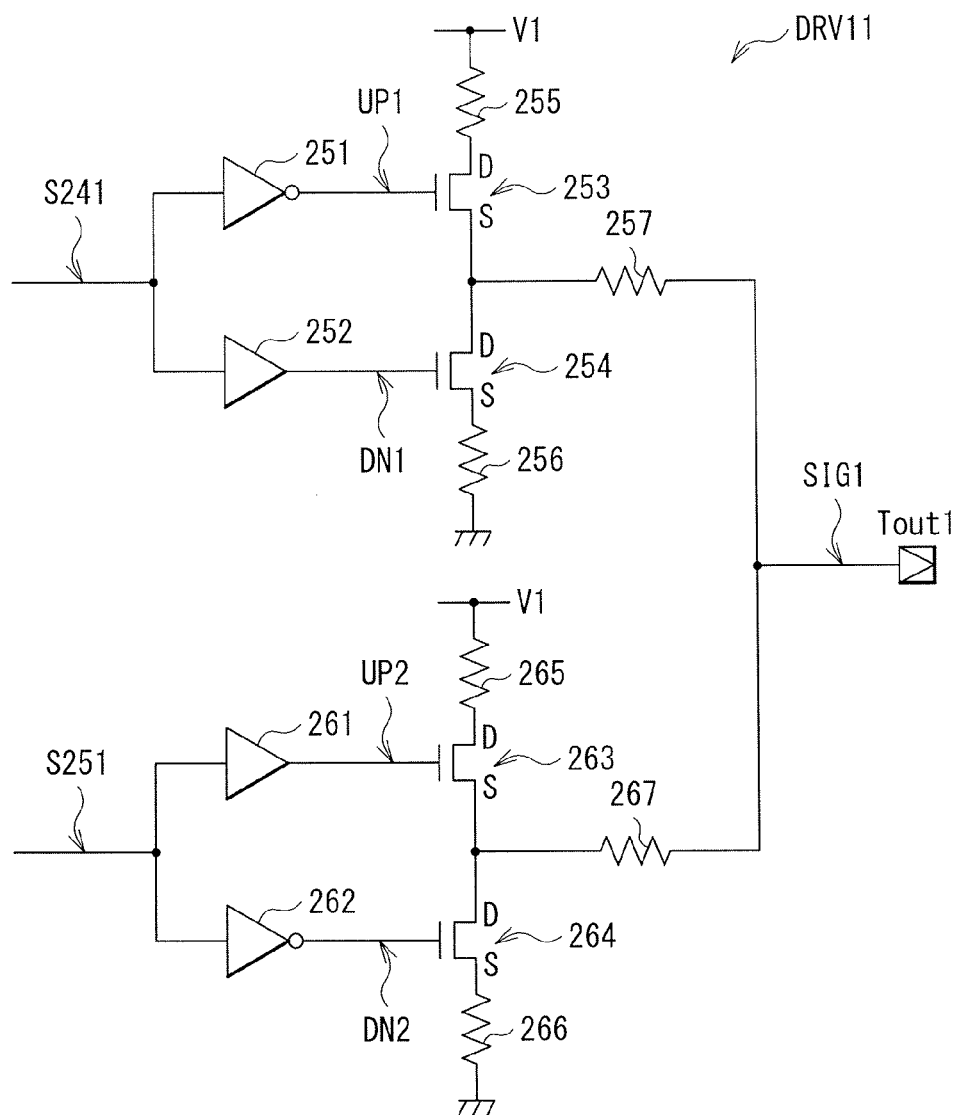

[ FIG. 33A ]
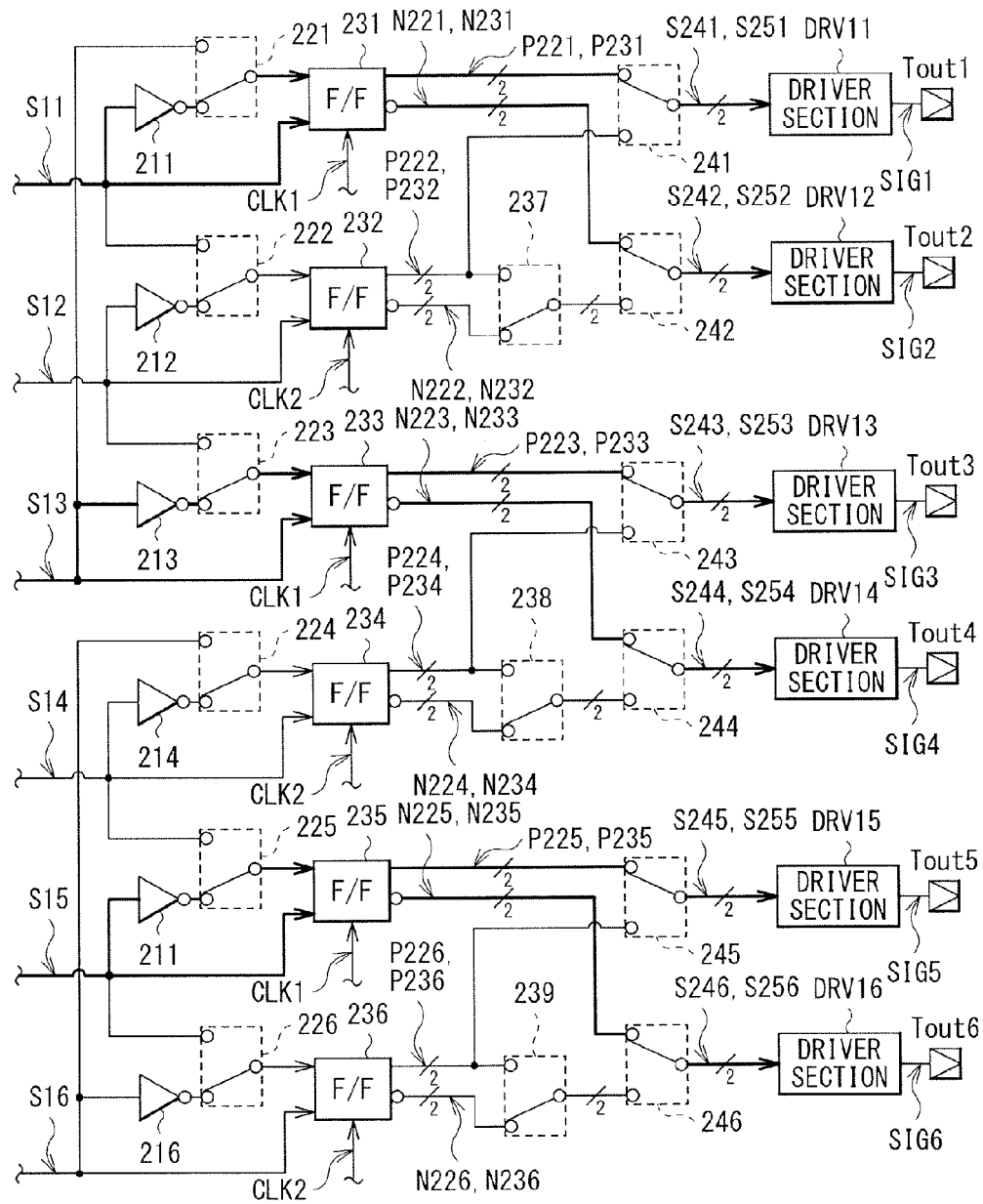

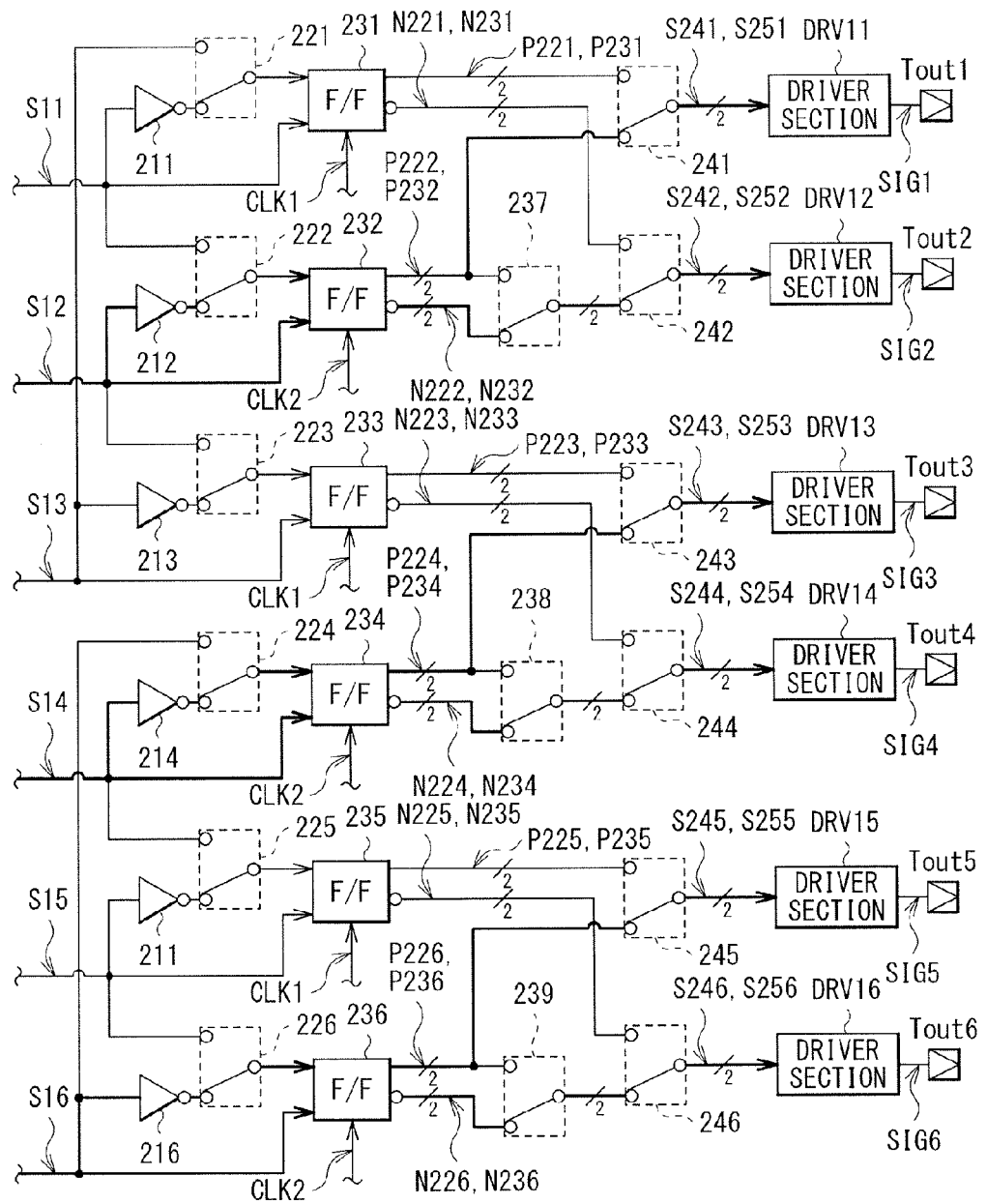
[ FIG. 33B ]

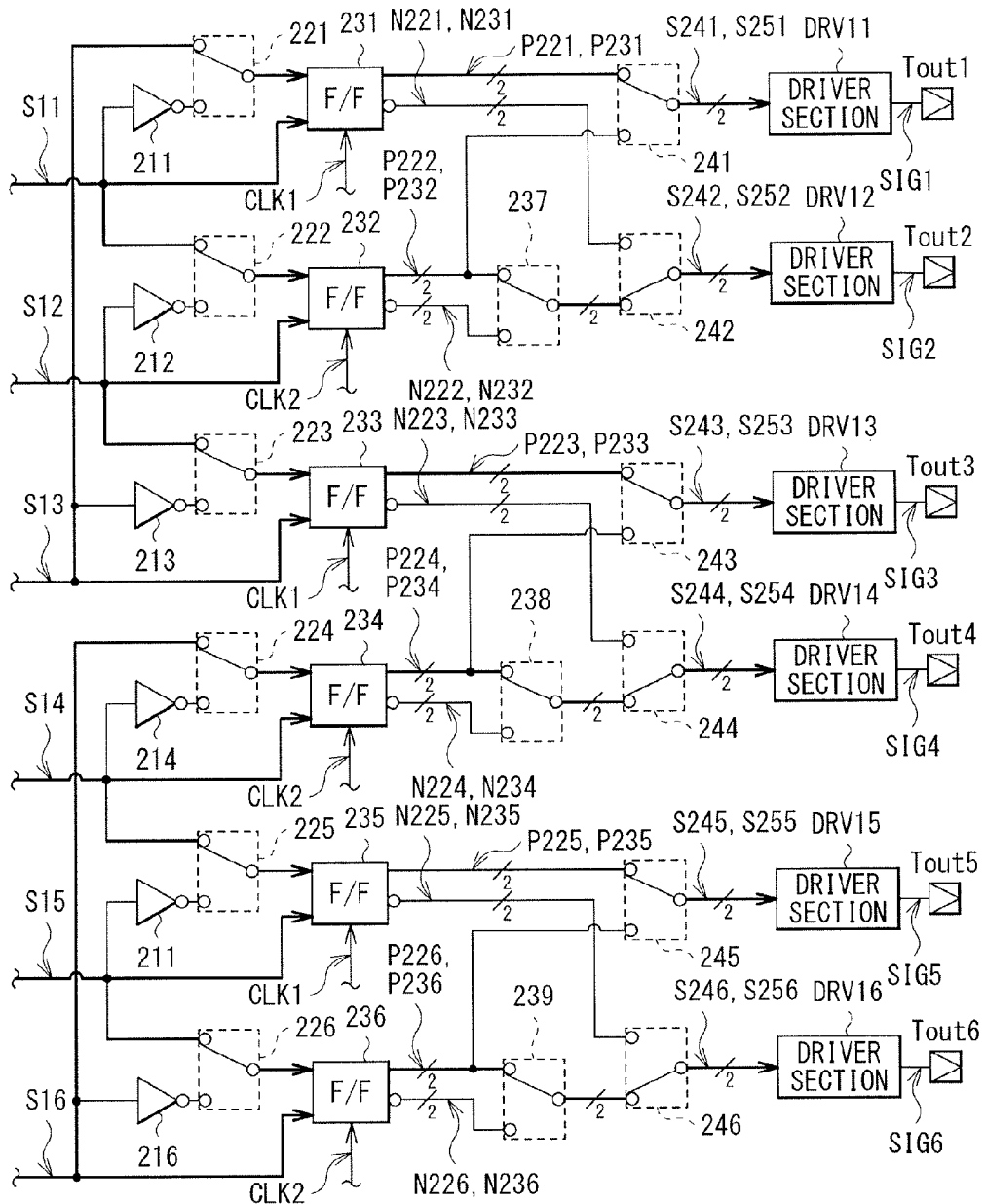
[ FIG. 34 ]

[ FIG. 35 ]

| SIGNAL S11 | SIGNAL S12 | SIGNAL S13 | SIGNAL S241 | SIGNAL S251 | SIGNAL S242 | SIGNAL S252 | SIGNAL S243 | SIGNAL S253 | SIGNAL SIG1 | SIGNAL SIG2 | SIGNAL SIG3 |
|---|---|---|---|---|---|---|---|---|---|---|---|
| 1 | 0 | 0 | 0 | 1 | 1 | 0 | 0 | 0 | VH | VL | VM |
| 0 | 1 | 1 | 1 | 0 | 0 | 1 | 1 | 1 | VL | VH | VM |
| 0 | 1 | 0 | 0 | 0 | 0 | 1 | 1 | 0 | VM | VH | VL |
| 1 | 0 | 1 | 1 | 1 | 1 | 0 | 0 | 1 | VM | VL | VH |
| 0 | 0 | 1 | 1 | 0 | 0 | 0 | 0 | 1 | VL | VM | VH |
| 1 | 1 | 0 | 0 | 1 | 1 | 1 | 1 | 0 | VH | VM | VL |

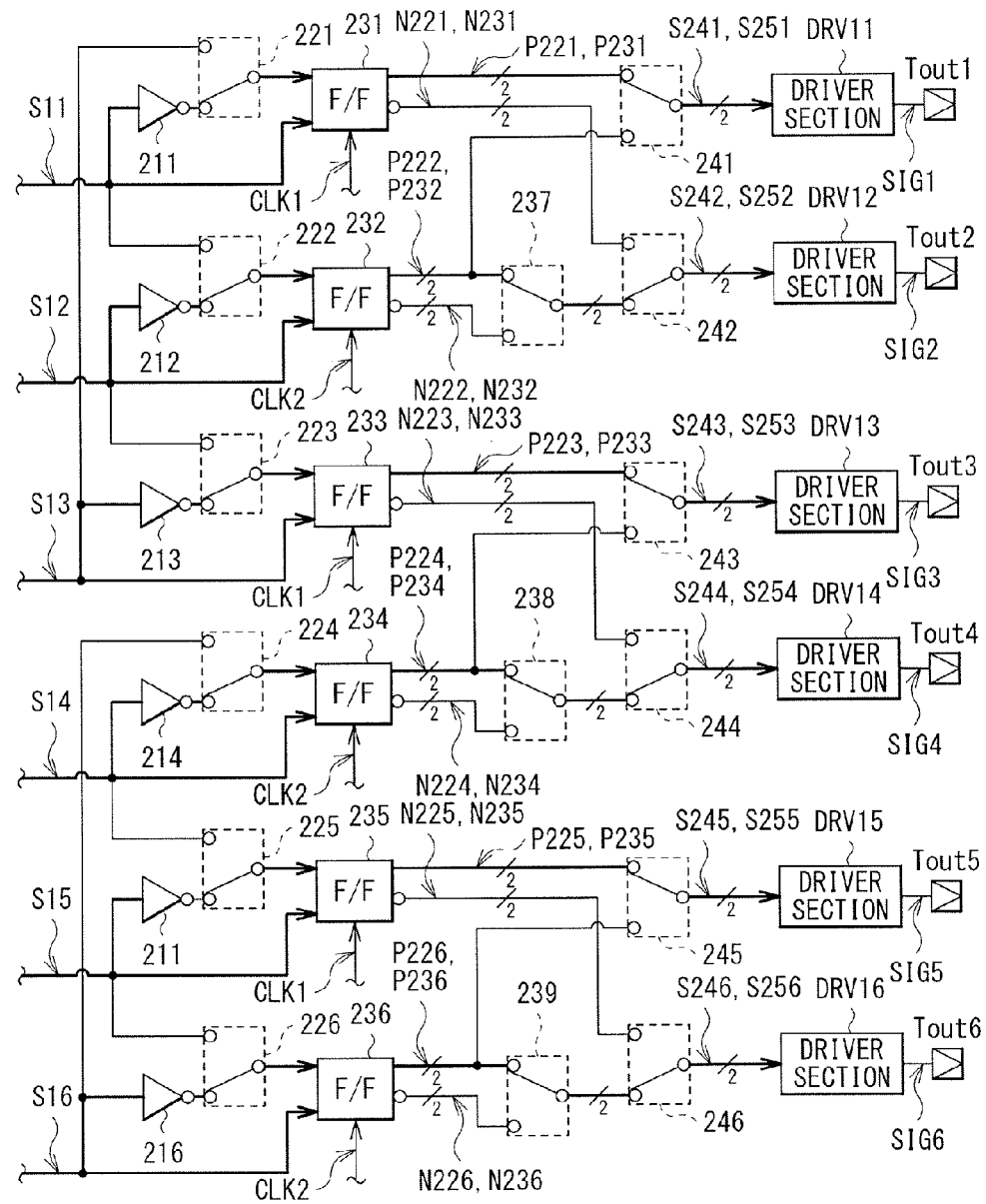
[ FIG. 36 ]

[ FIG. 37 ]
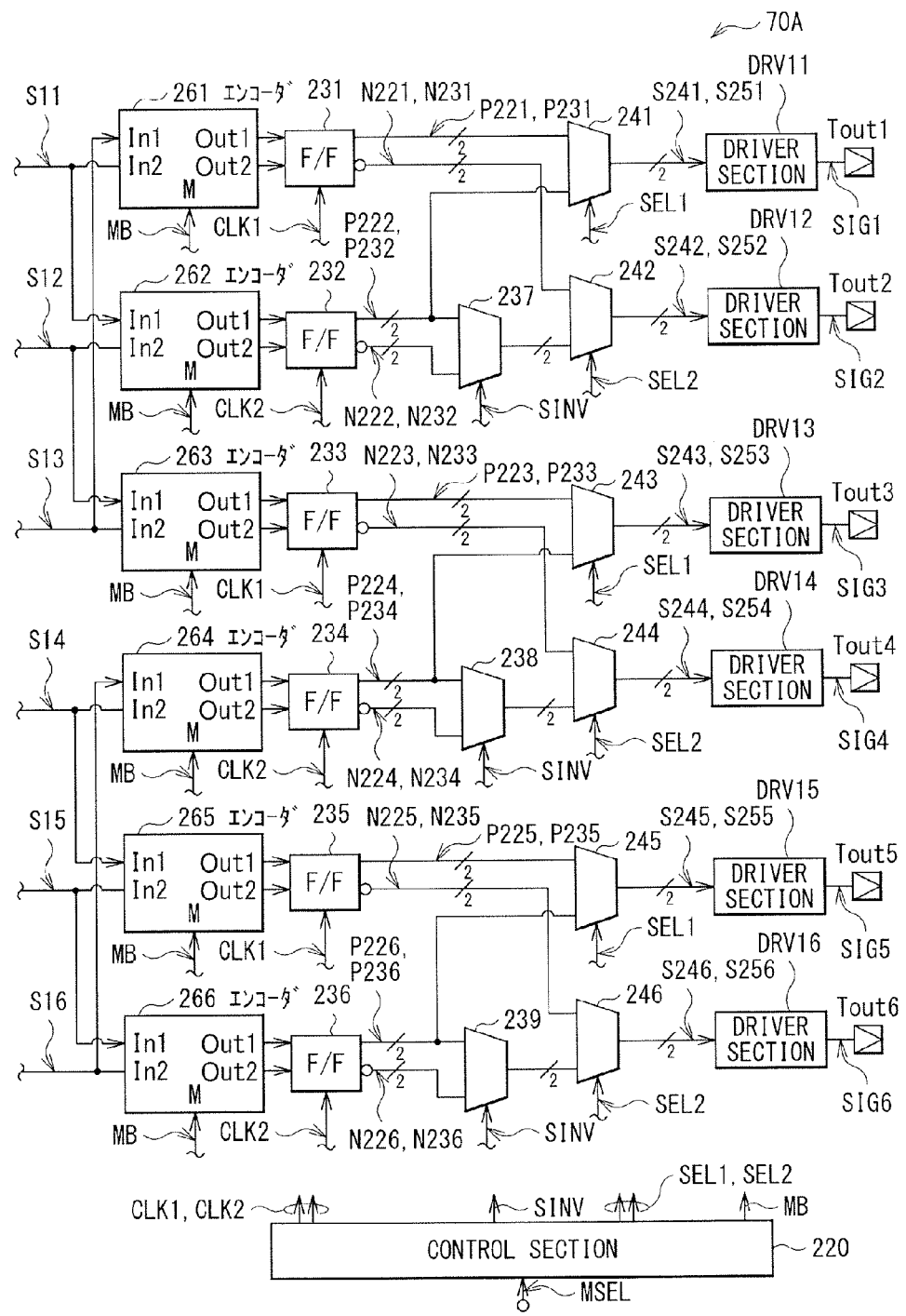

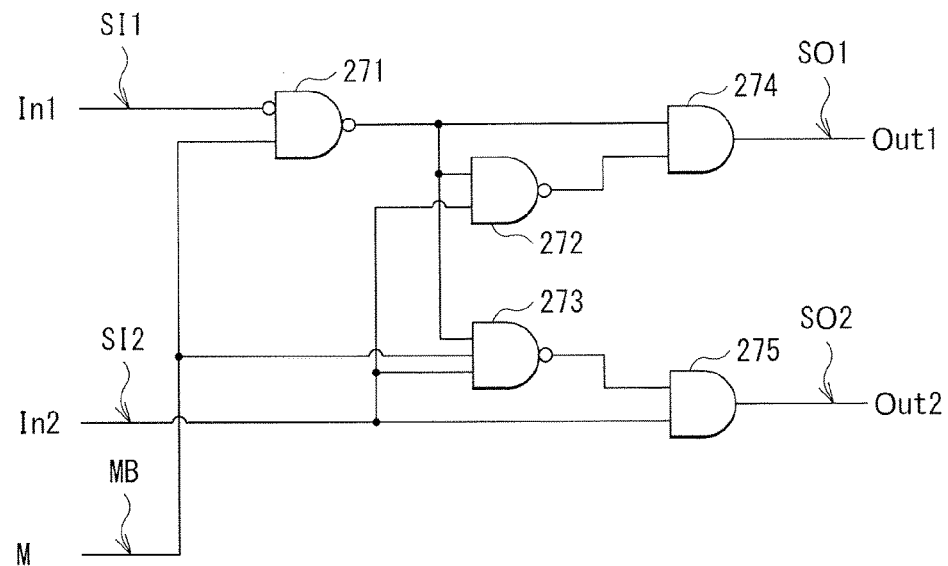
[ FIG. 38 ]
[ FIG. 39 ]
| SIGNAL MB | SIGNAL SI1 | SIGNAL SI2 | SIGNAL SO1 | SIGNAL SO2 |
|---|---|---|---|---|
| 1 | 1 | 1 | 0 | 0 |
| 1 | 1 | 0 | 1 | 0 |
| 1 | 0 | 1 | 0 | 1 |
| 1 | 0 | 0 | 0 | 0 |
| 0 | X | 1 | 0 | 1 |
| 0 | X | 0 | 1 | 0 |

[ FIG. 40 ]

| SIGNAL S11 | SIGNAL S12 | SIGNAL S13 | SIGNAL S241 | SIGNAL S251 | SIGNAL S242 | SIGNAL S252 | SIGNAL S243 | SIGNAL S253 | SIGNAL SIG1 | SIGNAL SIG2 | SIGNAL SIG3 |
|---|---|---|---|---|---|---|---|---|---|---|---|
| 1 | 0 | 0 | 0 | 1 | 1 | 0 | 0 | 0 | VH | VL | VM |
| 0 | 1 | 1 | 1 | 0 | 0 | 1 | 0 | 0 | VL | VH | VM |
| 0 | 1 | 0 | 0 | 0 | 0 | 1 | 1 | 0 | VM | VH | VL |
| 1 | 0 | 1 | 0 | 0 | 1 | 0 | 0 | 1 | VM | VL | VH |
| 0 | 0 | 1 | 1 | 0 | 0 | 0 | 0 | 1 | VL | VM | VH |
| 1 | 1 | 0 | 0 | 1 | 0 | 0 | 1 | 0 | VH | VM | VL |

[FIG. 41]
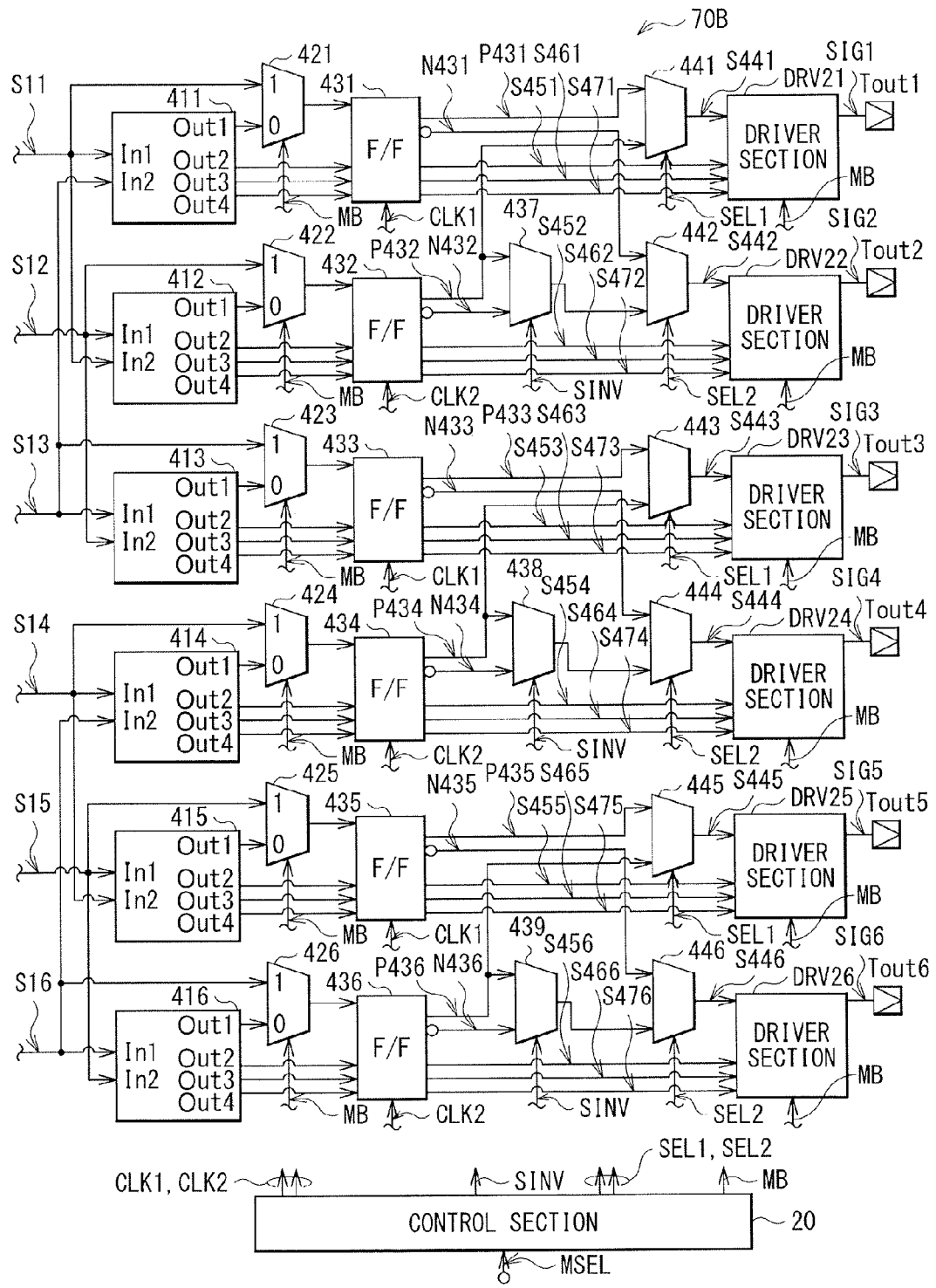

[ FIG. 42 ]
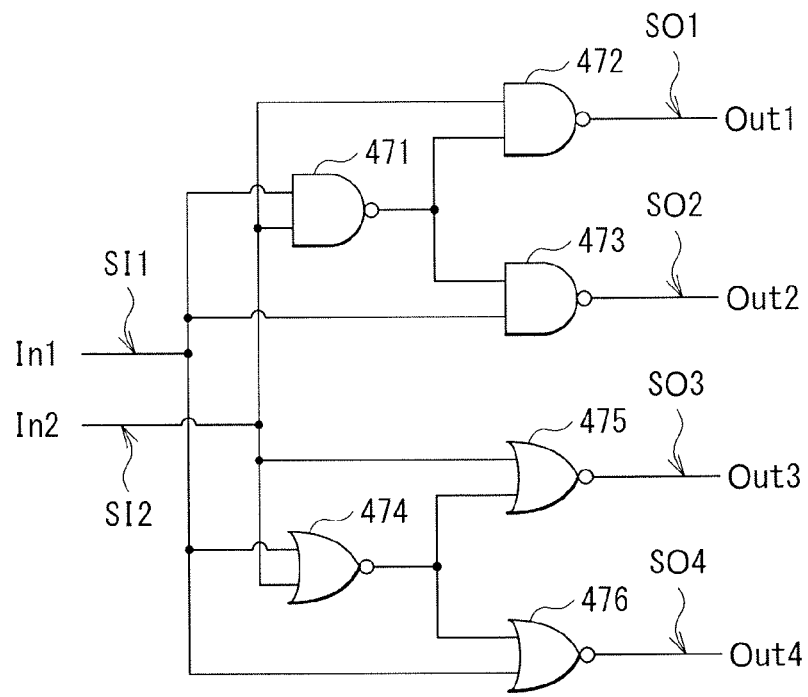
[ FIG. 43 ]
| SIGNAL SI1 | SIGNAL SI2 | SIGNAL SO1 | SIGNAL SO2 | SIGNAL SO3 | SIGNAL SO4 |
|---|---|---|---|---|---|
| 0 | 0 | 1 | 1 | 0 | 0 |
| 0 | 1 | 0 | 1 | 0 | 1 |
| 1 | 0 | 1 | 0 | 1 | 0 |
| 1 | 1 | 1 | 1 | 0 | 0 |

[FIG. 44]
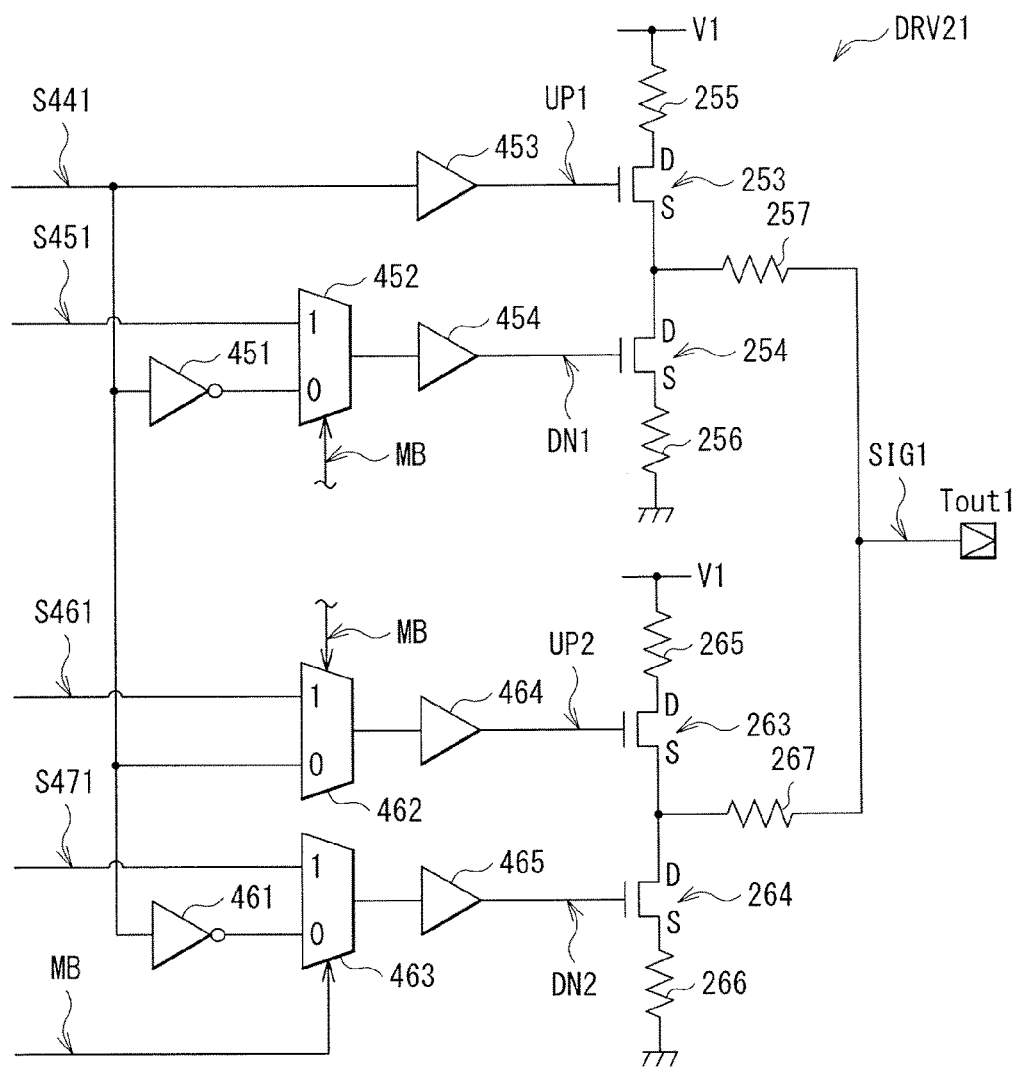

[ FIG. 45A ]
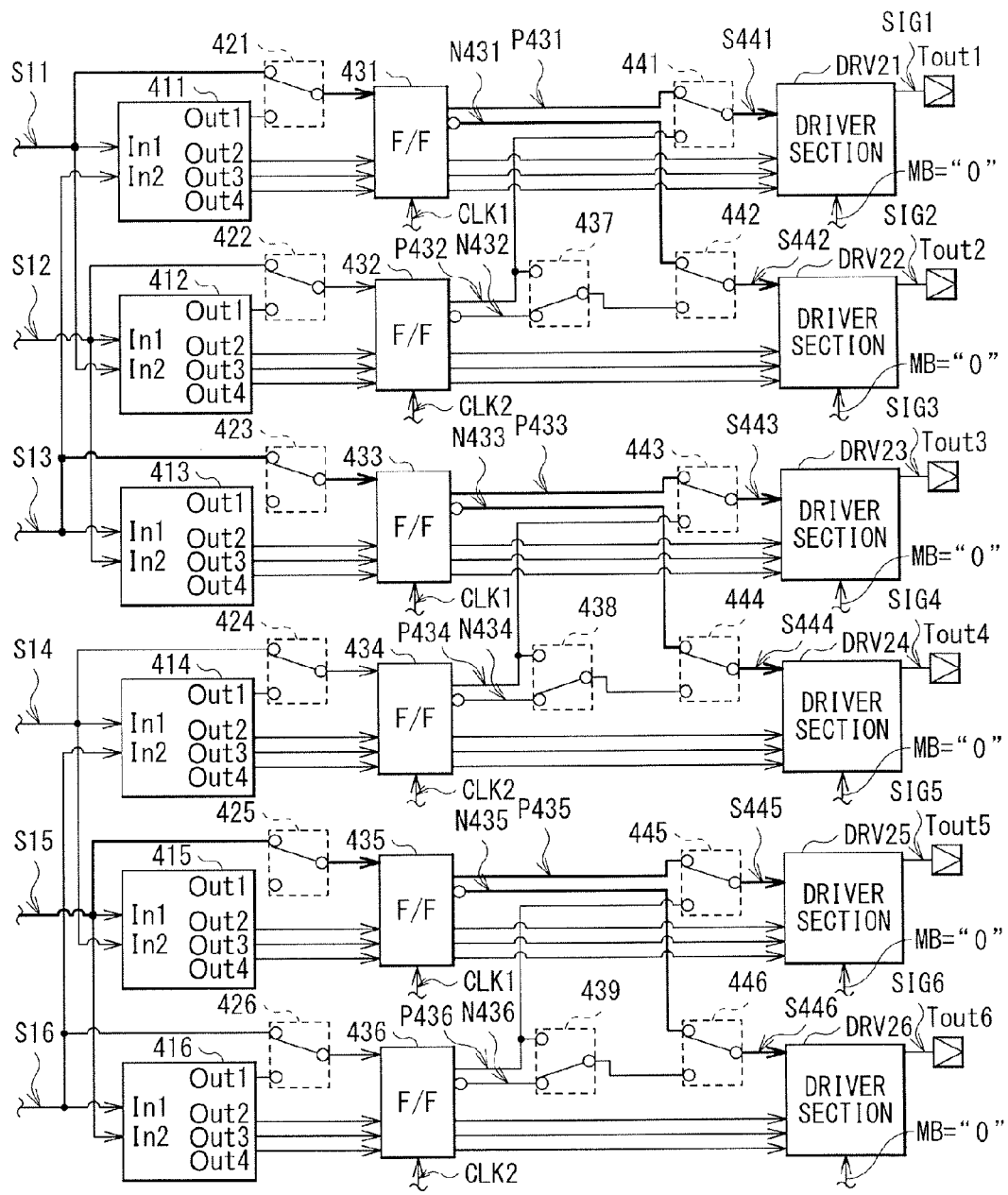

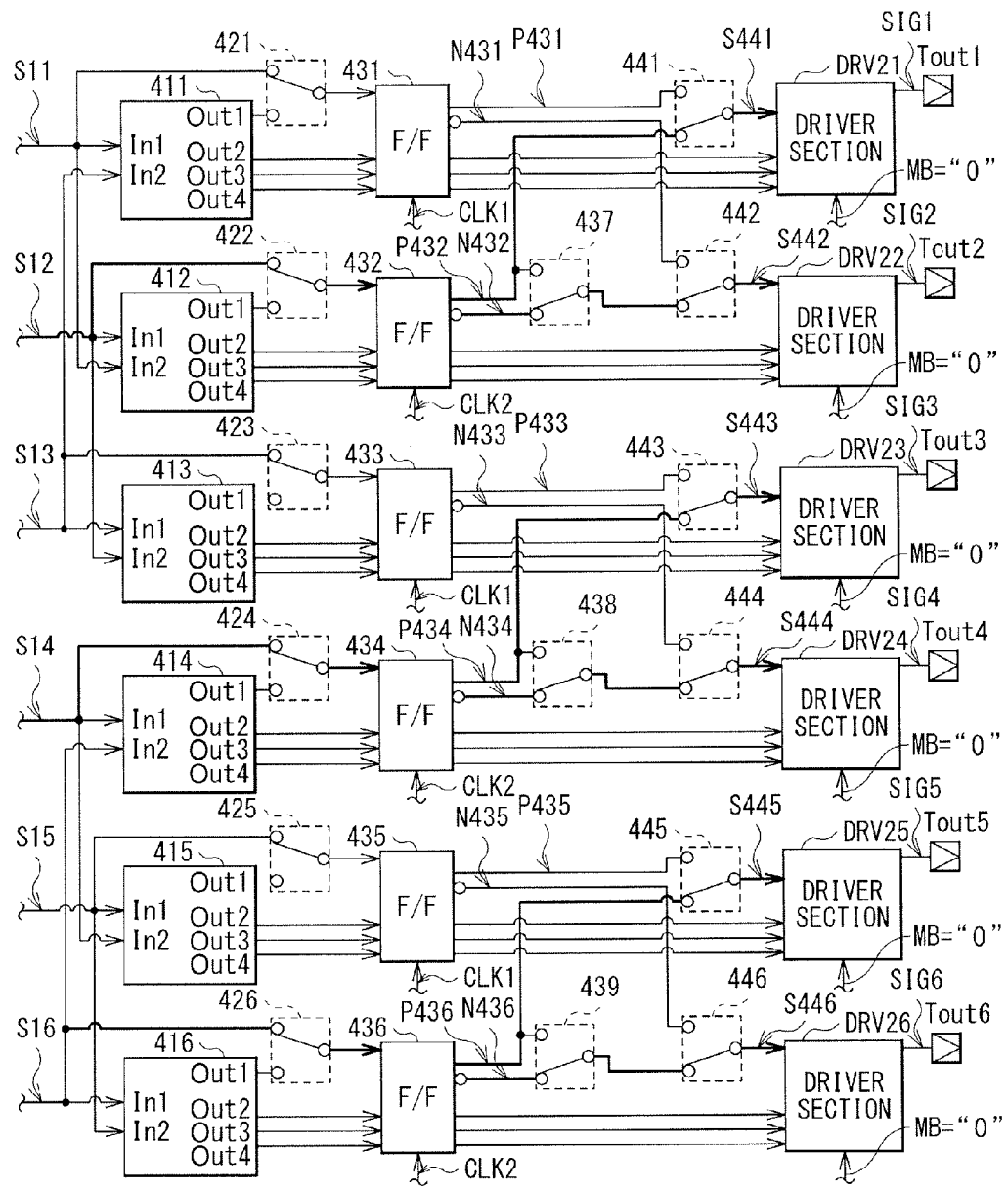
[ FIG. 45B ]

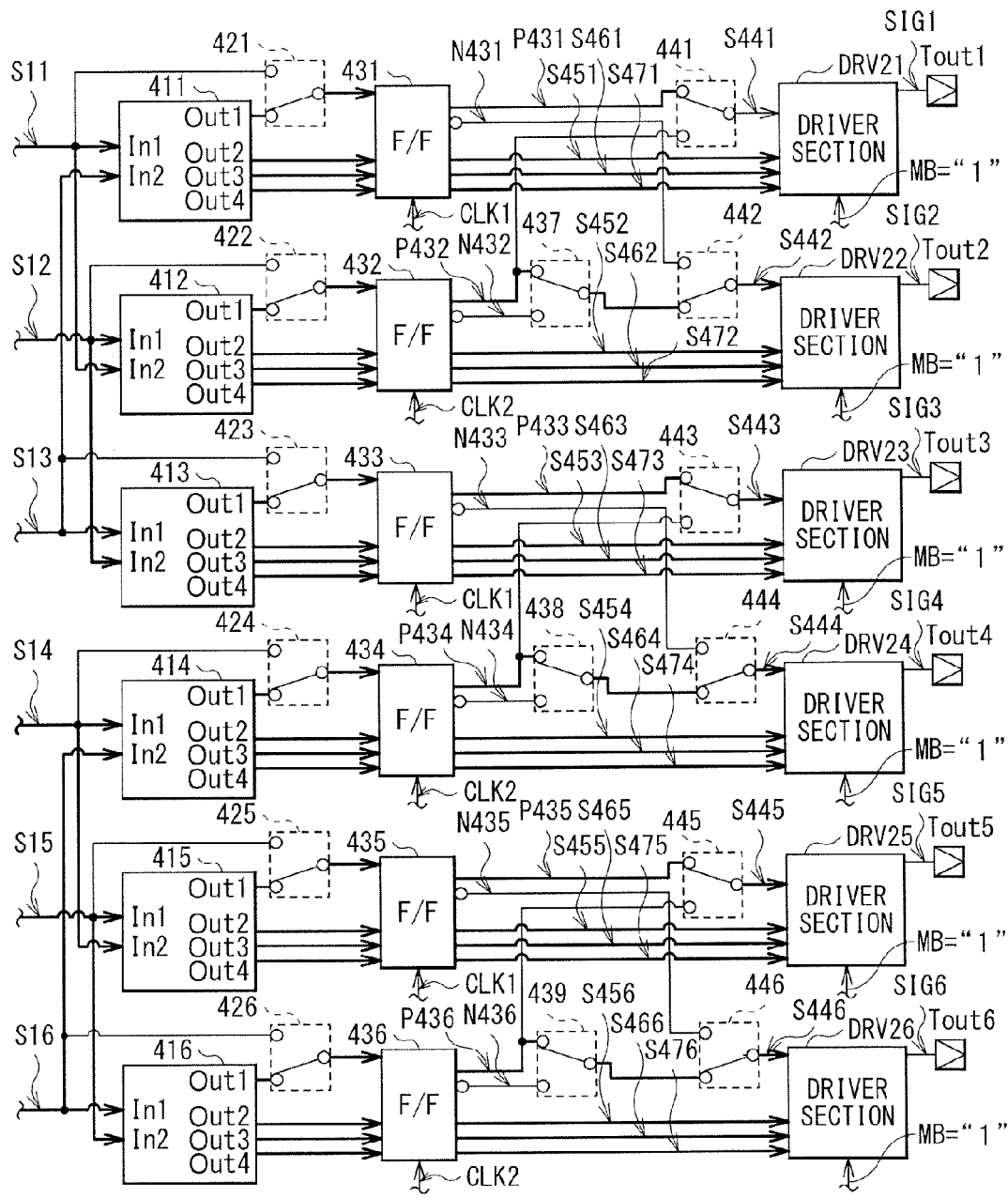
[ FIG. 46 ]

[ FIG. 47 ]

| SIGNAL S11 | SIGNAL S12 | SIGNAL S13 | SIGNAL S441 | SIGNAL S451 | SIGNAL S461 | SIGNAL S471 | SIGNAL S442 | SIGNAL S452 | SIGNAL S462 | SIGNAL S472 | SIGNAL S443 | SIGNAL S453 | SIGNAL S463 | SIGNAL S473 | SIGNAL SIG1 | SIGNAL SIG2 | SIGNAL SIG3 |
|---|---|---|---|---|---|---|---|---|---|---|---|---|---|---|---|---|---|
| 1 | 0 | 0 | 1 | 0 | 1 | 0 | 0 | 1 | 0 | 1 | 1 | 1 | 0 | 0 | VH | VL | VM |
| 0 | 1 | 1 | 0 | 1 | 0 | 1 | 1 | 0 | 1 | 0 | 1 | 1 | 0 | 0 | VL | VH | VM |
| 0 | 1 | 0 | 1 | 1 | 0 | 0 | 1 | 0 | 1 | 0 | 0 | 1 | 0 | 1 | VM | VH | VL |
| 1 | 0 | 1 | 1 | 1 | 0 | 0 | 0 | 1 | 0 | 1 | 1 | 0 | 1 | 0 | VM | VL | VH |
| 0 | 0 | 1 | 0 | 1 | 0 | 0 | 1 | 1 | 0 | 0 | 1 | 0 | 1 | 0 | VL | VM | VH |
| 1 | 1 | 0 | 1 | 0 | 1 | 0 | 1 | 0 | 0 | 0 | 0 | 1 | 0 | 1 | VH | VM | VL |

[ FIG. 48 ]
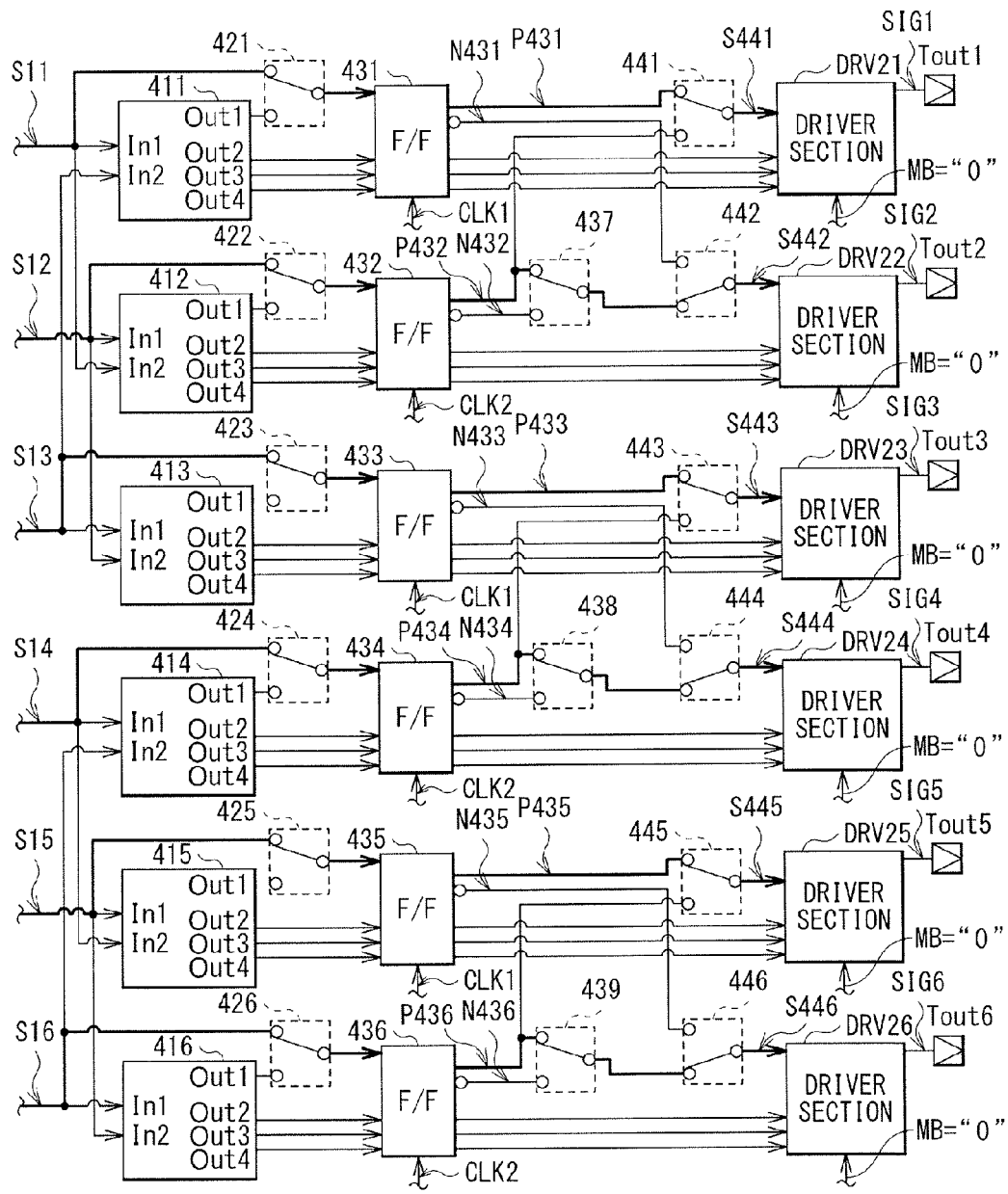

[ FIG. 49 ]
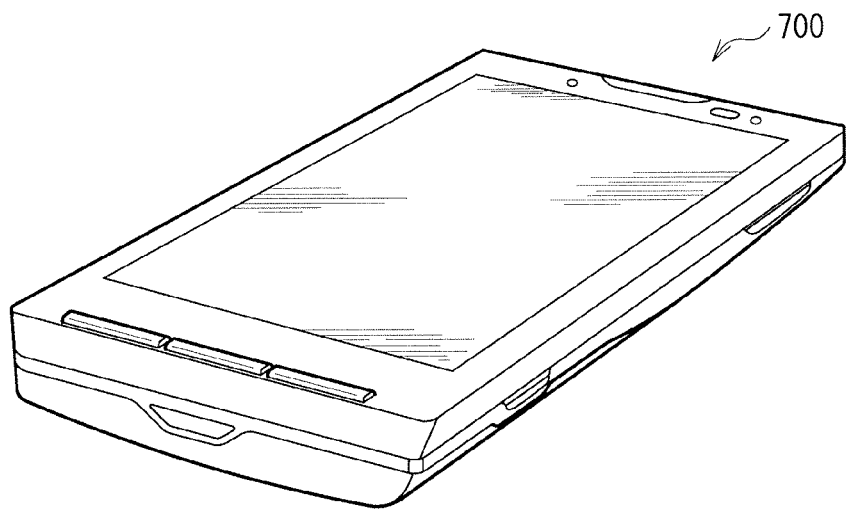

[ FIG. 50 ]
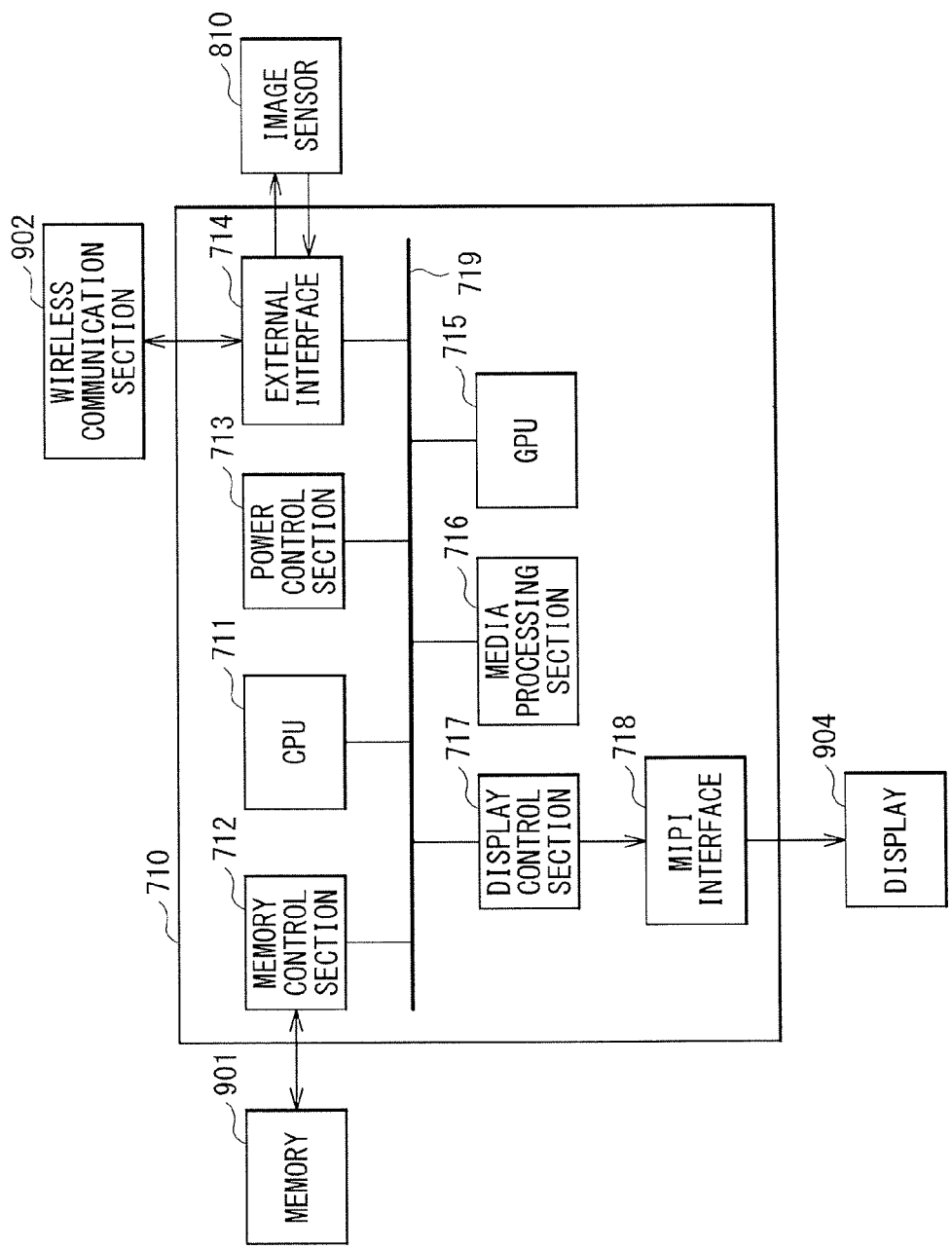

[FIG. 51]
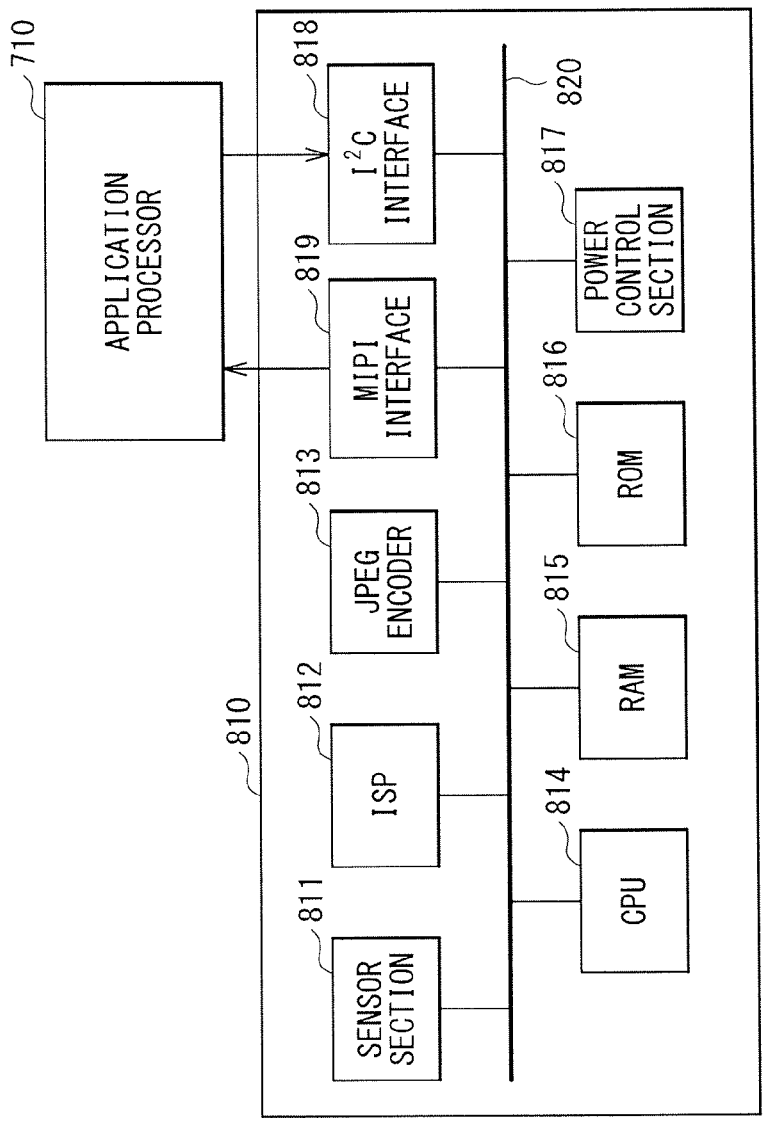

[FIG. 52]
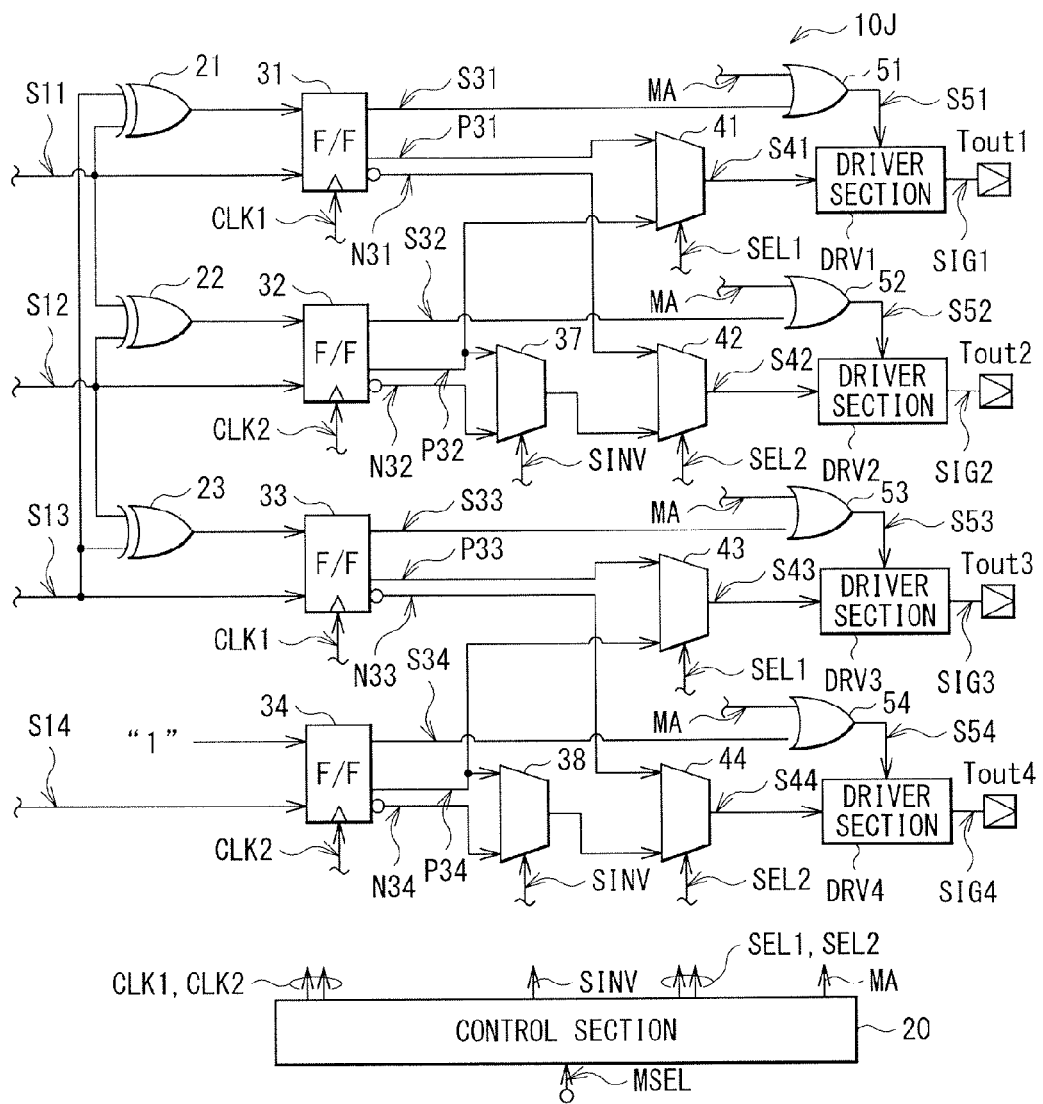

TRANSMITTER AND COMMUNICATION SYSTEM

CROSS REFERENCE TO RELATED APPLICATIONS

This application claims the benefit of Japanese Priority Patent Application JP 2014-127246 filed Jun. 20, 2014, the entire contents of which are incorporated herein by reference.

TECHNICAL FIELD

The present disclosure relates to a transmitter transmitting a signal, and to a communication system provided with such a transmitter.

BACKGROUND ART

In association with high functionality and multi-functionality of an electronic apparatus in recent years, various devices such as a semiconductor chip, a sensor, and a display device are mounted on the electronic apparatus. A lot of data are exchanged between these devices, and an amount of the data is increased in response to high functionality and multi-functionality of the electronic apparatus.

Various technologies for a method of exchanging more data have been disclosed. For example, in PTLs 1 and 2, a communication system in which data is exchanged with use of three voltage levels has been disclosed.

CITATION LIST

Patent Literature

PTL 1: JP-T-2011-517159
PTL 2: JP-T-2010-520715

SUMMARY

Technical Problem

Incidentally, typically, an electronic apparatus desirably has a simple configuration, and a communication system is also expected to have a simple configuration.

It is desirable to provide a transmitter and a communication system that are capable of achieving a simple configuration.

Solution to Problem

At least the problems noted above are solved by the various embodiments of the present disclosure. Various exemplary illustrations of the subject matter of the disclosure are presented below. It will be understood that these exemplary illustrations are provided merely as examples to give a general idea of the subject matter of the present disclosure. The examples are not exhaustive of the subject matter disclosed, and other examples are possible that include features not included in the exemplary illustrations below and/or that exclude features included in the exemplary illustrations below.

According to an first exemplary illustration of the disclosure, a transmitter that sets voltages of first, second, and third output terminals based on first, second, and third signals may be provided. The transmitter may comprise: a first transmitting section configured to set the voltage of the first output terminal based on the first and third signals; a second transmitting section configured to set the voltage of the second output terminal based on the first and second signals; and a third transmitting section configured to set the voltage of the third output terminal based on the second and third signals.

According to a second exemplary illustration of the disclosure, a transmitter that sets voltages of first, second, and third output terminals based on first, second, and third signals may be provided. The transmitter may be operable in at least a differential transmission mode and a three-phase transmission mode. The transmitter may comprise: a first transmitting section, a second transmitting section, and a third transmitting section. The first transmitting section may be configured to: set the voltage of the first output terminal based on the first signal when the transmitter is operating in the differential transmission mode, and set the voltage of the first output terminal based on the first and third signals when the transmitter is operating in the three-phase transmission mode. The second transmitting section may be configured to: set the voltage of the second output terminal based on the second signal when the transmitter is operating in the differential transmission mode, and set the voltage of the second output terminal based on the first and second signals when the transmitter is operating in the three-phase transmission mode. The third transmitting section may be configured to: set the voltage of the third output terminal based on the third signal when the transmitter is operating in the differential transmission mode, and set the voltage of the third output terminal based on the third and second signals when the transmitter is operating in the three-phase transmission mode.

According to a third exemplary illustration of the present disclosure, a communication system may be provided. The communication system may comprise: a transmitter that sets voltages of first, second, and third output terminals based on first, second, and third signals, and a receiver connected to at least one of the first, second, and third, output terminals. The transmitter may comprise: a first transmitting section configured to set the voltage of the first output terminal based on the first and third signals; a second transmitting section configured to set the voltage of the second output terminal based on the first and second signals; and a third transmitting section configured to set the voltage of the third output terminal based on the second and third signals.

According to a fourth exemplary illustration of the present disclosure, an electronic apparatus may be provided. The electronic apparatus may comprise a communication system that includes a transmitter and a receiver. The transmitter may be the transmitter of any of the exemplary illustrations of the disclosure. The receiver may be connected to at least one of the first, second, and third, output terminals of the transmitter. The electronic apparatus may further include an image sensor that acquires image data and transmits the image data via the transmitter, and a processor that receives the image data via the receiver and performs processing on the image data.

Advantageous Effects of Invention

According to the transmitter (1) and the communication system of the respective embodiments of the disclosure, the voltage of the first output terminal is set based on the first signal and the third signal out of the first signal, the second signal, and the third signal, and the voltage of the second output terminal is set based on the first signal and the second signal. Therefore, it is possible to achieve a simple configuration.

According to the transmitter (2) of the embodiment of the disclosure, the first control circuit has the same circuit configuration as that of the second control circuit. Therefore, it is possible to achieve a simple configuration.

According to the transmitter (3) of the embodiment of the disclosure, each of the transmitting sections generates the value, based on two signals different between the transmitting sections, out of the first signal, the second signal, and the third signal. Therefore, it is possible to achieve a simple configuration.

Incidentally, effects described here are non-limiting. Effects achieved by the technology may be one or more of effects described in the present disclosure.

It is to be understood that both the foregoing general description and the following detailed description are exemplary, and are provided to provide further explanation of the technology as claimed.

BRIEF DESCRIPTION OF DRAWINGS

The accompanying drawings are included to provide a further understanding of the technology, and are incorporated in and constitute a part of this specification. The drawings illustrate embodiments and, together with the specification, serve to explain the principles of the technology.

FIG. 1 is a block diagram illustrating a configuration example of a transmitter according to embodiments of the disclosure.

FIG. 2 is a block diagram illustrating a configuration example of a transmitting section according to a first embodiment.

FIG. 3 is a circuit diagram illustrating a configuration example of a driver section illustrated in FIG. 2.

FIG. 4 is a block diagram illustrating a configuration example of a communication system to which the transmitter illustrated in FIG. 1 is applied.

FIG. 5 is a circuit diagram illustrating a configuration example of a receiver section illustrated in FIG. 4.

FIG. 6 is a block diagram illustrating another configuration example of the communication system to which the transmitter illustrated in FIG. 1 is applied.

FIG. 7 is a circuit diagram illustrating a configuration example of the receiver section illustrated in FIG. 6.

FIG. 8 is an explanatory diagram illustrating an operation example of the receiver section illustrated in FIG. 7.

FIG. 9 is a block diagram illustrating another configuration example of the communication system to which the transmitter illustrated in FIG. 1 is applied.

FIG. 10 is a circuit diagram illustrating a configuration example of the receiver section illustrated in FIG. 9.

FIG. 11 is an explanatory diagram illustrating an arrangement example of respective blocks in the transmitting section illustrated in FIG. 2.

FIG. 12A is an explanatory diagram illustrating an operation state of the transmitting section illustrated in FIG. 2 in an operation mode M1.

FIG. 12B is an explanatory diagram illustrating another operation state of the transmitting section illustrated in FIG. 2 in the operation mode M1.

FIG. 13 is a timing waveform chart illustrating an operation example of the transmitting section illustrated in FIG. 2.

FIG. 14 is an explanatory diagram illustrating an operation example of the transmitting section illustrated in FIG. 2 in an operation mode M2.

FIG. 15 is a table illustrating an operation example of the transmitting section illustrated in FIG. 2 in the operation mode M2.

FIG. 16 is an explanatory diagram illustrating an operation example of the transmitting section illustrated in FIG. 2 in an operation mode M3.

FIG. 17 is a block diagram illustrating a configuration example of a transmitting section according to a modification of the first embodiment.

FIG. 18 is a block diagram illustrating a configuration example of a transmitting section according to another modification of the first embodiment.

FIG. 19 is an explanatory diagram illustrating an arrangement example of respective blocks in a transmitting section according to still another example of the first embodiment.

FIG. 20 is a block diagram illustrating a configuration example of a transmitting section according to a still another modification of the first embodiment.

FIG. 21A is an explanatory diagram illustrating an operation state of the transmitting section illustrated in FIG. 20 in the operation mode M1.

FIG. 21B is an explanatory diagram illustrating another operation state of the transmitting section illustrated in FIG. 20 in the operation mode M1.

FIG. 22 is an explanatory diagram illustrating an operation example of the transmitting section illustrated in FIG. 20 in the operation mode M2.

FIG. 23 is a table illustrating an operation example of the transmission section illustrated in FIG. 20 in the operation mode M2.

FIG. 24 is an explanatory diagram illustrating an operation example of the transmitting section illustrated in FIG. 20 in the operation mode M3.

FIG. 25 is a block diagram illustrating a configuration example of a transmitting section according to a still another modification of the first embodiment.

FIG. 26 is a table illustrating an operation example of the transmitting section illustrated in FIG. 25 in the operation mode M2.

FIG. 27 is a block diagram illustrating a configuration example of a transmitting section according to still another modification of the first embodiment.

FIG. 28 is a table illustrating an operation example of the transmitting section illustrated in FIG. 27 in the operation mode M2.

FIG. 29 is a block diagram illustrating a configuration example of a transmitting section according to still another modification of the first embodiment.

FIG. 30 is a table illustrating an operation example of the transmitting section illustrated in FIG. 29 in the operation mode M2.

FIG. 31 is a block diagram illustrating a configuration example of a transmitting section according to a second embodiment.

FIG. 32 is a circuit diagram illustrating a configuration example of a driver section illustrated in FIG. 31.

FIG. 33A is an explanatory diagram illustrating an operation state of the transmitting section illustrated in FIG. 31 in the operation mode M1.

FIG. 33B is an explanatory diagram illustrating another operation state of the transmitting section illustrated in FIG. 31 in the operation mode M1.

FIG. 34 is an explanatory diagram illustrating an operation example of the transmitting section illustrated in FIG. 31 in the operation mode M2.

FIG. 35 is a table illustrating an operation example of the transmitting section illustrated in FIG. 31 in the operation mode M2.

FIG. 36 is an explanatory diagram illustrating an operation example of the transmitting section illustrated in FIG. 31 in the operation mode M3.

FIG. 37 is a block diagram illustrating a configuration example of a transmitting section according to a modification of the second embodiment.

FIG. 38 is a circuit diagram illustrating a configuration example of an encoder illustrated in FIG. 37.

FIG. 39 is a truth table illustrating an operation example of the encoder illustrated in FIG. 38.

FIG. 40 is a table illustrating an operation example of the transmitting section illustrated in FIG. 37 in the operation mode M2.

FIG. 41 is a block diagram illustrating a configuration example of a transmitting section according to another modification of the second embodiment.

FIG. 42 is a circuit diagram illustrating a configuration example of an encoder illustrated in FIG. 41.

FIG. 43 is a truth table illustrating an operation example of the encoder illustrated in FIG. 42.

FIG. 44 is a circuit diagram illustrating a configuration example of a driver section illustrated in FIG. 41.

FIG. 45A is an explanatory diagram illustrating an operation state of the transmitting section illustrated in FIG. 41 in the operation mode M1.

FIG. 45B is an explanatory diagram illustrating another operation state of the transmitting section illustrated in FIG. 41 in the operation mode M1.

FIG. 46 is an explanatory diagram illustrating an operation example of the transmitting section illustrated in FIG. 41 in the operation mode M2.

FIG. 47 is a table illustrating an operation example of the transmitting section illustrated in FIG. 41 in the operation mode M2.

FIG. 48 is an explanatory diagram illustrating an operation example of the transmitting section illustrated in FIG. 41 in the operation mode M3.

FIG. 49 is a perspective view illustrating an appearance configuration of a smartphone to which the transmitter according to any of the embodiments is applied.

FIG. 50 is a block diagram illustrating a configuration example of an application processor to which the transmitter according to any of the embodiments is applied.

FIG. 51 is a block diagram illustrating a configuration example of an image sensor to which the transmitter according to any of the embodiments is applied.

FIG. 52 is a block diagram illustrating a configuration example of a transmitting section according to another modification.

DESCRIPTION OF EMBODIMENTS

Hereinafter, some embodiments of the disclosure will be described in detail with reference to drawings. Note that description will be given in the following order.

1. First embodiment
2. Second embodiment
3. Application examples

1. First Embodiment

Configuration Example

FIG. 1 illustrates a configuration example of a transmitter according to an embodiment. A transmitter 1 transmits data with use of six signals. Note that a communication system according to an embodiment of the disclosure is embodied by the present embodiment, and thus will be described together. The transmitter 1 includes a processing section 9 and a transmitting section 10.

The processing section 9 performs predetermined processing to generate six groups of parallel signals DATA1 to DATA6. Each of the parallel signals DATA1 to DATA6 has a bit width of a plurality of bits.

The transmitting section 10 generates signals SIG1 to SIG6 and outputs the signals from output terminals Tout1 to Tout6, based on the parallel signals DATA1 to DATA6 and a mode selection signal MSEL. The transmitting section 10 includes serializers SER1 to SER6. The serializers SER1 to SER6 serialize the parallel signals DATA1 to DATA6 to generate signals S11 to S16, respectively. Each of the serializers SER1 to SER6 may include, for example, a shift register. Further, the transmitting section 10 generates the signals SIG1 to SIG6, based on the serial signals S11 to S16, respectively.

FIG. 2 illustrates a configuration example of the transmitting section 10. The transmitting section 10 includes, in addition to the serializers SER1 to SER6, exclusive-OR circuits 21 to 26, flip-flops (F/Fs) 31 to 36, selectors 37 to 39 and 41 to 46, OR circuits 51 to 56, driver sections DRV1 to DRV6, and a control section 20. Incidentally, signals between these circuits may be differential signals or single phase signals.

The exclusive-OR circuit 21 calculates an exclusive-OR (EX-OR) of the signal S11 and the signal S13, and outputs the result. The exclusive-OR circuit 22 calculates an exclusive-OR of the signal S11 and the signal S12, and outputs the result. The exclusive-OR circuit 23 calculates an exclusive-OR of the signal S12 and the signal S13, and outputs the result. The exclusive-OR circuit 24 calculates an exclusive-OR of the signal S14 and the signal S16, and outputs the result. The exclusive-OR circuit 25 calculates an exclusive-OR of the signal S14 and the signal S15, and outputs the result. The exclusive-OR circuit 26 calculates an exclusive-OR of the signal S15 and the signal S16, and outputs the result.

The flip-flop 31 samples the output signal of the exclusive-OR circuit 21 based on a clock signal CLK1 to output the result as a signal S31, and samples the signal S11 based on the clock signal CLK1 to output the result as a signal P31 and an inverted signal N31 of the signal P31. The flip-flop 32 samples the output signal of the exclusive-OR circuit 22 based on a clock signal CLK2 to output the result as a signal S32, and samples the signal S12 based on the clock signal CLK2 to output the result as a signal P32 and an inverted signal N32 of the signal P32. The flip-flop 33 samples the output signal of the exclusive-OR circuit 23 based on the clock signal CLK1 to output the result as a signal S33, and samples the signal S13 based on the clock signal CLK1 to output the result as a signal P33 and an inverted signal N33 of the signal P33. The flip-flop 34 samples the output signal of the exclusive-OR circuit 24 based on the clock signal CLK2 to output the result as a signal S34, and samples the signal S14 based on the clock signal CLK2 to output the result as a signal P34 and an inverted signal N34 of the signal P34. The flip-flop 35 samples the output signal of the exclusive-OR circuit 25 based on the clock signal CLK1 to output the result as a signal S35, and samples the signal S15 based on the clock signal CLK1 to output the result as a signal P35 and an inverted signal N35 of the signal P35. The flip-flop 36 samples the output signal of the exclusive-OR circuit 26 based on the clock signal CLK2 to output the result as a signal S36, and samples the signal S16 based on the clock signal CLK2 to output the result as a signal P36 and an inverted signal N36 of the signal P36.

The selector 37 selects and outputs one of the signals P32 and N32 based on a control signal SINV. The selector 38 selects and outputs one of the signals P34 and N34 based on the control signal SINV, and the selector 39 selects and outputs one of the signals P36 and N36 based on the control signal SINV.

The selector 41 selects one of the signals P31 and P32 based on a control signal SEL1 to output the selected signal as a signal S41. The selector 42 selects one of the signal N31 and the output signal of the selector 37 based on a control signal SEL2 to output the selected signal as a signal S42. The selector 43 selects one of the signals P33 and P34 based on the control signal SEL1 to output the selected signal as a signal S43. The selector 44 selects one of the signal N33 and the output signal of the selector 38 based on the control signal SEL2 to output the selected signal as a signal S44. The selector 45 selects one of the signals P35 and P36 based on the control signal SEL1 to output the selected signal as a signal S45. The selector 46 selects one of the signal N35 and the output signal of the selector 39 based on the control signal SEL2 to output the selected signal as a signal S46.

The OR circuit 51 calculates a logical sum (OR) of the signal S31 and a control signal MA, and outputs the result as a signal S51. The OR circuit 52 calculates a logical sum of the signal S32 and the control signal MA, and outputs the result as a signal S52. The OR circuit 53 calculates a logical sum of the signal S33 and the control signal MA, and outputs the result as a signal S53. The OR circuit 54 calculates a logical sum of the signal S34 and the control signal MA, and outputs the result as a signal S54. The OR circuit 55 calculates a logical sum of the signal S35 and the control signal MA, and outputs the result as a signal S55. The OR circuit 56 calculates a logical sum of the signal S36 and the control signal MA, and outputs the result as a signal S56.

The driver section DRV1 generates the signal SIG1 based on the signal S41 and the signal S51. The driver section DRV2 generates the signal SIG2 based on the signal S42 and the signal S52. The driver section DRV3 generates the signal SIG3 based on the signal S43 and the signal S53. The driver section DRV4 generates the signal SIG4 based on the signal S44 and the signal S54. The driver section DRV5 generates the signal SIG5 based on the signal S45 and the signal S55. The driver section DRV6 generates the signal SIG6 based on the signal S46 and the signal S56.

FIG. 3 illustrates a configuration example of the driver section DRV1. Incidentally, although the driver section DRV1 is described below as an example, the same applies to the driver sections DRV2 to DRV6. The driver section DRV1 includes AND circuits 61 and 62, transistors 63 and 64, and resistors 65 to 67. The AND circuit 61 calculates a logical product (AND) of the signal S41 and the signal S51, and outputs the result as a signal UP. The AND circuit 62 calculates a logical product of an inverted signal of the signal S41 and the signal S51, and outputs the result as a signal DN. Each of the transistors 63 and 64 is an N-channel metal oxide semiconductor (MOS) field effect transistor (FET) in this example. A gate of the transistor 63 is connected to an output terminal of the AND circuit 61, a drain thereof is connected to a first end of the resistor 65, and a source thereof is connected to a drain of the transistor 64 and a first end of the resistor 67. A gate of the transistor 64 is connected to an output terminal of the AND circuit 62, the drain thereof is connected to the source of the transistor 63 and the first end of the resistor 67, and a source thereof is connected to a first end of the resistor 66. The first end of the resistor 65 is connected to the drain of the transistor 63, and a second end thereof is supplied with a voltage V1. The voltage V1 may be, for example, about 400 [mV]. The first end of the resistor 66 is connected to the source of the transistor 64, and a second end thereof is grounded. The first end of the resistor 67 is connected to the source of the transistor 63 and the drain of the transistor 64, and a second end thereof is connected to an output terminal Tout1. In this example, a sum of the resistance value of the resistor 65, the resistance value of on resistance of the transistor 63, and the resistance value of the resistor 67 is about 50 [ohms]. Likewise, a sum of the resistance value of the resistor 66, the resistance value of on resistance of the transistor 64, and the resistance value of the resistor 67 is about 50 [ohms] in this example.

With this configuration, the driver section DRV1 sets the voltage of the output terminal Tout1 to one of three voltages (a high level voltage VH, a middle level voltage VM, and a low level voltage VL), based on the signal S41 and the signal S51. Specifically, when the signal S51 is "1", the driver section DRV1 sets the voltage of the output terminal Tout1 to the high level voltage VH or the low level voltage VL, in response to the signal S41. In other words, when the signal S41 is "1", the signal UP becomes "1" and the signal DN becomes "0". As a result, the transistor 63 is put into an ON state, the transistor 64 is put into an OFF state, and the voltage of the terminal Tout1 is set to the high level voltage VH. Moreover, when the signal S41 is "0", the signal UP becomes "0" and the signal DN becomes "1". As a result, the transistor 63 is put into the OFF state, the transistor 64 is put into the ON state, and the voltage of the terminal Tout1 is set to the low level voltage VL. On the other hand, when the signal S51 is "0", the signals UP and DN both become "0" irrespective of the signal S41. As a result, the transistors 63 and 64 are both put into the OFF state. At this time, as will be described later, the voltage of the terminal Tout1 is set to the middle level voltage VM through a terminating resistor of a receiver.

In other words, the signal S51 is a signal controlling whether the signal SIG1 is allowed to be the middle level voltage VM, and the driver section DRV1 sets the signal SIG1 to the middle level voltage VM when the signal S51 is "0" (active). Moreover, when the signal S51 is "1" (inactive), the driver section DRV1 sets the signal SIG1 to the high level voltage VH or the low level voltage VL, in response to the signal S41.

The control section 20 selects one of three operation modes M1 to M3, based on the mode selection signal MSEL, and controls the transmitting section 10 to operate in the selected operation mode. Here, the operation mode M1 is a mode in which data is transmitted to the receiver through differential signals, the operation mode M2 is a mode in which data is transmitted to the receiver through three-phase signals, and the operation mode M3 is a mode in which data is transmitted to the receiver through single-phase signals. The mode selection signal MSEL may be supplied from, for example, the outside of the transmitter 1. The control section 20 selects one of the three operation modes M1 to M3, based on the mode selection signal MSEL. Then, the control section 20 generates the clock signals CLK1 and CLK2 and the control signals SINV, SEL1, SEL2, and MA, based on the selected operation mode, and controls operation of each block in the transmitting section 10 with use of these control signals.

FIG. 4 illustrates a configuration example of a communication system 4 in which the transmitting section 10 operates in the operation mode M1. The communication system 4 includes the transmitter 1 and a receiver 110. The receiver 110 has receiver sections 111 to 113. In this mode, the driver sections DRV1 and DRV2 transmit the signals SIG1 and SIG2 to the receiver section 111 through transmission lines 101 and 102, respectively, the driver sections DRV3 and DRV4 transmit the signals SIG3 and SIG4 to the receiver section 112 through transmission lines 103 and 104, respectively, and the driver sections DRV5 and DRV6 transmit the signals SIG5 and SIG6 to the receiver section 113 through transmission lines 105 and 106, respectively. Here, characteristic impedance of each of the transmission lines 101 to 106 is about 50 [ohms]. Moreover, the signals SIG1 and SIG2 configure a differential signal, the signals SIG3 and SIG4 configure a differential signal, and the signals SIG5 and SIG6 configure a differential signal. In other words, for example, one of the signals SIG1 and SIG2 is the high level voltage VH, and the other is the low level voltage VL. Then, the receiver section 111 receives the signals SIG1 and SIG2, the receiver section 112 receives the signals SIG3 and SIG4, and the receiver section 113 receives the signals SIG5 and SIG6. Incidentally, in this example, the three receiver sections 111 to 113 are provided in one receiver 110 to transmit data to the receiver 110; however, the configuration is not limited thereto, and alternatively, for example, one receiver section may be provided in each of three receivers, and data may be transmitted to each of the three receivers.

FIG. 5 illustrates a configuration example of the receiver section 111. Note that the receiver section 111 is described below as an example; however, the same applies to the receiver sections 112 and 113. The receiver section 111 includes a resistor 116 and an amplifier 117. The resistor 116 functions as a terminating resistor of the communication system 4, and the resistance value thereof is about 100 [ohms] in this example. A first end of the resistor 116 is connected to an input terminal Tin11 and the like and is supplied with the signal SIG1, and a second end thereof is connected to an input terminal Tin12 and the like and is supplied with the signal SIG2. The amplifier 117 outputs "1" or "0" depending on a difference between the signal at a positive input terminal and the signal at a negative input terminal. The positive input terminal of the amplifier 117 is connected to the first end of the resistor 116 and the input terminal Tin11, and is supplied with the signal SIG1. The negative input terminal thereof is connected to the second end of the resistor 116 and the input terminal Tin12, and is supplied with the signal SIG2.

With this configuration, in the communication system 4, data is allowed to be transmitted and received through the differential signals.

FIG. 6 illustrates a configuration example of a communication system 5 in which the transmitting section 10 operates in the operation mode M2. The communication system 5 includes the transmitter 1 and a receiver 120. The receiver 120 has receiver sections 121 and 122. In this mode, the driver sections DRV1 to DRV3 transmit the signals SIG1 to SIG3 to the receiver section 121 through the signal lines 101 to 103, respectively, and the driver sections DRV4 to DRV6 transmit the signals SIG4 to SIG6 to the receiver section 122 through the signal lines 104 to 106, respectively.

Here, the signals SIG1 to SIG3 configure a three-phase signal, and the signals SIG4 to SIG6 configure a three-phase signal. In other words, the signals SIG1 to SIG3 become voltage levels (the high level voltage VH, the low level voltage VL, and the middle level voltage VM) different from one another. Further, the receiver section 121 receives the signals SIG1 to SIG3, and the receiver section 122 receives the signals SIG4 to SIG6.

FIG. 7 illustrates a configuration example of the receiver section 121. Incidentally, the receiver section 121 is described below as an example; however, the same applies to the receiver section 122. The receiver section 121 includes resistors 124 to 126 and amplifiers 127 to 129. Each of the resistors 124 to 126 functions as a terminating resistor of the communication system 5, and the resistance value of each of the resistors 124 to 126 is about 50 [ohms] in this example. A first end of the resistor 124 is connected to an input terminal Tin21 and the like and is supplied with the signal SIG1, and a second end thereof is connected to a second end of each of the resistors 125 and 126. A first end of the resistor 125 is connected to an input terminal Tin22 and the like and is supplied with the signal SIG2, and the second end thereof is connected to the second end of each of the resistors 124 and 126. A first end of the resistor 126 is connected to an input terminal Tin23 and the like and is supplied with the signal SIG3, and the second end thereof is connected to the second end of each of the resistors 124 and 126. A positive input terminal of the amplifier 127 is connected to a negative input terminal of the amplifier 129, the first end of the resistor 124, and the input terminal Tin21, and is supplied with the signal SIG1. A negative input terminal thereof is connected to a positive input terminal of the amplifier 128, the first end of the resistor 125, and the input terminal Tin22, and is supplied with the signal SIG2. The positive input terminal of the amplifier 128 is connected to the negative input terminal of the amplifier 127, the first end of the resistor 125, and the input terminal Tin22, and is supplied with the signal SIG2. A negative input terminal thereof is connected to a positive input terminal of the amplifier 129, the first end of the resistor 126, and the input terminal Tin23, and is supplied with the signal SIG3. The positive input terminal of the amplifier 129 is connected to the negative input terminal of the amplifier 128, the first end of the resistor 126, and the input terminal Tin23, and is supplied with the signal SIG3. The negative input terminal thereof is connected to the positive input terminal of the amplifier 127, the first end of the resistor 124, and the input terminal Tin21, and is supplied with the signal SIG1.

FIG. 8 illustrates an operation example of the receiver section 121. In this example, the signal SIG1 is the high level voltage VH, and the signal SIG2 is the low level voltage VL. At this time, the voltage of the signal SIG3 is set to the middle level voltage VM by the resistors 124 to 126. In this case, a current Iin flows through the input terminal Tin21, the resistor 124, the resistor 125, and the input terminal Tin22 in order. Then, the high level voltage VH is supplied to the positive input terminal of the amplifier 127, and the low level voltage VL is supplied to the negative input terminal thereof, and thus the amplifier 127 outputs "1". In addition, the low level voltage VL is supplied to the positive input terminal of the amplifier 128 and the middle level voltage VM is supplied to the negative input terminal thereof, and thus the amplifier 128 outputs "0". Further, the middle level voltage VM is supplied to the positive input terminal of the amplifier 129 and the high level voltage VH is supplied to the negative input terminal thereof, and thus the amplifier 129 outputs "0".

With this configuration, in the communication system 5, data is allowed to be transmitted and received through the three-phase signals.

FIG. 9 illustrates a configuration example of a communication system 6 in which the transmitting section 10 operates in the operation mode M3. The communication system 6 includes the transmitter 1 and a receiver 130. The receiver 130 has receiver sections 131 to 136. In this mode, the driver sections DRV1 to DRV6 transmit the signals SIG1 to SIG6 to the receiver sections 131 to 136 through the transmission lines 101 to 106, respectively. Here, each of the signals SIG1 to SIG6 is a single-phase signal. Further, the receiver sections 131 to 136 receive the signals SIG1 to SIG6, respectively.

FIG. 10 illustrates a configuration example of the receiver section 131. Incidentally, the receiver section 131 is described below as an example; however, the same applies to the receiver sections 132 to 136. The receiver section 131 has a resistor 138 and an amplifier 139. The resistor 138 functions as a terminating resistor of the communication system 6, and the resistance value thereof is about 50 [ohms] in this example. A first end of the resistor 138 is connected to an input terminal Tin31 and the like, and is supplied with the signal SIG1. A second end thereof is supplied with a bias voltage V2. A positive input terminal of the amplifier 139 is connected to the first end of the resistor 138 and the input terminal Tin31 and is supplied with the signal SIG1, and a negative input terminal thereof is supplied with a bias voltage V3.

With this configuration, in the communication system 6, data is allowed to be transmitted and received through single-phase signals.

Next, layout of the transmitting section 10 will be described.

FIG. 11 illustrates a circuit arrangement of respective blocks in the transmitting section 10. In FIG. 11, pads PAD1 to PAD6 and electro-static discharge (ESD) protection circuits ESD1 to ESD6 are illustrated together. The pads PAD1 to PAD6 correspond to the output terminals Tout1 to Tout6, respectively, and the ESD protection circuits ESD1 to ESD6 are arranged near the pads PAD1 to PAD6, respectively. Incidentally, in FIG. 11, the selectors 37 to 39 and 41 to 46 are omitted. Solid arrows indicate flows of signals from the serializers SER1 to SER6 to the exclusive-OR circuits 21 to 26 and flows of signals from the OR circuits 51 to 56 to the driver sections DRV1 to DRV6.

In this example, the serializer SER1, the exclusive-OR circuit 21, the flip-flop 31, the OR circuit 51, and the driver section DRV1 are so arranged to be close to one another. Likewise, the serializer SER2, the exclusive-OR circuit 22, the flip-flop 32, the OR circuit 52, and the driver section DRV2 are so arranged to be close to one another. The serializer SER3, the exclusive-OR circuit 23, the flip-flop 33, the OR circuit 53, and the driver section DRV3 are so arranged to be close to one another. The serializer SER4, the exclusive-OR circuit 24, the flip-flop 34, the OR circuit 54, and the driver section DRV4 are so arranged to be close to one another. The serializer SER5, the exclusive-OR circuit 25, the flip-flop 35, the OR circuit 55, and the driver section DRV5 are so arranged to be close to one another. The serializer SER6, the exclusive-OR circuit 26, the flip-flop 36, the OR circuit 56, and the driver section DRV6 are so arranged to be close to one another. In this example, such layout allows the order of the arrangement of the pads PAD1 to PAD6 to be the same order of the arrangement of the serializers SER1 to SER6.

Here, the signal S11 corresponds to a specific but non-limiting example of "first signal" in the disclosure, the signal S12 corresponds to a specific but non-limiting example of "second signal" in the disclosure, and the signal S13 corresponds to a specific but non-limiting example of "third signal" in the disclosure. The output terminal Tout1 corresponds to a specific but non-limiting example of "first output terminal" in the disclosure, the output terminal Tout2 corresponds to a specific but non-limiting example of "second output terminal" in the disclosure, and the output terminal Tout3 corresponds to a specific but non-limiting example of "third output terminal" in the disclosure. The exclusive-OR circuit 21 and the driver section DRV1 correspond to a specific but non-limiting example of "first transmitting section" in the disclosure, the exclusive-OR circuit 22 and the driver section DRV2 correspond to a specific but non-limiting example of "second transmitting section" in the disclosure, and the exclusive-OR circuit 23 and the driver section DRV3 correspond to a specific but non-limiting example of "third transmitting section" in the disclosure. The exclusive-OR circuit 21 corresponds to a specific but non-limiting example of "first control circuit" in the disclosure, and the exclusive-OR circuit 22 corresponds to a specific but non-limiting example of "second control circuit" in the disclosure. The driver section DRV1 corresponds to a specific but non-limiting example of "first driver section" in the disclosure, and the driver section DRV2 corresponds to a specific but non-limiting example of "second driver section" in the disclosure.

(Operation and Function)

Subsequently, operation and function of the transmitter 1 of the present embodiment will be described.

(Overall Operation Outline)

First, overall operation outline of the transmitter 1 is described with reference to FIGS. 1, 2, and the like. The processing section 9 generates the six groups of parallel signals DATA1 to DATA6. The transmitting section 10 generates the signals SIG1 to SIG6, based on the parallel signals DATA1 to DATA6 and the mode selection signal MSEL, and transmits the signals SIG1 to SIG6 to the receiver through the transmission lines 101 to 106. The control section 20 of the transmitting section 10 selects one of the three operation modes M1 to M3, based on the mode selection signal MSEL, and controls the transmitting section 10 to operate in the selected operation mode.

(Operation Mode M1)

In the operation mode M1, the transmitter 1 transmits data to the receiver through the differential signals. The detailed operation in the operation mode M1 will be described below.

FIGS. 12A and 12B each illustrates an operation example of the transmitting section 10 in the operation mode M1, where FIG. 12A illustrates one operation state, and FIG. 12B illustrates another operation state. In FIGS. 12A and 12B, each of the selectors 37 to 39 and 41 to 46 is illustrated as a switch indicating the operation state thereof. Incidentally, thick lines indicate major signal paths in each operation state.

In the operation mode M1, the control section 20 generates the clock signals CLK1 and CLK2 that are shifted in phase by 180 degrees from each other. Then, the control section 20 supplies the clock signal CLK1 to the flip-flops 31, 33, and 35, and supplies the clock signal CLK2 to the flip-flops 32, 34, and 36. Further, the control section 20 supplies the control signal SINV to the selectors 37, 38, and 39, and controls the selector 37 to select and output the signal N32, controls the selector 38 to select and output the signal N34, and controls the selector 39 to select and output the signal N36.

Moreover, the control section 20 supplies the control signal SEL1 to the selector 41 and controls the selector 41 to alternately select and output the signal P31 and the signal P32, as well as supplies the control signal SEL2 to the selector 42 and controls the selector 42 to alternately select and output the signal N31 and the output signal (the signal N32) of the selector 37. At this time, the control section 20 controls the selectors 41 and 42 so that the selector 42 selects the signal N31 when the selector 41 selects and outputs the signal P31 (FIG. 12A), and controls the selectors 41 and 42 so that the selector 42 selects the signal N32 when the selector 41 selects and outputs the signal P32 (FIG. 12B).

FIG. 13 illustrates a timing waveform chart illustrating an operation example of the selectors 41 and 42, where (A) illustrates a waveform of the signal P31 or the signal N31, (B) illustrates a waveform of the signal P32 or the signal N32, and (C) illustrates a waveform of the signal S41 or the signal S42. In this example, the flop-flop 31 outputs data S0, S2, S4, . . . in this order as the signals P31 and N31 in synchronization with the clock signal CLK1, and the flip-flop 32 outputs data S1, S3, S5, . . . in this order as the signals P32 and N32 in synchronization with the clock signal CLK2. At this time, since the clock signals CLK1 and CLK2 are shifted in phase by 180 degrees from each other, the transition timing of the signals P31 and N31 is shifted from the transition timing of the signals P32 and N32. In a period T1 in which the data of the signals P31 and N31 is stable ((A) of FIG. 13), the selector 41 selects the signal P31 and outputs the signal P31 as the signal S41, and the selector 42 selects the signal N31 and outputs the signal N31 as the signal S42 ((C) of FIG. 13). In addition, in a period T2 in which the data of the signals P32 and N32 is stable ((B) of FIG. 13), the selector 41 selects the signal P32 and outputs the signal P32 as the signal S41, and the selector 42 selects the signal N32 and outputs the signal N32 as the signal S42 ((C) of FIG. 13). Here, the signal N31 is an inverted signal of the signal P31, and the signal N32 is an inverted signal of the signal P32. Therefore, the signal S42 is an inverted signal of the signal S41. As a result of such operation, the data S0, S1, S2, . . . are arranged in this order in the signals S41 and S42. In other words, in the operation mode M1, the selectors 41 and 42 function as serializers of 2:1.

Likewise, the control section 20 supplies the control signal SEL1 to the selector 43 and controls the selector 43 to alternately select and output the signal P33 and the signal P34, as well as supplies the control signal SEL2 to the selector 44 and controls the selector 44 to alternately select and output the signal N33 and the output signal (the signal N34) of the selector 38. Then, the control section 20 supplies the control signal SEL1 to the selector 45 and controls the selector 45 to alternately select and output the signal P35 and the signal P36, as well as supplies the control signal SEL2 to the selector 46 and controls the selector 46 to alternately select and output the signal N35 and the output signal (the signal N36) of the selector 39.

Further, the control section 20 supplies the control signal MA indicating "1" to the OR circuits 51 to 56. Accordingly, the signals S51 to S56 each become "1". As a result, the driver sections DRV1 to DRV6 set the signals SIG1 to SIG6 to the high level voltage VH or the low level voltage VL in response to the signals S41 to S46, respectively. At this time, since the signal S41 and the signal S42 are inverted from each other, the signals SIG1 and SIG2 configure a differential signal. Likewise, the signals SIG3 and SIG4 configure a differential signal, and the signals SIG5 and SIG6 configure a differential signal.

In this way, in the operation mode M1, the transmitter 1 transmits the data to the receiver through the differential signals.

(Operation Mode M2)

In the operation mode M2, the transmitter 1 transmits the data to the receiver through three-phase signals. The detailed operation in the operation mode M2 will be described below.

FIG. 14 illustrates an operation example of the transmitting section 10 in the operation mode M2. In the operation mode M2, the control section 20 generates the clock signals CLK1 and CLK2 that are substantially equivalent in phase to each other. Then, the control section 20 supplies the clock signal CLK1 to the flop-flops 31, 33, and 35, and supplies the clock signal CLK2 to the flip-flops 32, 34, and 36. Moreover, the control section 20 supplies the control signal SINV to the selectors 37, 38, and 39, and controls the selector 37 to select and output the signal P32, controls the selector 38 to select and output the signal P34, and controls the selector 39 to select and output the signal P36.

Further, the control section 20 supplies the control signal SEL1 to the selector 41 and controls the selector 41 to select the signal P31 and output the signal P31 as the signal S41, supplies the control signal SEL2 to the selector 42 and controls the selector 42 to select the output signal (the signal P32) of the selector 37 and output the selected signal as the signal S42, and supplies the control signal SEL1 to the selector 43 and controls the selector 43 to select the signal P33 and output the selected signal as the signal S43. Likewise, the control section 20 supplies the control signal SEL2 to the selector 44 and controls the selector 44 to select the output signal (the signal P34) of the selector 38 and output the selected signal as the signal S44, supplies the control signal SEL1 to the selector 45 and controls the selector 45 to select the signal P35 and output the selected signal as the signal S45, and supplies the control signal SEL2 to the selector 46 and controls the selector 46 to select the output signal (the signal P36) of the selector 39 and output the selected signal as the signal S46.

Moreover, the control section 20 supplies the control signal MA indicating "0" to the OR circuits 51 to 56. Accordingly, the signals S51 to S56 become the signals same as the signals S31 to S36, respectively. As a result, the driver sections DRV1 to DRV3 set the signals SIG1 to SIG3 to the three voltages (the high level voltage VH, the middle level voltage VM, and the low level voltage VL) that are different from one another, based on the signals S41 to S43 and the signals S51 to S53, respectively. Likewise, the driver sections DRV4 to DRV6 set the signals SIG4 to SIG6 to the three voltages that are different from one another, based on the signals S44 to S46 and the signals S54 to S56, respectively.

FIG. 15 illustrates operation of the driver sections DRV1 to DRV3. Note that the same applies to operation of the driver sections DRV4 to DRV6.

For example, when the signals S11, S12, and S13 are "1", "0", and "0", respectively, the signals S51, S52, and S53 become "1", "1", and "0", respectively. Therefore, the driver section DRV1 sets the signal SIG1 to the high level voltage VH because the signal S41 (the signal S11) is "1" and the signal S51 is "1". In addition, the driver section DRV2 sets the signal SIG2 to the low level voltage VL because the signal S42 (the signal S12) is "0" and the signal S52 is "1". Further, the driver section DRV3 sets the signal SIG3 to the middle level voltage VM because the signal S53 is "0".

Moreover, for example, when the signals S11, S12, and S13 are "0", "1", and "0", respectively, the signals S51, S52, and S53 become "0", "1", and "1", respectively. Therefore, the driver section DRV1 sets the signal SIG1 to the middle level voltage VM because the signal S51 is "0". In addition, the driver section DRV2 sets the signal SIG2 to the high level voltage VH because the signal S42 (the signal S12) is "1" and the signal S52 is "1". Further, the driver section DRV3 sets the signal SIG3 to the low level voltage VL because the signal S43 (the signal S13) is "0" and the signal S53 is "1".

Moreover, for example, when the signals S11, S12, and S13 are "0", "0", and "1", respectively, the signals S51, S52, and S53 become "1", "0", and "1", respectively. Therefore, the driver section DRV1 sets the signal SIG1 to the low level voltage VL because the signal S41 (the signal S11) is "0" and the signal S51 is "1". Moreover, the driver section DRV2 sets the signal SIG2 to the middle level voltage VM because the signal S52 is "0". Further, the driver section DRV3 sets the signal SIG3 to the high level voltage VH because the signal S43 (the signal S13) is "1" and the signal S53 is "1".

In this way, in the operation mode M2, the transmitter 1 transmits the data to the receiver through the three-phase signals.

(Operation Mode M3)

In the operation mode M3, the transmitter 1 transmits the data to the receiver through single-phase signals. The detailed operation in the operation mode M3 will be described below.

FIG. 16 illustrates an operation example of the transmitting section 10 in the operation mode M3. In the operation mode M3, the control section 20 generates the clock signals CLK1 and CLK2 that are substantially equivalent in phase to each other. Then, the control section 20 supplies the clock signal CLK1 to the flip-flops 31, 33, and 35, and supplies the clock signal CLK2 to the flip-flops 32, 34, and 36. Further, the control section 20 supplies the control signal SINV to the selectors 37, 38, and 39, and controls the selector 37 to select and output the signal P32, controls the selector 38 to select and output the signal P34, and controls the selector 39 to select and output the signal P36.

Moreover, the control section 20 supplies the control signal SEL1 to the selector 41 and controls the selector 41 to select the signal P31 and output the selected signal as the signal S41. The control section 20 supplies the control signal SEL2 to the selector 42 and controls the selector 42 to select the output signal (the signal P32) of the selector 37 and output the selected signal as the signal S42. The control section 20 supplies the control signal SEL1 to the selector 43 and controls the selector 43 to select the signal P33 and output the selected signal as the signal S43. The control section 20 supplies the control signal SEL2 to the selector 44 and controls the selector 44 to select the output signal (the signal P34) of the selector 38 and output the selected signal as the signal S44. The control section 20 supplies the control signal SEL1 to the selector 45 and controls the selector 45 to select the signal P35 and output the selected signal as the signal S45. The control section 20 supplies the control signal SEL2 to the selector 46 and controls the selector 46 to select the output signal (the signal P36) of the selector 39 and output the selected signal as the signal S46.

Moreover, the control section 20 supplies the control signal MA indicating "1" to the OR circuits 51 to 56. Accordingly, the signals S51 to S56 each become "1". As a result, the driver sections DRV1 to DRV6 set the signals SIG1 to SIG6 to the high level voltage VH or the low level voltage VL in response to the signals S41 to S46, respectively.

In this way, in the operation mode M3, the transmitter 1 transmits the data to the receiver through the single-phase signals.

As described above, in the transmitter 1, the plurality of operation modes M1 to M3 are provided and data is allowed to be transmitted to the receiver through the differential signals, the three-phase signals, and the single-phase signals. Therefore, it is possible to realize various interfaces. As a result, for example, it may be possible to enhance flexibility of system design of electronic apparatuses. Specifically, for example, when the transmitting section 10 is mounted on a processor, an electronic apparatus may be configured using a peripheral device handling the three-phase signals, or may be configured using a peripheral device handling the differential signals. Further, for example, it is possible to realize various interfaces by one processor, and thus preparation of the processor for each interface is unnecessary. Therefore, it is possible to reduce the number of kinds of processors, which makes it possible to reduce cost. Moreover, the serializers SER1 to SER6, the flip-flops 31 to 36, the driver sections DRV1 to DRV6, and the like are commonly used in the respective operation modes M1 to M3. Therefore, it is possible to suppress an area necessary for the circuit arrangement, as compared with the case where a circuit is separately provided for each interface.

Moreover, in the transmitter 1, in the operation mode M2, as illustrated in FIG. 15, the signals S11 to S13 are allowed to correspond to the signals SIG1 to SIG3, the signal SIG1 is generated based on the two signals S11 and S13, the signal SIG2 is generated based on the two signals S11 and S12, and the signal SIG3 is generated based on the two signals S12 and S13. Therefore, it is possible to simplify the circuit configuration. Specifically, there are six combinations such that the signals SIG1 to SIG3 become three voltages (the high level voltage VH, the middle level voltage VM, and the low level voltage VL) different from one another, as illustrated in FIG. 15. Therefore, the six combinations of the signals SIG1 to SIG3 are allowed to be generated based on three-bit signals. For example, such a circuit may be configured in such a manner that the signal SIG1 may be generated based on the three-bit signals, the signal SIG2 may be generated based on the three-bit signals, and the signal SIG3 may be generated based on the three-bit signals. However, when the circuit is configured in such a manner that the signal SIG1 is generated, the signal SIG2 is generated, and then the signal SIG3 is generated each based on the three-bit signals, the circuit configuration may be complicated. In such a case, for example, the circuit size may become large, and for example, latency may become large. On the other hand, in the transmitter 1, the three-bit signals are defined as the signals S11 to S13 (FIG. 15). Therefore, the signal SIG1 is allowed to be generated based on the two signals S11 and S13, the signal SIG2 is allowed to be generated based on the two signals S11 and S12, and the signal SIG3 is allowed to be generated based on the two signals S12 and S13. More specifically, for example, at the time of generating the signal SIG1, when the signal S11 and the signal S13 are equivalent to each other, the signal SIG1 is set to the middle level voltage VM, and when the signal S11 and the signal S13 are different from each other, the signal SIG1 is set to the high level voltage VH or the low level voltage VL in response to the signal S11. Specifically, for example, the signal SIG1 is allowed to be generated with use of one exclusive-OR circuit 21 and one driver section DRV1. As a result, in the transmitter 1, it is possible to simplify the circuit configuration.

(Effects)

As described above, in the present embodiment, in the operation mode M2, each of the signals SIG1 to SIG3 is generated based on two of the three signals S11 to S13. Therefore, it is possible to realize a simple configuration.

(Modification 1-1)

In the above-described embodiment, the three operation modes M1 to M3 are provided. However, the configuration is not limited thereto. Alternatively, for example, as with a transmitting section 10A illustrated in FIG. 17, the transmitting section may be configured to operate only in the operation mode M2. The transmitting section 10A includes the exclusive-OR circuits 21 to 26, the flip-flops 31 to 36, the driver sections DRV1 to DRV6, and a clock signal generation section 20A. The flip-flop 31 samples the output signal of the exclusive-OR circuit 21 based on a clock signal CLK and outputs the result as the signal S51, as well as samples the signal S11 based on the clock signal CLK and outputs the result as the signal S41. The same applies to the flip-flops 32 to 36. The clock signal generation section 20A generates the clock signal CLK. Specifically, the transmitting section 10A is configured by omitting the selectors 37 to 39 and 41 to 46 and the OR circuits 51 to 56 and replacing the control section 20 with the clock signal generation section 20A in the transmitting section 10 (FIG. 2) according to the above-described embodiment. Even with this configuration, it is possible to obtain effects similar to those of the above-described embodiment.

(Modification 1-2)

In the above-described embodiment, the transmitting section 10 generates the six signals SIG1 to SIG6; however, the number of signals is not limited thereto, and alternatively, for example, the transmitting section may generate five or less signals or seven or more signals. An example in which the present modification is applied to the modification 1-1 to generate three signals SIG1 to SIG 3 is illustrated in FIG. 18. Even with this configuration, it is possible to obtain effects similar to those of the above-described embodiment.

(Modification 1-3)

In the above-described embodiment, as illustrated in FIG. 11, the arrangement order of the pads PAD1 to PAD6 and the arrangement order of the serializers SER1 to SER6 are the same as each other. However, the arrangement order is not limited thereto, and alternatively, for example, as illustrated in FIG. 19, the arrangement order of the pads PAD1 to PAD6 may be different from the arrangement order of the serializers SER1 to SER6. In this example, the serializer SER3, the exclusive-OR circuit 22, the flip-flop 32, the OR circuit 52, and the driver section DRV2 are so arranged as to be close to one another. The serializer SER2, the exclusive-OR circuit 23, the flip-flop 33, the OR circuit 53, and the driver section DRV3 are so arranged to be close to one another. The serializer SER6, the exclusive-OR circuit 25, the flip-flop 35, the OR circuit 55, and the driver section DRV5 are so arranged as to be close to one another. The serializer SER5, the exclusive-OR circuit 26, the flip-flop 36, the OR circuit 56, and the driver section DRV6 are so arranged to be close to one another. In other words, the example of FIG. 19 is configured in such a manner that the serializer SER2 is interchanged with the serializer SER3, and the serializer SER5 is interchanged with the serializer SER6 in the example of FIG. 11. As a result, in the present modification, it is possible to suppress variation in length of the signal paths from the serializers SER1 to SER6 to the exclusive-OR circuits 21 to 26. Specifically, in the example illustrated in FIG. 11, for example, the signal path from the serializer SER3 to the exclusive-OR circuit 21 is longer than the other signal paths. Therefore, the signal passing through this signal path is delayed, and as a result, the waveform of the signal SIG1 and the like may be disturbed. On the other hand, in the present modification (FIG. 19), since variation in length of the signal paths from the serializers SER1 to SER6 to the exclusive-OR circuits 21 to 26 are allowed to be suppressed, it is possible to reduce possibility that the waveforms of the respective signals SIG1 to SIG6 are disturbed.

(Modification 1-4)

In the above-described embodiment, the three operation modes M1 to M3 are provided. At this time, for example, the operation frequency may be changed based on the operation mode selected from the operation modes M1 to M3, or the number of stages of the shift resistors in each of the serializers SER1 to SER6 may be changed.

(Modification 1-5)

In the above-described embodiment, the signals S11 to S13 are allowed to correspond to the signals SIG1 to SIG3 as illustrated in FIG. 15; however, the configuration is not limited thereto. The present modification will be described below by giving some examples.

FIG. 20 illustrates a configuration example of a transmitting section 10E in a transmitter 1E according to the present modification. The transmitting section 10E includes NAND circuits 41E to 46E, exclusive-OR circuits 51E to 56E, and selectors 61E to 66E.

The NAND circuit 41E calculates inverted logical product (NAND) of the inverted signal of the signal S11 and the signal S13, and outputs the result. The NAND circuit 42E calculates inverted logical product of the inverted signal of the signal S12 and the signal S11, and outputs the result. The NAND circuit 43E calculates inverted logical product of the inverted signal of the signal S13 and the signal S12, and outputs the result. The NAND circuit 44E calculates inverted logical product of the inverted signal of the signal S14 and the signal S16, and outputs the result. The NAND circuit 45E calculates inverted logical product of the inverted signal of the signal S15 and the signal S14, and outputs the result. The NAND circuit 46E calculates inverted logical product of the inverted signal of the signal S16 and the signal S15, and outputs the result.

The exclusive-OR circuit 51E calculates exclusive logical sum of the signal S11 and the signal S13, and outputs the result. The exclusive-OR circuit 52E calculates exclusive logical sum of the signal S11 and the signal S12, and outputs the result. The exclusive-OR circuit 53E calculates exclusive logical sum of the signal S11 and the signal S13, and outputs the result. The exclusive-OR circuit 54E calculates exclusive logical sum of the signal S14 and the signal S16, and outputs the result. The exclusive-OR circuit 55E calculates exclusive logical sum of the signal S14 and the signal S15, and outputs the result. The exclusive-OR circuit 56E calculates exclusive logical sum of the signal S15 and the signal S16, and outputs the result.

The selector 61E selects one of the signal S11 and the output signal of the exclusive-OR circuit 51E based on the control signal MA, and outputs the selected signal. The selector 62E selects one of the signal S12 and the output signal of the exclusive-OR circuit 52E based on the control signal MA, and outputs the selected signal. The selector 63E selects one of the signal S13 and the output signal of the exclusive-OR circuit 53E based on the control signal MA, and outputs the selected signal. The selector 64E selects one of the signal S14 and the output signal of the exclusive-OR circuit 54E based on the control signal MA, and outputs the selected signal. The selector 65E selects one of the signal S15 and the output signal of the exclusive-OR circuit 55E based on the control signal MA, and outputs the selected signal. The selector 66E selects one of the signal S16 and the output signal of the exclusive-OR circuit 56E based on the control signal MA, and outputs the selected signal.

Then, similarly to the case of the above-described embodiment, the flip-flop 31 samples the output signal of the NAND circuit 41E based on the clock signal CLK1 and outputs the result as the signal S31, as well as samples the output signal of the selector 61E based on the clock signal CLK1 and outputs the result as the signal P31 and the inverted signal N31. The same applies to the flip-flops 32 to 36.

FIGS. 21A and 21B each illustrate an operation example of the transmitting section 10E in the operation mode M1, where FIG. 21A illustrates one operation state, and FIG. 21B illustrates another operation state. In the operation mode M1, the control section 20 supplies the control signal MA to the selectors 61E to 66E to control the selectors 61E to 66E to select and output the signals S11 to S16, respectively. Accordingly, in the operation mode M1, the transmitter 1E transmits data to the receiver through the differential signals, similarly to the case of the above-described embodiment (FIGS. 12A and 12B).

FIG. 22 illustrates an operation example of the transmitting section 10E in the operation mode M2. FIG. 23 illustrates operation of the driver sections DRV1 to DRV3 in the operation mode M2. In the operation mode M2, the control section 20 supplies the control signal MA to the selectors 61E to 66E to control the selectors 61E to 66E to select and output the output signals of the exclusive-OR circuits 51E to 56E, respectively.

As a result, as illustrated in FIG. 23, for example, when the signals S11, S12, and S13 are "1", "1", and "0", respectively, the signals S41, S42, and S43 become "1", "0", and "1", respectively, and the signals S51, S52, and S53 become "1", "1", and "0", respectively. Therefore, the driver section DRV1 sets the signal SIG1 to the high level voltage VH because the signals S41 and S51 are "1" and "1", respectively. Moreover, the driver section DRV2 sets the signal SIG2 to the low level voltage VL because the signals S42 and S52 are "0" and "1", respectively. Further, the driver section DRV3 sets the signal SIG3 to the middle level voltage VM because the signal S53 is "0". Therefore, in the operation mode M2, the transmitter 1E transmits data to the receiver through the three-phase signals, similarly to the case of the above-described embodiment (FIG. 14).

FIG. 24 illustrates an operation example of the transmitting section 10E in the operation mode M3. In the operation mode M3, the control section 20 supplies the control signal MA to the selectors 61E to 66E to control the selectors 61E to 66E to select and output the signals S11 to S16, respectively. Accordingly, in the operation mode M3, the transmitter 1E transmits data to the receiver through the single-phase signals, similarly to the case of the above-described embodiment (FIG. 16).

FIG. 25 illustrates a configuration example of a transmitting section 10F in another transmitter 1F according to the present modification. The transmitting section 10F includes NAND circuits 41F to 46F and exclusive-NOR circuits 51F to 56F.

The NAND circuit 41F calculates inverted logical product (NAND) of the inverted signal of the signal S13 and the signal S11 and outputs the result. The NAND circuit 42F calculates inverted logical product of the inverted signal of the signal S11 and the signal S12 and outputs the result. The NAND circuit 43F calculates inverted logical product of the inverted signal of the signal S12 and the signal S13 and outputs the result. The NAND circuit 44F calculates inverted logical product of the inverted signal of the signal S16 and the signal S14 and outputs the result. The NAND circuit 45F calculates inverted logical product of the inverted signal of the signal S14 and the signal S15 and outputs the result. The NAND circuit 46F calculates inverted logical product of the inverted signal of the signal S15 and the signal S16 and outputs the result.

The exclusive-NOR circuit 51F calculates exclusive inverted logical sum (exclusive NOR, EX-NOR) of the signal S11 and the signal S13 and outputs the result. The exclusive-NOR circuit 52F calculates exclusive inverted logical sum of the signal S11 and the signal S12 and outputs the result. The exclusive-NOR circuit 53F calculates exclusive inverted logical sum of the signal S12 and the signal S13 and outputs the result. The exclusive-NOR circuit 54F calculates exclusive inverted logical sum of the signal S14 and the signal S16 and outputs the result. The exclusive-NOR circuit 55F calculates exclusive inverted logical sum of the signal S14 and the signal S15 and outputs the result. The exclusive-NOR circuit 56F calculates exclusive inverted logical sum of the signal S15 and the signal S16 and outputs the result.

FIG. 26 illustrates operation of the driver sections DRV1 to DRV3 of the transmitting section 10F in the operation mode M2. As illustrated in FIG. 26, for example, when the signals S11, S12, and S13 are "1", "0", and "1", respectively, the signals S41, S42, and S43 become "1", "0", and "0", respectively, and the signals S51, S52, and S53 become "1", "1", and "0", respectively. Therefore, the driver section DRV1 sets the signal SIG1 to the high level voltage VH because the signals S41 and S51 are "1" and "1", respectively. Moreover, the driver section DRV2 sets the signal SIG2 to the low level voltage VL because the signals S42 and S52 are "0" and "1", respectively. Further, the driver section DRV3 sets the signal SIG3 to the middle level voltage VM because the signal S53 is "0".

FIG. 27 illustrates a configuration example of a transmitting section 10G in another transmitter 1G according to the present modification. The transmitting section 10G includes the NAND circuits 41F to 46F and the exclusive-OR circuits 51E to 52E. Specifically, for example, the transmitting section 10G may be configured by replacing the NAND circuits 41E to 46E with the NAND circuits 41F to 46F in the transmitting section 10E (FIG. 20). In other words, for example, the transmitting section 10G may be configured by replacing the exclusive-NOR circuits 51F to 56F with the exclusive-OR circuits 51E to 56E in the transmitting section 10F (FIG. 25).

FIG. 28 illustrates operation of the driver sections DRV1 to DRV3 of the transmitting section 10G in the operation mode M2. As illustrated in FIG. 28, for example, when the signals S11, S12, and S13 are "0", "0", and "1", respectively, the signals S41, S42, and S43 become "1", "0", and "1", respectively, and the signals S51, S52, and S53 become "1", "1", and "0", respectively. Therefore, the driver section DRV1 sets the signal SIG1 to the high level voltage VH because the signals S41 and S51 are "1" and "1", respectively. Further, the driver section DRV2 sets the signal SIG2 to the low level voltage VL because the signals S42 and S52 are "0" and "1", respectively. Moreover, the driver section DRV3 sets the signal SIG3 to the middle level voltage VM because the signal S53 is "0".

FIG. 29 illustrates a configuration example of another transmitting section 10H in a transmitter 1H according to the present modification. The transmitting section 10H includes NAND circuits 41E to 46E and the exclusive-NOR circuits 51F to 56F. Specifically, for example, the transmitting section 10H may be configured by replacing the exclusive-OR circuits 51E to 56E with the exclusive-NOR circuits 51F to 56F in the transmitting section 10E (FIG. 20). In other words, for example, the transmitting section 10H may be configured by replacing the NAND circuits 41F to 46F with the NAND circuits 41E to 46E in the transmitting section 10F (FIG. 25).

FIG. 30 illustrates operation of the driver sections DRV1 to DRV3 of the transmitting section 10H in the operation mode M2. As illustrated in FIG. 30, for example, when the signals S11, S12, and S13 are "0", "1", and "0", respectively, the signals S41, S42, and S43 become "1", "0", and "0", respectively, and the signals S51, S52, and S53 become "1", "1", and "0", respectively. Therefore, the driver section DRV1 sets the signal SIG1 to the high level voltage VH because the signals S41 and S51 are "1" and "1", respectively. In addition, the driver section DRV2 sets the signal SIG2 to the low level voltage VL because the signals S42 and S52 are "0" and "1", respectively. Further, the driver section DRV3 sets the signal SIG3 to the middle level voltage VM because the signal S53 is "0".

(Modification 1-6)

In the above-described embodiment, the flip-flops 31 to 36 are provided; however, the configuration is not limited thereto. For example, when the shift of the timings between the signals is sufficiently small, these flip-flops 31 to 36 may be omitted. Moreover, for example, flip-flops may be further provided to suppress shift of the timings between the signals.

(Other Modification)

Further, two or more of the modifications may be combined.

2. Second Embodiment

Next, a transmitter 2 according to a second embodiment is described. In the present embodiment, the middle level voltage VM is generated by so-called Thevenin termination. Incidentally, like numerals are used to designate substantially like components of the transmitter 1 according to the above-described first embodiment, and the description thereof is appropriately omitted.

As illustrated in FIG. 1, the transmitter 2 includes a transmitting section 70. The transmitting section 70 generates the signals SIG1 to SIG6 based on the parallel signals DATA1 to DATA6 and the mode selection signal MSEL, and outputs the signals SIG1 to SIG6 from the output terminals Tout1 to Tout6, respectively, similarly to the transmitting section 10 according to the first embodiment.

FIG. 31 illustrates a configuration example of the transmitting section 70. The transmitting section 70 includes NOT circuits 211 to 216, selectors 221 to 226, flip-flops (F/F) 231 to 236, selectors 237 to 239 and 241 to 246, driver sections DRV11 to DRV16, and a control section 220, in addition to the serializers SER1 to SER6.

The NOT circuit 211 inverts the signal S11 and outputs the inverted signal. The NOT circuit 212 inverts the signal S12 and outputs the inverted signal. The NOT circuit 213 inverts the signal S13 and outputs the inverted signal. The NOT circuit 214 inverts the signal S14 and outputs the inverted signal. The NOT circuit 215 inverts the signal S15 and outputs the inverted signal. The NOT circuit 216 inverts the signal S16 and outputs the inverted signal.

The selector 221 selects and outputs one of the signal S13 and the output signal of the NOT circuit 211 based on a control signal MB. The selector 222 selects and outputs one of the signal S11 and the output signal of the NOT circuit 212 based on the control signal MB. The selector 223 selects and outputs one of the signal S12 and the output signal of the NOT circuit 213 based on the control signal MB. The selector 224 selects and outputs one of the signal S16 and the output signal of the NOT circuit 214 based on the control signal MB. The selector 225 selects and outputs one of the signal S14 and the output signal of the NOT circuit 215 based on the control signal MB. The selector 226 selects and outputs one of the signal S15 and the output signal of the NOT circuit 216 based on the control signal MB.

The flip-flop 231 samples the output signal of the selector 221 based on the clock signal CLK1 and outputs the result as a signal P221 and an inverted signal N221 of the signal P221, as well as samples the signal S11 based on the clock signal CLK1 and outputs the result as a signal P231 and an inverted signal N231 of the signal P231. The flip-flop 232 samples the output signal of the selector 222 based on the clock signal CLK2 and outputs the result as a signal P222 and an inverted signal N222 of the signal P222, as well as samples the signal S12 based on the clock signal CLK2 and outputs the result as a signal P232 and an inverted signal N232 of the signal P232. The flip-flop 233 samples the output signal of the selector 223 based on the clock signal CLK1 and outputs the result as a signal P223 and an inverted signal N223 of the signal P223, as well as samples the signal S13 based on the clock signal CLK1 and outputs the result as a signal P233 and an inverted signal N233 of the signal P233. The flip-flop 234 samples the output signal of the selector 224 based on the clock signal CLK2 and outputs the result as a signal P224 and an inverted signal N224 of the signal P224, as well as samples the signal S14 based on the clock signal CLK2 and outputs the result as a signal P234 and an inverted signal N234 of the signal P234. The flip-flop 235 samples the output signal of the selector 225 based on the clock signal CLK1 and outputs the result as a signal P225 and an inverted signal N225 of the signal P225, as well as samples the signal S15 based on the clock signal CLK1 and outputs the result as a signal P235 and an inverted signal N235 of the signal P235. The flip-flop 236 samples the output signal of the selector 226 based on the clock signal CLK2 and outputs the result as a signal P226 and an inverted signal N226 of the signal P226, as well as samples the signal S16 based on the clock signal CLK2 and outputs the result as a signal P236 and an inverted signal N236 of the signal P236.

The selector 237 selects and outputs one pair of the signals P222 and P232 and the signals N222 and N232 based on the control signal SINV. The selector 238 selects and outputs one pair of the signals P224 and P234 and the signals N224 and N234 based on the control signal SINV. The selector 239 selects and outputs one pair of the signals P226 and P236 and the signals N226 and N236 based on the control signal SINV.

The selector 241 selects one pair of the signals P221 and P231 and the signals P222 and P232 based on the control signal SEL1, and outputs the selected signals as signals S241 and S251. The selector 242 selects one pair of the signals N221 and N231 and the two output signals of the selector 237 based on the control signal SEL2, and outputs the selected signals as signals S242 and S252. The selector 243 selects one pair of the signals P223 and P233 and the signals P224 and P234 based on the control signal SEL1, and outputs the selected signals as signals S243 and S253. The selector 244 selects one pair of the signals N223 and N233 and the two output signals of the selector 238 based on the control signal SEL2, and outputs the selected signals as signals S244 and S254. The selector 245 selects one pair of the signals P225 and P235 and the signals P226 and P236 based on the control signal SEL1, and outputs the selected signals as signals S245 and S255. The selector 246 selects one pair of the signals N225 and N235 and the two output signals of the selector 239 based on the control signal SEL2, and outputs the selected signals as signals S246 and S256.

The driver section DRV11 generates the signal SIG1 based on the signals S241 and S251. The driver section DRV12 generates the signal SIG2 based on the signals S242 and S252. The driver section DRV13 generates the signal SIG3 based on the signals S243 and S253. The driver section DRV14 generates the signal SIG4 based on the signals S244 and S254. The driver section DRV15 generates the signal SIG5 based on the signals S245 and S255. The driver section DRV16 generates the signal SIG6 based on the signals S246 and S256.

FIG. 32 illustrates a configuration example of the driver section DRV11. Incidentally, the driver section DRV11 is described below as an example; however, the same applies to the driver sections DRV12 to DRV16. The driver section DRV11 includes NOT circuits 251 and 262, buffer circuits 252 and 261, transistors 253, 254, 263, and 264, resistors 255 to 257 and 265 to 267.

The NOT circuit 251 inverts the signal S241 and outputs the inverted signal as a signal UP1. The buffer circuit 252 generates and outputs a signal DN1 based on the signal S241. The buffer circuit 261 generates and outputs a signal UP2 based on the signal S251. The NOT circuit 262 inverts the signal S251 and outputs the inverted signal as a signal DN2.

Each of the transistors 253, 254, 263, and 264 is an N-channel MOSFET. A gate of the transistor 253 is connected to an output terminal of the NOT circuit 251, a drain thereof is connected to a first end of the resistor 255, and a source thereof is connected to a drain of the transistor 254 and a first end of the resistor 257. A gate of the transistor 254 is connected to an output terminal of the buffer circuit 252, the drain thereof is connected to the source of the transistor 253 and the first end of the resistor 257, and a source thereof is connected to a first end of the resistor 256. A gate of the transistor 263 is connected to an output terminal of the buffer circuit 261, a drain thereof is connected to a first end of the resistor 265, and a source thereof is connected to a drain of the transistor 264 and a first end of the resistor 267. A gate of the transistor 264 is connected to an output terminal of the buffer circuit 262, the drain thereof is connected to the source of the transistor 263 and the first end of the resistor 267, and a source thereof is connected to a first end of the resistor 266.

The first end of the resistor 255 is connected to the drain of the transistor 253, and a second end thereof is supplied with the voltage V1. The first end of the resistor 256 is connected to the source of the transistor 254, and a second end thereof is grounded. The first end of the resistor 257 is connected to the source of the transistor 253 and the drain of the transistor 254, and a second end thereof is connected to a second end of the resistor 267 and the output terminal Tout1. The first end of the resistor 265 is connected to the drain of the transistor 263, and a second end thereof is supplied with the voltage V1. The first end of the resistor 266 is connected to the source of the transistor 264, and a second end thereof is grounded. The first end of the resistor 267 is connected to the source of the transistor 263 and the drain of the transistor 264, and the second end thereof is connected to the second end of the resistor 257 and the output terminal Tout1. In this example, a sum of the resistance value of the resistor 255, the resistance value of the ON resistance of the transistor 253, and the resistance value of the resistor 257 is about 100 [ohms]. Likewise, a sum of the resistance value of the resistor 256, the resistance value of the ON resistance of the transistor 254, and the resistance value of the resistor 257 is about 100 [ohms] in this example. A sum of the resistance value of the resistor 265, the resistance value of the ON resistance of the transistor 263, and the resistance value of the resistor 267 is about 100 [ohms] in this example. A sum of the resistance value of the resistor 266, the resistance value of the ON resistance of the transistor 264, and the resistance value of the resistor 267 is about 100 [ohms] in this example.

With this configuration, the driver section DRV11 sets the voltage of the output terminal Tout1 to one of the three voltages (the high level voltage VH, the middle level voltage VM, and the low level voltage VL), based on the signal S241 and the signal S251. Specifically, when the signals S241 and S251 are "0" and "1", respectively, the signals UP1 and UP2 both become "1" and the signals DN1 and DN2 both become "0". Accordingly, the transistors 253 and 263 are put into the ON state, the transistors 254 and 264 are put into the OFF state, and the voltage of the terminal Tout1 is set to the high level voltage VH. In addition, when the signals S241 and S251 are "1" and "0", respectively, the signals DN1 and DN2 both become "1" and the signals UP1 and UP2 both become "1". Accordingly, the transistors 254 and 264 are put into the ON state, the transistors 253 and 263 are put into the OFF state, and the voltage of the terminal Tout1 is set to the low level voltage VL. Moreover, when the signals S241 and S251 are "1" and "1", respectively, the signals DN1 and UP2 both become "1" and the signals UP1 and DN2 both become "0". Accordingly, the transistors 254 and 263 are put into the ON state, and the transistors 253 and 264 are put into the OFF state. At this time, in the driver section DRV11, Thevenin termination is realized, and the voltage of the terminal Tout1 is set to the middle level voltage VM. Further, when the signals S241 and S251 are "0" and "0", respectively, the signals UP1 and DN2 both become "1" and the signals DN1 and UP2 both become "0". Accordingly, the transistors 253 and 264 are put into the ON state, and the transistors 254 and 263 are put into the OFF state. At this time, in the driver section DRV11, Thevenin termination is realized, and the voltage of the terminal Tout1 is set to the middle level voltage VM.

In this way, in the driver section DRV11, two of the four transistors 253, 254, 263, and 264 are put into the ON state irrespective of the voltage level of the signal SIG1. Therefore, in the driver section DRV11, the output impedance is allowed to be about 50 [ohms] irrespective of the voltage level of the signal SIG1, which makes it possible to easily achieve impedance matching.

The control section 220 selects one of the three operation modes M1 to M3 based on the mode selection signal MSEL, and controls the transmitting section 70 to operate in the selected operation mode. Specifically, the control section 220 generates the clock signals CLK1 and CLK2 and the control signals SINV, SEL1, SEL2, and MB, according to the selected operation mode, and controls operation of each block of the transmitting section 70 with use of these control signals.

Here, the NOT circuit 211, the selector 221, and the driver section DRV11 correspond to a specific but non-limiting example of "first transmitting section" in the disclosure. The NOT circuit 212, the selector 222, and the driver section DRV12 correspond to a specific but non-limiting example of "second transmitting section" in the disclosure. The NOT circuit 213, the selector 223, and the driver section DRV13 correspond to a specific but non-limiting example of "third transmitting section" in the disclosure. The NOT circuit 211 and the selector 221 correspond to a specific but non-limiting example of "first control circuit" in the disclosure. The NOT circuit 212 and the selector 222 correspond to a specific but non-limiting example of "second control circuit" in the disclosure. The driver section DRV11 corresponds to a specific but non-limiting example of "first driver section" in the disclosure, and the driver section DRV12 corresponds to a specific but non-limiting example of "second driver section" in the disclosure.

FIGS. 33A and 33B each illustrate an operation example of the transmitting section 70 in the operation mode M1, where FIG. 33A illustrates one operation state, and FIG. 33B illustrates another operation state. In the operation mode M1, the control section 220 supplies the control signal MB indicating "0" to the selectors 221 to 226 to control the selectors 221 to 226 to select and output the output signals of the NOT circuits 211 to 216, respectively. Then, similarly to the case of the first embodiment (FIGS. 12A and 12B), for example, the control section 220 supplies the control signal SEL1 to the selector 241 to control the selector 241 to alternately select and output the signals P221 and P231 and the signals P222 and N222, as well as supplies the control signal SEL2 to the selector 242 to control the selector 242 to alternately select and output the signals N221 and N231 and the output signals (the signals N222 and N232) of the selector 237.

At this time, for example, in FIG. 33A, since the output signal of the selector 221 and the signal S11 are inverted from each other, the signal P221 and the signal P231 are inverted from each other and the signal N221 and the signal N231 are inverted from each other. Therefore, the driver section DRV11 sets the signal SIG1 to the high level voltage VH or the low level voltage VL because the signal S241 and the signal S251 are inverted from each other, and the driver section DRV12 sets the signal SIG2 to the high level voltage VH or the low level voltage VL because the signal S242 and the signal S252 are inverted from each other. At this time, since the signal P221 and the signal N221 are inverted from each other and the signal P231 and the signal N231 are inverted from each other, the signal S241 and the signal S242 are inverted from each other and the signal S251 and the signal S252 are inverted from each other. Accordingly, the signal SIG2 becomes the low level voltage VL when the signal SIG1 is the high level voltage VH, and the signal SIG2 becomes the high level voltage VH when the signal SIG1 is the low level voltage VL. The same applies to the signals SIG3 to SIG6. Therefore, in the operation mode M1, the transmitter 2 transmits data to the receiver through the differential signals, similarly to the case of the first embodiment (FIGS. 12A and 12B).

FIG. 34 illustrates an operation example of the transmitting section 70 in the operation mode M2. FIG. 35 illustrates operation of the driver sections DRV11 to DRV13 in the operation mode M2. In the operation mode M2, the control section 220 supplies the control signal MB indicating "1" to the selectors 221 to 226, and controls the selector 221 to select and output the signal S13, controls the selector 222 to select and output the signal S11, controls the selector 223 to select and output the signal S12, controls the selector 224 to select and output the signal S16, controls the selector 225 to select and output the signal S14, and controls the selector 226 to select and output the signal S15.

Accordingly, as illustrated in FIG. 35, for example, when the signals S11, S12, and S13 are "1", "0", and "0", respectively, the signals P241 and N241 become "0" and "1", respectively, the signals P242 and N242 become "1" and "0", respectively, and the signals P243 and N243 become "0" and "0", respectively. Therefore, the driver section DRV11 sets the signal SIG1 to the high level voltage VH because the signals P241 and N241 are "0" and "1", respectively. Moreover, the driver section DRV12 sets the signal SIG2 to the low level voltage VL because the signals P242 and N242 are "1" and "0", respectively. Further, the driver section DRV13 sets the signal SIG3 to the middle level voltage VM because the signals P243 and N243 are "0" and "0", respectively. Accordingly, in the operation mode M2, the transmitter 2 transmits data to the receiver through the three-phase signals, similarly to the case of the first embodiment (FIG. 14).

FIG. 36 illustrates an operation example of the transmitting section 70 in the operation mode M3. In the operation mode M3, the control section 220 supplies the control signal MB indicating "0" to the selectors 221 to 226, and controls the selectors 221 to 226 to select and output the output signals of the NOT circuits 211 to 216, respectively, similarly to the case in the operation mode M1. As a result, for example, the signal P241 and the signal N241 are inverted from each other, and the driver section DRV11 sets the signal SIG1 to the high level voltage VH or the low level voltage VL. The same applies to the signals SIG2 to SIG6. Therefore, in the operation mode M3, the transmitter 2 transmits data to the receiver through the single-phase signals, similarly to the case of the first embodiment (FIG. 16).

As described above, in the transmitter 2, two of the four transistors 253, 254, 263, and 264 are put into the ON state irrespective of the voltage levels of the respective signals SIG1 to SIG6. Specifically, for example, the two transistors 253 and 263 are put into the ON state in order to generate the high level voltage VH, the two transistors 254 and 264 are put into the ON state in order to generate the low level voltage VL, and the two transistors 253 and 264 or the two transistors 254 and 263 are put into the ON state in order to generate the middle level voltage VM. As a result, in the transmitter 2, it is possible to easily achieve impedance matching and to reduce possibility that the waveforms of the respective signals SIG1 to SIG6 are disturbed, which makes it possible to enhance communication quality.

In addition, in the transmitter 2, the two transistors are put into the ON state to generate the middle level voltage VM by Thevenin termination. Therefore, the signals SIG1 to SIG6 are allowed to transit faster, for example, as compared with the case where both of the two transistors 63 and 64 in the driver section are put into the OFF state to generate the middle level voltage VM, as with the transmitter 1 according to the first embodiment. Accordingly, in the transmitter 2, eye is allowed to be expanded and jitter is allowed to be reduced, which makes it possible to enhance communication quality.

As described above, in the present embodiment, two of the four transistors are put into the ON state irrespective of the voltage levels of the respective signals SIG1 to SIG6, which makes it possible to enhance communication quality.

(Modification 2-1)

In the above-described embodiment, the NOT circuits 211 to 216 and the selectors 221 to 226 are provided between the serializers SER1 to SER6 and the flip-flops 231 to 236;

however, the configuration is not limited thereto. The present modification will be described below in detail by giving an example.

FIG. 37 illustrates a configuration example of a transmitting section 70A in a transmitter 2A according to the present modification. The transmitting section 70A includes encoders 261 to 266. An input terminal In1 of the encoder 261 is supplied with the signal S13, an input terminal In2 thereof is supplied with the signal S11, an input terminal M thereof is supplied with the control signal MB, and output terminals Out1 and Out2 thereof are respectively connected to two input terminals of the flip-flop 231. An input terminal In1 of the encoder 262 is supplied with the signal S11, an input terminal In2 thereof is supplied with the signal S12, an input terminal M thereof is supplied with the control signal MB, and output terminals Out1 and Out2 thereof are respectively connected to two input terminals of the flip-flop 232. An input terminal In1 of the encoder 263 is supplied with the signal S12, an input terminal In2 thereof is supplied with the signal S13, an input terminal M thereof is supplied with the control signal MB, and output terminals Out1 and Out2 thereof are respectively connected to two input terminals of the flip-flop 233. An input terminal In1 of the encoder 264 is supplied with the signal S16, an input terminal In2 thereof is supplied with the signal S14, an input terminal M thereof is supplied with the control signal MB, and output terminals Out1 and Out2 thereof are respectively connected to two input terminals of the flip-flop 234. An input terminal In1 of the encoder 265 is supplied with the signal S14, an input terminal In2 thereof is supplied with the signal S15, an input terminal M thereof is supplied with the control signal MB, and output terminals Out1 and Out2 thereof are respectively connected to two input terminals of the flip-flop 235. An input terminal In1 of the encoder 266 is supplied with the signal S15, an input terminal In2 thereof is supplied with the signal S16, an input terminal M thereof is supplied with the control signal MB, and output terminals Out1 and Out2 thereof are respectively connected to two input terminals of the flip-flop 236. Here, the control signal MB becomes "0" in the operation modes M1 and M3, and becomes "1" in the operation mode M2 (in a mode in which data is transmitted through the three-phase signals).

FIG. 38 illustrates a configuration example of the encoder 261. FIG. 39 illustrates a truth table of the encoder 261. Incidentally, the encoder 261 is described below as an example; however, the same applies to the encoders 262 to 266. The encoder 261 includes NAND circuits 271 to 273 and AND circuits 274 and 275. The NAND circuit 271 calculates inverted logical product of the inverted signal of a signal SI1 (the signal S13 in the case of the encoder 261) input to the input terminal In1, and the control signal MB input to the input terminal M. The NAND circuit 272 calculates inverted logical product of the output signal of the NAND circuit 271 and a signal SI2 (the signal S11 in the case of the encoder 261) input to the input terminal In2. The NAND circuit 273 calculates inverted logical product of the output signal of the NAND circuit 271, the control signal MB, and the signal SI2. The AND circuit 274 calculates logical product of the output signal of the NAND circuit 271 and the output signal of the NAND circuit 272, and outputs the calculated logical product as a signal SO1 from the output terminal Out1. The AND circuit 275 calculates logical product of the output signal of the NAND circuit 273 and the signal SI2, and outputs the calculated logical product as a signal SO2 from the output terminal Out2.

FIG. 40 illustrates operation of the driver sections DRV11 to DRV13 in the operation mode M2. For example, when the signals S11, S12, and S13 are "1", "0", and "0", respectively, the signals S241 and S251 become "0" and "1", respectively, the signals S242 and S252 become "1" and "0", respectively, and the signals S243 and S253 become "0" and "0", respectively. Therefore, for example, the driver section DRV13 sets the signal SIG3 to the middle level voltage VM because the signals S243 and S253 are "0" and "0", respectively.

In this way, in the transmitting section 70A, for example, the signal SGI1 is set to the high level voltage VH by making the signals S241 and S251 into "0" and "1", respectively, the signal SIG1 is set to the low level voltage VL by making the signals S241 and S251 into "1" and "0", respectively, and the signal SIG1 is set to the middle level voltage VM by making the signals S241 and S251 into "0" and "0", respectively. As a result, in the transmitting section 70A, to generate the middle level voltage VM, two transistors 253 and 264 of the four transistors 253, 254, 263, and 264 of the driver section DRV21 are put into the ON state. Specifically, for example, in the transmitting section 70 according to the above-described embodiment, to generate the middle level voltage VM, the two transistors 253 and 264 or the two transistors 254 and 263 are put into the ON state. On the other hand, in the transmitting section 70A according to the present modification, the two transistors 253 and 254 are constantly put into the ON state. Accordingly, in the transmitting section 70A, for example, it is possible to reduce possibility that the middle level voltage VM is varied due to the fact that the transistors to be put into the ON state are changed, and thus communication quality is allowed to be enhanced.

(Modification 2-2)

Further, the circuit configuration is not limited to those described above, and various circuit configurations may be employed. The present modification will be described in detail below by giving an example.

FIG. 41 illustrates a configuration example of a transmitting section 70B in a transmitter 2B according to the present modification. The transmitting section 70B includes encoders 411 to 416, selectors 421 to 426, flip-flops (F/Fs) 431 to 436, selectors 437 to 439 and 441 to 446, and driver sections DRV21 to DRV26.

An input terminal In1 of the encoder 411 is supplied with the signal S11, an input terminal In2 thereof is supplied with the signal S13, an output terminal Out1 thereof is connected to the selector 421, and output terminals Out2 to Out4 thereof are connected to the flip-flop 431. An input terminal In1 of the encoder 412 is supplied with the signal S12, an input terminal In2 thereof is supplied with the signal S11, an output terminal Out1 thereof is connected to the selector 422, and output terminals Out2 to Out4 thereof are connected to the flip-flop 432. An input terminal In1 of the encoder 413 is supplied with the signal S13, an input terminal In2 thereof is supplied with the signal S12, an output terminal Out1 thereof is connected to the selector 423, and output terminals Out2 to Out4 thereof are connected to the flip-flop 433. An input terminal In1 of the encoder 414 is supplied with the signal S14, an input terminal In2 thereof is supplied with the signal S16, an output terminal Out1 thereof is connected to the selector 424, and output terminals Out2 to Out4 thereof are connected to the flip-flop 434. An input terminal In1 of the encoder 415 is supplied with the signal S15, an input terminal In2 thereof is supplied with the signal S14, an output terminal Out1 thereof is connected to the selector 425, and output terminals Out2 to Out4 thereof are connected to the flip-flop 435. An input terminal In1 of the encoder 416 is supplied with the signal S16, an input terminal In2 thereof is supplied with the signal S15, an output terminal Out1 thereof is connected to the selector 426, and output terminals Out2 to Out4 thereof are connected to the flip-flop 436.

FIG. 42 illustrates a configuration example of the encoder 411. FIG. 43 illustrates a truth table of the encoder 411. Incidentally, the encoder 411 is described below as an example; however, the same applies to the encoders 412 to 416. The encoder 411 includes NAND circuits 471 to 473 and NOR circuits 474 to 476. The NAND circuit 471 calculates inverted logical product of the signal SI1 input to the input terminal In1 and the signal SI2 input to the input terminal In2. The NAND circuit 472 calculates inverted logical product of the signal SI2 and the output signal of the NAND circuit 471, and outputs the calculated inverted logical product as the signal SO1 from the output terminal Out1. The NAND circuit 473 calculates inverted logical product of the signal SI1 and the output signal of the NAND circuit 471, and outputs the calculated inverted logical product as the signal SO2 from the output terminal Out2. The NOR circuit 474 calculates inverted logical sum of the signal SI1 and the signal SI2. The NOR circuit 475 calculates inverted logical sum of the signal SI2 and the output signal of the NOR circuit 474, and outputs the calculated inverted logical sum as a signal SO3 from the output terminal Out3. The NOR circuit 476 calculates inverted logical sum of the signal SI1 and the output signal of the NOR circuit 474, and outputs the calculated inverted logical sum as a signal SO4 from the output terminal Out4.

The selector 421 selects and outputs one of the signal S11 and the signal output from the output terminal Out1 of the encoder 411, based on the control signal MB. The selector 422 selects and outputs one of the signal S12 and the signal output from the output terminal Out1 of the encoder 412, based on the control signal MB. The selector 423 selects and outputs one of the signal S13 and the signal output from the output terminal Out1 of the encoder 413, based on the control signal MB. The selector 424 selects and outputs one of the signal S14 and the signal output from the output terminal Out1 of the encoder 414, based on the control signal MB. The selector 425 selects and outputs one of the signal S15 and the signal output from the output terminal Out1 of the encoder 415, based on the control signal MB. The selector 426 selects and outputs one of the signal S16 and the signal output from the output terminal Out1 of the encoder 416, based on the control signal MB. Here, the control signal MB becomes "0" in the operation modes M1 and M3, and becomes "1" in the operation mode M2 (in the mode in which data is transmitted through the three-phase signals).

The flip-flop 431 samples the output signal of the selector 421 based on the clock signal CLK1 and outputs the result as a signal P431 and an inverted signal N431 of the signal P431, as well as samples the three output signals output from the respective output terminals Out2 to Out4 of the encoder 411 based on the clock signal CLK1 and outputs the results as signals S451, S461, and S471. The flip-flop 432 samples the output signal of the selector 422 based on the clock signal CLK2 and outputs the result as a signal P432 and an inverted signal N432 of the signal P432, as well as samples the three output signals output from the respective output terminals Out2 to Out4 of the encoder 412 based on the clock signal CLK2 and outputs the results as signals S452, S462, and S472. The flip-flop 433 samples the output signal of the selector 423 based on the clock signal CLK1 and outputs the result as a signal P433 and an inverted signal N433 of the signal P433, as well as samples the three output signals output from the respective output terminals Out2 to Out4 of the encoder 413 based on the clock signal CLK1 and outputs the results as signals S453, S463, and S473. The flip-flop 434 samples the output signal of the selector 424 based on the clock signal CLK2 and outputs the result as a signal P434 and an inverted signal N434 of the signal P434, as well as samples the three output signals output from the respective output terminals Out2 to Out4 of the encoder 414 based on the clock signal CLK2 and outputs the results as signals S454, S464, and S474. The flip-flop 435 samples the output signal of the selector 425 based on the clock signal CLK1 and outputs the result as a signal P435 and an inverted signal N435 of the signal P435, as well as samples the three output signals output from the respective output terminals Out2 to Out4 of the encoder 415 based on the clock signal CLK1 and outputs the results as signals S455, S465, and S475. The flip-flop 436 samples the output signal of the selector 426 based on the clock signal CLK2 and outputs the result as a signal P436 and an inverted signal N436 of the signal P436, as well as samples the three output signals output from the respective output terminals Out2 to Out4 of the encoder 416 based on the clock signal CLK2 and outputs the results as signals S456, S466, and S476.

The selector 437 selects and outputs one of the signals P432 and N432 based on the control signal SINV. The selector 438 selects and outputs one of the signals P434 and N434 based on the control signal SINV, and the selector 439 selects and outputs one of the signals P436 and N436 based on the control signal SINV.

The selector 441 selects one of the signals P431 and P432 based on the control signal SEL1, and outputs the selected signal as a signal S441. The selector 442 selects one of the signal N431 and the output signal of the selector 437 based on the control signal SEL2, and outputs the selected signal as a signal S442. The selector 443 selects one of the signals P433 and P434 based on the control signal SEL1, and outputs the selected signal as a signal S443. The selector 444 selects one of the signal N433 and the output signal of the selector 438 based on the control signal SEL2, and outputs the selected signal as a signal S444. The selector 445 selects one of the signals P435 and P436 based on the control signal SEL1, and outputs the selected signal as a signal S445. The selector 446 selects one of the signal N435 and the output signal of the selector 439 based on the control signal SEL2, and outputs the selected signal as a signal S446.

The driver section DRV21 generates the signal SIG1 based on the signals S441, S451, S461, and S471 and the control signal MB. The driver section DRV22 generates the signal SIG2 based on the signals S442, S452, S462, and S472 and the control signal MB. The driver section DRV23 generates the signal SIG3 based on the signals S443, S453, S463, and S473 and the control signal MB. The driver section DRV24 generates the signal SIG4 based on the signals S444, S454, S464, and S474 and the control signal MB. The driver section DRV25 generates the signal SIG5 based on the signals S445, S455, S465, and S475 and the control signal MB. The driver section DRV26 generates the signal SIG6 based on the signals S446, S456, S466, and S476 and the control signal MB.

FIG. 44 illustrates a configuration example of the driver section DRV21. Incidentally, the driver section DRV21 is described below as an example; however, the same applies to the driver sections DRV22 to DRV26. The driver section DRV21 includes a NOT circuit 451, a selector 452, buffer circuits 453 and 454, a NOT circuit 461, selectors 462 and 463, and buffer circuits 464 and 465. The NOT circuit 451 inverts the signal S441 and outputs the inverted signal. The selector 452 selects and outputs one of the signal S451 and the output signal of the NOT circuit 451 based on the control signal MB. The buffer circuit 453 generates the signal UP1 based on the signal S441. The buffer circuit 454 generates the signal DN1 based on the output signal of the selector 452. The NOT circuit 461 inverts the signal S441 and outputs the inverted signal. The selector 462 selects and outputs one of the signals S461 and S441. The selector 463 selects and outputs one of the signal S471 and the output signal of the NOT circuit 461. The buffer circuit 464 generates the signal UP2 based on the output signal of the selector 462. The buffer circuit 465 generates the signal DN2 based on the output signal of the selector 463.

With this configuration, the driver section DRV21 sets the voltage of the output terminal Tout1 to one of the three voltages (the high level voltage VH, the middle level voltage VM, and the low level voltage VL), based on the signals S441, S451, S461, and S471 and the control signal MB.

Specifically, when the control signal MB is "0", the selector 452 selects and outputs the output signal of the NOT circuit 451, the selector 462 selects and outputs the signal S441, and the selector 463 selects and outputs the output signal of the NOT circuit 461. Accordingly, the driver section DRV21 sets the voltage of the output terminal Tout1 to the high level voltage VH or the low level voltage VL, in response to the signal S441. Specifically, when the signal S441 is "1", the signals UP1 and UP2 both become "1" and the signals DN1 and DN2 both become "0". As a result, the transistors 253 and 263 are put into the ON state and the transistors 254 and 264 are put into the OFF state, and the voltage of the terminal Tout1 is set to the high level voltage VH. Further, when the signal S441 is "0", the signals DN1 and DN2 both become "1" and the signals UP1 and UP2 both become "0". As a result, the transistors 254 and 264 are put into the ON state and the transistors 253 and 263 are put into the OFF state, and the voltage of the terminal Tout1 is set to the low level voltage VL.

Moreover, when the control signal MB is "1", the selector 452 selects and outputs the signal S451, the selector 462 selects and outputs the signal S461, and the selector 463 selects and outputs the signal S471. Accordingly, the driver section DRV21 sets the voltage of the output terminal Tout1 to one of the high level voltage VH, the middle level voltage VM, and the low level voltage VL, in response to the signals S441, S451, S461, and S471. Specifically, for example, when the signals S441, S451, S461, and S471 are "1", "0", "1", and "0", respectively, the signals UP1 and UP2 both become "1" and the signals DN1 and DN2 both become "0". Therefore, the transistors 253 and 263 are put into the ON state and the transistors 254 and 264 are put into the OFF state, and the voltage of the terminal Tout1 is set to the high level voltage VH. Further, for example, when the signals S441, S451, S461, and S471 are "0", "1", "0", and "1", respectively, the signals DN1 and DN2 both become "1" and the signals UP1 and UP2 both become "0". Therefore, the transistors 254 and 264 are put into the ON state and the transistors 253 and 263 are put into the OFF state, and the voltage of the terminal Tout1 is set to the low level voltage VL. Moreover, for example, when the signals S441, S451, S461, and S471 are "1", "1", "0", and "0", respectively, the signals UP1 and DN1 both become "1" and the signals UP2 and DN2 both become "0". Therefore, the transistors 253 and 254 are put into the ON state and the transistors 263 and 264 are put into the OFF state. At this time, in the driver section DRV11, Thevenin termination is realized, and the voltage of the terminal Tout1 is set to the middle level voltage VM.

FIGS. 45A and 45B each illustrate an operation example of the transmitting section 70B in the operation mode M1, where FIG. 45A illustrates one operation state, and FIG. 45B illustrates another operation state. In the operation mode M1, the control section 220 supplies the control signal MB indicating "0" to the selectors 421 to 426, and controls the selectors 421 to 426 to select and output the signals S11 to S16, respectively. Then, similarly to the case of the first embodiment (FIGS. 12A and 12B), the control section 220 supplies the control signal SEL1 to the selector 441 and controls the selector 441 to alternately select and output the signals P431 and P432, as well as supplies the control signal SEL2 to the selector 442 and controls the selector 442 to alternately select and output the signal N431 and the output signal (the signal N432) of the selector 437. Further, the control section 220 supplies the control signal MB indicating "0" to the driver sections DRV21 to DRV26, and controls, for example, the driver section DRV21 to generate the signal SIG1 based on the signal S441 and the driver section DRV22 to generate the signal SIG2 based on the signal S442. As a result, in the operation mode M1, the transmitter 2B transmits data to the receiver through the differential signals, similarly to the case of the first embodiment (FIGS. 12A and 12B).

FIG. 46 illustrates an operation example of the transmitting section 70B in the operation mode M2. FIG. 47 illustrates operation of the driver sections DRV21 to DRV23 in the operation mode M2. In the operation mode M2, the control section 220 supplies the control signal MB indicating "1" to the selectors 421 to 426, and controls the selectors 421 to 426 to select and output the output signals of the output terminals Out1 of the encoders 411 to 416, respectively. Then, the control section 220 supplies the control signal MB indicating "1" to the driver sections DRV21 to DRV26, and may control, for example, the driver section DRV21 to generate the signal SIG1 based on the signals S441, S451, S461, and S471.

As a result, as illustrated in FIG. 47, for example, when the signals S11, S12, and S13, are "1", "0", and "0", respectively, the signals S441, S451, S461, and S471 become "1", "0", "1", and "0", respectively, the signals S442, S452, S462, and S472 become "0", "1", "0", and "1", respectively, and the signals S443, S453, S463, and S473 become "1", "1", "0", and "0", respectively. Therefore, the driver section DRV21 sets the signal SIG1 to the high level voltage VH because the signals S441, S451, S461, and S471 are "1", "0", "1", and "0", respectively. Further, the driver section DRV22 sets the signal SIG2 to the low level voltage VL because the signals S442, S452, S462, and S472 are "0", "1", "0", and "1", respectively. Moreover, the driver section DRV23 sets the signal SIG3 to the middle level voltage VM because the signals S443, S453, S463, and S473 are "1", "1", "0", and "0", respectively. Accordingly, in the operation mode M2, the transmitter 2B transmits data to the receiver through the three-phase signals, similarly to the case of the first embodiment (FIG. 14).

FIG. 48 illustrates an operation example of the transmitting section 70B in the operation mode M3. In the operation mode M3, the control section 220 supplies the control signal MB indicating "0" to the selectors 421 to 426, and controls the selectors 421 to 426 to select and output the signals S11 to S16, respectively, similarly to the case in the operation mode M1. Then, the control section 220 supplies the control signal MB indicating "0" to the driver sections DRV21 to DRV26, and may control, for example, the driver section DRV21 to generate the signal SIG1 based on the signal S441. As a result, in the operation mode M3, the transmitter 2B transmits data to the receiver through the single-phase signals, similarly to the case of the first embodiment (FIG. 16).

In this way, in the transmitting section 70B, for example, the signal SIG1 is set to the high level voltage VH by making the signals S441, S451, S461, and S471 into "1", "0", "1", and "0", respectively, the signal SIG1 is set to the low level voltage VL by making the signals S441, S451, S461, and S471 into "0", "1", "0", and "1", respectively, and the signal SIG1 is set to the middle level voltage VM by making the signals S441, S451, S461, and S471 into "1", "1", "0", and "0", respectively. Accordingly, in the driver section DRV21, the two transistors 253 and 254 that are connected to each other are put into the ON state, out of the four transistors 253, 254, 263, and 264, in order to generate the middle level voltage VM. Specifically, for example, to generate the middle level voltage VM, the two transistors 253 and 264 that are not connected to each other are put into the ON state in the transmitting section 70A according to the above-described modification 2-1, whereas the two transistors 253 and 254 that are connected to each other are put into the ON state in the transmitting section 70B according to the present modification. As a result, it is possible to reduce possibility that waveforms are disturbed, and thus communication quality is allowed to be enhanced.

3. Application Example

Next, an application example of the transmitter described in any of the above-described embodiments and modifications will be described.

FIG. 49 illustrates an appearance of a smartphone 700 (a multifunctional mobile phone) to which the transmitter according to any of the above-described embodiments and the like is applied. The smartphone 700 is mounted with various devices, and the transmitter according to any of the above-described embodiments and the like is applied to a communication system that exchanges data between the devices.

FIG. 50 illustrates a configuration example of an application processor 710 used in the smartphone 700. The application processor 710 includes a central processing unit (CPU) 711, a memory control section 712, a power control section 713, an external interface 714, a graphics processing unit (GPU) 715, a media processing section 716, a display control section 717, and a mobile industry processor interface (MIPI) 718. The CPU 711, the memory control section 712, the power control section 713, the external interface 714, the GPU 715, the media processing section 716, and the display control section 717 are connected to a system bus 719 in this example, and are allowed to exchange data with one another through the system bus 719.

The CPU 711 processes various information handled in the smartphone 700, according to programs. The memory control section 712 controls a memory 901 that is used when the CPU 711 performs information processing. The power control section 713 controls power source of the smartphone 700.

The external interface 714 is an interface to communicate with external devices, and is connected to a wireless communication section 902 and an image sensor 810 in this example. The wireless communication section 902 performs wireless communication with a base station of mobile phones, and for example, may include a base band section, a radio frequency (RF) front end section, and the like. The image sensor 810 acquires an image, and for example, may include a CMOS sensor.

The GPU 715 performs image processing. The media processing section 716 processes information such as audios, characters, and figures. The display control section 717 controls a display 904 through the MIPI interface 718. The MIPI interface 718 transmits an image signal to the display 904. As the image signal, for example, a signal of a YUV format, an RGB format, and the like may be used. For example, the transmitter according to any of the above-described embodiments and the like may be applied to the MIPI interface 718.

FIG. 51 illustrates a configuration example of the image sensor 810. The image sensor 810 includes a sensor section 811, an image signal processor (ISP) 812, a joint photographic experts group (JPEG) encoder 813, a CPU 814, a random access memory (RAM) 815, a read only memory (ROM) 816, a power control section 817, an inter-integrated circuit (PC) interface 818, and an MIPI interface 819. These blocks are each connected to a system bus 820 in this example, and are allowed to exchange data with one another through the system bus 820.

The sensor section 811 acquires an image, and for example, may be configured of a CMOS sensor. The ISP 812 performs predetermined processing on the image acquired by the sensor section 811. The JPEG encoder 813 encodes the image processed by the ISP 812 to generate an image of JPEG format. The CPU 814 controls each of the blocks in the image sensor 810 according to programs. The RAM 815 is a memory used when the CPU 814 performs the information processing. The ROM 816 stores therein programs executed by the CPU 814. The power control section 817 controls power source of the image sensor 810. The I$^2$C interface 818 receives a control signal from the application processor 710. Further, although not illustrated, the image sensor 810 also receives a clock signal in addition to the control signal from the application processor 710. Specifically, the image sensor 810 is so configured as to operate based on clock signals of various frequencies. The MIPI interface 819 transmits the image signal to the application processor 710. As the image signal, for example, a signal of the YUV format, the RGB format, and the like may be used. For example, the transmitter according to any of the above-described embodiments and the like may be applied to the MIPI interface 819.

Hereinbefore, although the technology has been described with referring to the embodiments, the modifications, and the application example to the electronic apparatus, the technology is not limited to these embodiments and the like, and various modifications may be made.

For example, in the above-described respective embodiments, the transmitting section generates the six signals SIG1 to SIG6; however, the number of signals is not limited thereto. Alternatively, for example, the transmitting section may generate five or less signals or seven or more signals. An example of a case where the transmitting section generates four signals is illustrated in FIG. 52.

Note that the effects described in the present specification are illustrative and non-limiting. Effects achieved by the technology may be effects other than those described above.

Note that the technology may be configured as follows.

(1) A transmitter that sets voltages of first, second, and third output terminals based on first, second, and third signals, the transmitter comprising:
a first transmitting section configured to set the voltage of the first output terminal based on the first and third signals;
a second transmitting section configured to set the voltage of the second output terminal based on the first and second signals; and a third transmitting section configured to set the voltage of the third output terminal based on the second and third signals.

(2) The transmitter of (1),
wherein the voltages of the first, second, and third output terminals are each set to one of a first voltage value, a second voltage value, and a third voltage value that is between the first and second voltages values.

(3) The transmitter of any of (1) and (2),
wherein the first transmitting section is configured to set the voltage of the first output terminal based on a result of a logical operation between the first and third signals;
the second transmitting section is configured to set the voltage of the second output terminal based on a result of a logical operation between the second and first signals; and
the third transmitting section is configured to set the voltage of the third output terminal based on a result of a logical operation between the third and second signals.

(4) The transmitter of any of (1) through (3),
wherein the first transmitting section is configured such that the result of the logical operation between the first and third signals controls whether the voltage of the first output terminal is set to the third voltage value,
the second transmitting section is configured such that the result of the logical operation between the second and first signals controls whether the voltage of the second output terminal is set to the third voltage value, and
the third transmitting section is configured such that the result of the logical operation between the third and second signals controls whether the voltage of the third output terminal is set to the third voltage value.

(5) The transmitter of any of (1) through (4),
wherein the first transmitting section is configured such that, when the voltage of the first output terminal is not set to the third voltage value, the first signal controls which of the first and second voltage values the voltage of the first output terminal is set to,
the second transmitting section is configured such that, when the voltage of the second output terminal is not set to the third voltage value, the second signal controls which of the first and second voltage values the voltage of the second output terminal is set to, and
the third transmitting section is configured such that, when the voltage of the third output terminal is not set to the third voltage value, the third signal controls which of the first and second voltage values the voltage of the third output terminal is set to.

(6) The transmitter of any of (1) through (5),
wherein the first transmitting section is configured to set the voltage of the first output terminal to the third voltage value when the first and third signals are equal;
the second transmitting section is configured to set the voltage of the second output terminal to the third voltage value when the first and second signals are equal; and
the third transmitting section is configured to set the voltage of the third output terminal to the third voltage value when the second and third signals are equal.

(7) The transmitter of any of (1) through (6),
wherein the first transmitting section is configured to set the voltage of the first output terminal to the third voltage value when the first signal indicates a first logical value and the third signal indicates a second logical value;
the second transmitting section is configured to set the voltage of the second output terminal to the third voltage value when the second signal indicates the first logical value and first signal indicates the second logical value; and the third transmitting section is configured to set the voltage of the third output terminal to the third voltage value when the third signal indicates the first logical value and the second signal indicates the second logical value.

(8) The transmitter of any of (1) through (7),
wherein the first transmitting section includes:
a first control circuit configured to generate a first control signal based on the first and third signals; and
a first driver section configured to set the voltage of the first output terminal to the third voltage value when the first control signal is active,
the second transmitting section includes:
a second control circuit configured to generate a second control signal based on the first and second signals; and
a second driver section configured to set the voltage of the second output terminal to the third voltage value when the second control signal is active, and
the third transmitting section includes:
a third control circuit configured to generate a third control signal based on the second and third signals; and
a third driver section configured to set the voltage of the third output terminal to the third voltage value when the third control signal is active.

(9) The transmitter of any of (1) through (8),
wherein the first driver section is configured to, when the first control signal is inactive, set the voltage of the first output terminal to one of the first and second voltage values based on the first signal,
the second driver section is configured to, when the second control signal is inactive, set the voltage of the second output terminal to one of the first and second voltage values based on the second signal, and
the third driver section is configured to, when the third control signal is inactive, set the voltage of the third output terminal to one of the first and second voltage values based on the third signal.

(10) The transmitter of any of (1) through (11),
wherein the first driver section is configured to, when the first control signal is inactive, set the voltage of the first output terminal to one of the first and second voltage values based on the first signal and the third signal,
the second driver section is configured to, when the second control signal is inactive, set the voltage of the second output terminal to one of the first and second voltage values based on the second signal and the first signal, and
the third driver section is configured to, when the third control signal is inactive, set the voltage of the third output terminal to one of the first and second voltage values based on the third signal and the second signal.

(11) The transmitter of any of (1) through (10),
wherein the first driver section is configured to, when the first control signal is inactive, set the voltage of the first output terminal to one of the first and second voltage values based on whether the first signal and the third signal are equal,
the second driver section is configured to, when the second control signal is inactive, set the voltage of the second output terminal to one of the first and second voltage values based on whether the second signal and the first signal are equal, and
the third driver section is configured to, when the third control signal is inactive, set the voltage of the third output terminal to one of the first and second voltage values based on whether the third signal and the second signal are equal.

(12) The transmitter of any of (1) through (11),
wherein each of the first, second, and third driver sections includes:

a first switch in a signal path between a first power source and an output node; and
a second switch in a signal path between a second power source and the output node, wherein each of the first second, and third driver sections is configured to:
set the output node thereof to the first voltage value by closing the first switch and opening the second switch;
set the output node thereof to the second voltage value by opening the first switch and closing the second switch; and
set the output node thereof to the third voltage value by opening both the first switch and the second switch.

(13) The transmitter of any of (1) through (12), wherein the first transmitting section includes:
a first driver section configured to set the voltage of the first output terminal, and
a first control circuit configured to control the first driver section such that the voltage of the first output terminal is set to the third voltage value when the first and third signals are equal, and
the voltage of the first output terminal is set to one of the first and second voltage values based on the first signal when the first and third signals are different, the second transmitting section includes:
a second driver section configured to set the voltage of the second output terminal, and
a second control circuit configured to control the second driver section such that the voltage of the second output terminal is set to the third voltage value when the first and second signals are equal, and
the voltage of the second output terminal is set to one of the first and second voltage values based on the second signal when the first and second signals are different, and the third transmitting section includes:
a third driver section configured to set the voltage of the third output terminal, and
a third control circuit configured to control the third driver section such that
the voltage of the third output terminal is set to the third voltage value when the third and second signals are equal, and
the voltage of the third output terminal is set to one of the first and second voltage values based on the third signal when the third and second signals are different.

(14) The transmitter of any of (1) through (13), wherein each of the first, second, and third driver sections includes:
a first switch in a first signal path between a first power source and an output node;
a second switch in a second signal path between the first power source and the output node;
a third switch in a third signal path between a second power source and the output node; and
a fourth switch in a fourth signal path between the second power source and the output node, and
wherein each of the first second, and third driver sections is configured to:
set the output node thereof to the first voltage value by closing the first and second switches and opening the third and fourth switches;
set the output node thereof to the second voltage value by opening the first and second switches and closing the third and fourth switches; and
set the output node thereof to the third voltage value by closing one of the first and second switches and closing one of the third and fourth switches.

(15) A transmitter that sets voltages of first, second, and third output terminals based on first, second, and third signals, the transmitter being operable in at least a differential transmission mode and a three-phase transmission mode, the transmitter comprising:
a first transmitting section configured to:
set the voltage of the first output terminal based on the first signal when the transmitter is operating in the differential transmission mode, and
set the voltage of the first output terminal based on the first and third signals when the transmitter is operating in the three-phase transmission mode;
a second transmitting section configured to:
set the voltage of the second output terminal based on the second signal when the transmitter is operating in the differential transmission mode, and set the voltage of the second output terminal based on the first and second signals when the transmitter is operating in the three-phase transmission mode; and
a third transmitting section configured to:
set the voltage of the third output terminal based on the third signal when the transmitter is operating in the differential transmission mode, and
set the voltage of the third output terminal based on the third and second signals when the transmitter is operating in the three-phase transmission mode.

(16) The transmitter of any of (1) through (15), wherein, when the transmitter is operating in the three-phase transmission mode, the voltages of the first, second, and third output terminals are each set to one of a first voltage value, a second voltage value, and a third voltage value that is between the first and second voltages values.

(17) The transmitter of any of (1) through (16), wherein the first transmitting section is configured such that, when the transmitter is operating in the three-phase transmission mode, a result of a comparison between the first and third signals controls whether the voltage of the first output terminal is set to the third voltage value,
the second transmitting section is configured such that, when the transmitter is operating in the three-phase transmission mode, a result of a comparison between the second and first signals controls whether the voltage of the second output terminal is set to the third voltage value, and
the third transmitting section is configured such that, when the transmitter is operating in the three-phase transmission mode, a result of a comparison between the third and second signals controls whether the voltage of the third output terminal is set to the third voltage value.

(18) The transmitter of any of (1) through (17), wherein the first transmitting section is configured such that, when the transmitter is operating in the three-phase transmission mode and the voltage of the first output terminal is not set to the third voltage value, the first signal controls which of the first and second voltage values the voltage of the first output terminal is set to,
the second transmitting section is configured such that, when the transmitter is operating in the three-phase transmission mode and the voltage of the second output terminal is not set to the third voltage value, the second signal controls which of the first and second voltage values the voltage of the second output terminal is set to, and
the third transmitting section is configured such that, when the transmitter is operating in the three-phase transmission mode and the voltage of the third output terminal is not set to the third voltage value, the third signal controls which of the first and second voltage values the voltage of the third output terminal is set to.

(19) A communication system comprising:
a transmitter that sets voltages of first, second, and third output terminals based on first, second, and third signals, the transmitter comprising:
a first transmitting section configured to set the voltage of the first output terminal based on the first and third signals;
a second transmitting section configured to set the voltage of the second output terminal based on the first and second signals; and
a third transmitting section configured to set the voltage of the third output terminal based on the second and third signals; and
a receiver connected to at least one of the first, second, and third, output terminals.

(20) An electronic apparatus comprising:
the communication system of (19),
an image sensor that acquires image data and transmits the image data via the transmitter, and
a processor that receives the image data via the receiver and performs processing on the image data.

(21)
A transmitter including:
a first transmitting section configured to set a voltage of a first output terminal, based on a first signal and a third signal out of the first signal, a second signal, and the third signal; and
a second transmitting section configured to set a voltage of a second output terminal, based on the first signal and the second signal.

(22)
The transmitter according to (21), wherein each of the transmitting sections sets a voltage of the corresponding output terminal to any of a first voltage, a second voltage, and a third voltage between the first voltage and the second voltage.

(23)
The transmitter according to (22), wherein
the first transmitting section sets the voltage of the first output terminal to the third voltage when the first signal is equal to the third signal, and
the second transmitting section sets the voltage of the second output terminal to the third voltage when the first signal is equal to the second signal.

(24)
The transmitter according to (22), wherein
the first transmitting section sets the voltage of the first output terminal to the third voltage when the third signal indicates a predetermined first logic and the first signal indicates a predetermined second logic, and
the second transmitting section sets the voltage of the second output terminal to the third voltage when the first signal indicates the first logic and the second signal indicates the second logic.

(25)
The transmitter according to any one of (22) to (24), wherein
the first transmitting section includes
a first control circuit configured to generate a first control signal, based on the first signal and the third signal, and
a first driver section configured to set the voltage of the first output terminal to the third voltage when the first control signal is active, and
the second transmitting section includes
a second control circuit configured to generate a second control signal, based on the first signal and the second signal, and
a second driver section configured to set the voltage of the second output terminal to the third voltage when the second control signal is active.

(26)
The transmitter according to (25), wherein the first control circuit has a circuit configuration equivalent to a circuit configuration of the second control circuit.

(27)
The transmitter according to (25) or (26), wherein
the first driver section selectively sets the voltage of the first output terminal to one of the first voltage and the second voltage, based on the first signal, when the first control signal is inactive, and
the second driver section selectively sets the voltage of the second output terminal to one of the first voltage and the second voltage, based on the second signal, when the second control signal is inactive.

(28)
The transmitter according to (25) or (26), wherein
the first driver section selectively sets the voltage of the first output terminal to one of the first voltage and the second voltage, based on the first signal and the third signal, when the first control signal is inactive, and
the second driver section selectively sets the voltage of the second output terminal to one of the first voltage and the second voltage, based on the first signal and the second signal, when the second control signal is inactive.

(29)
The transmitter according to (28), wherein
the first driver section selectively sets the voltage of the first output terminal to one of the first voltage and the second voltage, based on whether the first signal is equal to the third signal, and
the second driver section selectively sets the voltage of the second output terminal to one of the first voltage and the second voltage, based on whether the first signal is equal to the second signal.

(30)
The transmitter according to any one of (25) to (29), wherein each of the driver sections includes
a first switch having a first terminal and a second terminal, the first terminal being led to a first power source that generates a voltage corresponding to the first voltage, and the second terminal being led to an output terminal of the driver section, and a second switch having a first terminal and a second terminal, the first terminal being led to a second power source that generates a voltage corresponding to the second voltage, and the second terminal being led to the output terminal of the driver section,
each of the driver sections puts the first switch into an ON state and puts the second switch into an OFF state to set a voltage of the output terminal of the driver section to the first voltage,
each of the driver sections puts the second switch into the ON state and puts the first switch into the OFF state to set the voltage of the output terminal of the driver section to the second voltage, and
each of the driver sections puts the first switch and the second switch into the OFF state to set the voltage of the output terminal of the driver section to the third voltage through one or a plurality of terminating resistors.

(31)
The transmitter according to any one of (22) to (24), wherein the first transmitting section includes
a first driver section configured to set the voltage of the first output terminal, and a first control circuit configured to control the first driver section to set the voltage of the first output terminal to the third voltage when the first signal is equal to the third signal, and to selectively set the voltage of the first output terminal to one of the first voltage and the second voltage, based on the first signal, when the first signal is different from the third signal, and the second transmitting section includes a second driver section configured to set the voltage of the second output terminal, and a second control circuit configured to control the second driver section to set the voltage of the second output terminal to the third voltage when the first signal is equal to the second signal, and to selectively set the voltage of the second output terminal to one of the first voltage and the second voltage, based on the second signal, when the first signal is different from the second signal.

(32)

The transmitter according to (31), wherein each of the driver sections includes a first switch including a first terminal and a second terminal, the first terminal being led to a first power source that generates a voltage corresponding to the first voltage, and the second terminal being led to an output terminal of the driver section, a second switch having a first terminal and a second terminal, the first terminal being led to the first power source, and the second terminal being led to the output terminal of the driver section, a third switch having a first terminal and a second terminal, the first terminal being led to a second power source that generates a voltage corresponding to the second voltage, and the second terminal being led to the output terminal of the driver section, and a fourth switch having a first terminal and a second terminal, the first terminal being led to the second power source, and the second terminal being led to the output terminal of the driver section, each of the driver sections puts the first switch and the second switch into an ON state and puts the third switch and the fourth switch into an OFF state to set a voltage of the output terminal of the driver section to the first voltage, each of the driver sections puts the third switch and the fourth switch into the ON state and puts the first switch and the second switch into the OFF state to set the voltage of the output terminal of the driver section to the second voltage, and each of the driver sections puts one of the first switch and the second switch into the ON state and puts one of the third switch and the fourth switch into the ON state to set the voltage of the output terminal of the driver section to the third voltage.

(33)

The transmitter according to (32), wherein each of the driver sections puts the first switch and the third switch into the ON state to set the voltage of the output terminal of the driver section to the third voltage.

(34)

The transmitter according to (33), wherein a resistance value between the second terminal of the first switch and the second terminal of the third switch is smaller than a resistance value between the second terminal of the first switch and the second terminal of the fourth switch.

(35)

The transmitter according to any one of (21) to (34), wherein a plurality of operation modes including one operation mode are provided, the first transmitting section sets the voltage of the first output terminal, based on the first signal and the third signal, in the one operation mode, and the second transmitting section sets the voltage of the second output terminal, based on the first signal and the second signal, in the one operation mode.

(36)

The transmitter according to any one of (21) to (35), further including a third transmitting section configured to set a voltage of a third output terminal, based on the second signal and the third signal.

(37)

The transmitter according to (36), further including:

a first serializer configured to generate the first signal;

a second serializer configured to generate the second signal; and a third serializer configured to generate the third signal.

(38)

The transmitter according to (37), wherein an arrangement order of the first output terminal, the second output terminal, and the third output terminal is different from an arrangement order of the first serializer, the second serializer, and the third serializer.

(39)

A transmitter including:

a first transmitting section including a first control circuit and a first driver section, the first control circuit being configured to generate a first control signal, based on a first signal and a third signal out of the first signal, a second signal, and the third signal, and the first driver section being configured to set a voltage of a first output terminal to a third voltage when the first control signal is active; and a second transmitting section including a second control circuit and a second driver section, the second control circuit having a circuit configuration same as a circuit configuration of the first control circuit and being configured to generate a second control signal, based on the first signal and the second signal, and the second driver section being configured to set a voltage of a second output terminal to the third voltage when the second control signal is active.

(40)

A transmitter including a unit output section including a first transmitting section, a second transmitting section, and a third transmitting section, the first transmitting section generating and outputting a first value, the second transmitting section generating and outputting a second value, and the third transmitting section generating and outputting a third value, wherein each of the transmitting sections generates the value based on two signals different between the transmitting sections, out of a first signal, a second signal, and a third signal.

(41)

A communication system provided with a transmitter and a receiver, the transmitter including:

a first transmitting section configured to set a voltage of a first output terminal, based on a first signal and a third signal out of the first signal, a second signal, and the third signal; and a second transmitting section configured to set a voltage of a second output terminal, based on the first signal and the second signal.

(42)

The communication system according to (41), wherein the transmitter is an image sensor that acquires and transmits image data, and the receiver is a processor that receives the image data and performs predetermined processing based on the image data.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1, 2 Transmitter
4 to 6 Communication system
9 Processing section
10, 10A, 10B, 10E to 10H, 70, 70A, 70B Transmitting section
20, 220 Control section
20A Clock signal generation section
21 to 26 Exclusive-OR circuit
31 to 36 Flip-flop (F/F)
37 to 39, 41 to 46 Selector
41E to 46E, 41F to 46F NAND circuit
51E to 56E Exclusive-OR circuit
51F to 56F Exclusive-NOR circuit
61E to 66E Selector
51 to 56 OR circuit
61, 62 AND circuit
63, 64 Transistor
65 to 67 Resistor
101 to 106 Transmission line
110, 120, 130 Receiver
111 to 113, 121, 122, 131 to 136 Receiver section
116, 124 to 126, 138 Resistor
117, 127 to 129, 139 Amplifier
211 to 216 NOT circuit
221 to 226 Selector
231 to 236 Flip-flop (F/F)
237 to 239, 241 to 246 Selector
251, 262 NOT circuit
252, 261 Buffer circuit
253, 254, 263, 264 Transistor
255 to 257, 265 to 267 Resistor
271 to 273 NAND circuit
274, 275 AND circuit
411 to 416 Encoder
421 to 426 Selector
431 to 436 Flip-flop (F/F)
437 to 439, 441 to 446 Selector
451, 461 NOT circuit
452, 462, 463 Selector
453, 454, 464, 465 Buffer circuit
471 to 473 NAND circuit
474 to 476 NOR circuit
700 Smartphone
710 Application processor
711 CPU
712 Memory control section
713 Power control section
714 External interface
715 GPU
716 Media processing section
717 Display control section
718 MIPI interface
719 System bus
810 Image sensor
811 Sensor section
812 ISP
813 JPEG encoder
814 CPU
815 RAM
816 ROM
817 Power control section
818 PC interface
819 MIPI interface
820 System bus
901 Memory
902 Wireless communication section
CLK, CLK1, CLK2 Clock signal
SEL1, SEL2, SINV, MA, MB Control signal
DATA1 to DATA6 Parallel signal
DRV1 to DRV6, DRV11 to DRV16, DRV21 to DRV26 Driver section
ESD1 to ESD6 ESD protection circuit
MSEL Mode selection signal
PAD1 to PAD6 Pad
P31 to P36, P221 to P226, P231 to P236, P431 to P436, N31 to N36, N221 to N226, N231 to N236, N431 to N436, S11 to S16, S31 to S36, S41 to S46, S51 to S56, S241 to S246, S251 to S256, S441 to S446, S451 to S456, S461 to S466, S471 to S476, UP, UP1, UP2, DN, DN1, DN2 Signal
SER1 to SER6 Serializer
SIG1 to SIG6 Signal
Tin11, Tin12, Tin21 to Tin23, Tin31 Input terminal
Tout1 to Tout6 Output terminal
VH High level voltage
VL Low level voltage
VM Middle level voltage

The invention claimed is:

1. A transmitter that sets voltages of first, second, and third output terminals based on first, second, and third signals, the transmitter comprising:
a first transmitting section configured to set the voltage of the first output terminal based on the first and third signals;
a second transmitting section configured to set the voltage of the second output terminal based on the first and second signals; and
a third transmitting section configured to set the voltage of the third output terminal based on the second and third signals.

2. The transmitter of claim 1,
wherein the voltages of the first, second, and third output terminals are each set to one of a first voltage value, a second voltage value, and a third voltage value that is between the first and second voltages values.

3. The transmitter of claim 2,
wherein the first transmitting section is configured to set the voltage of the first output terminal based on a result of a logical operation between the first and third signals;
the second transmitting section is configured to set the voltage of the second output terminal based on a result of a logical operation between the second and first signals; and
the third transmitting section is configured to set the voltage of the third output terminal based on a result of a logical operation between the third and second signals.

4. The transmitter of claim 3,
wherein the first transmitting section is configured such that the result of the logical operation between the first and third signals controls whether the voltage of the first output terminal is set to the third voltage value,
the second transmitting section is configured such that the result of the logical operation between the second and first signals controls whether the voltage of the second output terminal is set to the third voltage value, and
the third transmitting section is configured such that the result of the logical operation between the third and second signals controls whether the voltage of the third output terminal is set to the third voltage value.

5. The transmitter of claim 4,
wherein the first transmitting section is configured such that, when the voltage of the first output terminal is not set to the third voltage value, the first signal controls which of the first and second voltage values the voltage of the first output terminal is set to,
the second transmitting section is configured such that, when the voltage of the second output terminal is not set to the third voltage value, the second signal controls which of the first and second voltage values the voltage of the second output terminal is set to, and
the third transmitting section is configured such that, when the voltage of the third output terminal is not set to the third voltage value, the third signal controls which of the first and second voltage values the voltage of the third output terminal is set to.

6. The transmitter of claim 2,
wherein the first transmitting section is configured to set the voltage of the first output terminal to the third voltage value when the first and third signals are equal;
the second transmitting section is configured to set the voltage of the second output terminal to the third voltage value when the first and second signals are equal; and
the third transmitting section is configured to set the voltage of the third output terminal to the third voltage value when the second and third signals are equal.

7. The transmitter of claim 2,
wherein the first transmitting section is configured to set the voltage of the first output terminal to the third voltage value when the first signal indicates a first logical value and the third signal indicates a second logical value;
the second transmitting section is configured to set the voltage of the second output terminal to the third voltage value when the second signal indicates the first logical value and first signal indicates the second logical value; and
the third transmitting section is configured to set the voltage of the third output terminal to the third voltage value when the third signal indicates the first logical value and the second signal indicates the second logical value.

8. The transmitter of claim 2,
wherein the first transmitting section includes:
a first control circuit configured to generate a first control signal based on the first and third signals; and
a first driver section configured to set the voltage of the first output terminal to the third voltage value when the first control signal is active,
the second transmitting section includes:
a second control circuit configured to generate a second control signal based on the first and second signals; and
a second driver section configured to set the voltage of the second output terminal to the third voltage value when the second control signal is active, and
the third transmitting section includes:
a third control circuit configured to generate a third control signal based on the second and third signals; and
a third driver section configured to set the voltage of the third output terminal to the third voltage value when the third control signal is active.

9. The transmitter of claim 8,
wherein the first driver section is configured to, when the first control signal is inactive, set the voltage of the first output terminal to one of the first and second voltage values based on the first signal,
the second driver section is configured to, when the second control signal is inactive, set the voltage of the second output terminal to one of the first and second voltage values based on the second signal, and
the third driver section is configured to, when the third control signal is inactive, set the voltage of the third output terminal to one of the first and second voltage values based on the third signal.

10. The transmitter of claim 8,
wherein the first driver section is configured to, when the first control signal is inactive, set the voltage of the first output terminal to one of the first and second voltage values based on the first signal and the third signal,
the second driver section is configured to, when the second control signal is inactive, set the voltage of the second output terminal to one of the first and second voltage values based on the second signal and the first signal, and
the third driver section is configured to, when the third control signal is inactive, set the voltage of the third output terminal to one of the first and second voltage values based on the third signal and the second signal.

11. The transmitter of claim 10,
wherein the first driver section is configured to, when the first control signal is inactive, set the voltage of the first output terminal to one of the first and second voltage values based on whether the first signal and the third signal are equal,
the second driver section is configured to, when the second control signal is inactive, set the voltage of the second output terminal to one of the first and second voltage values based on whether the second signal and the first signal are equal, and
the third driver section is configured to, when the third control signal is inactive, set the voltage of the third output terminal to one of the first and second voltage values based on whether the third signal and the second signal are equal.

12. The transmitter of claim 8,
wherein each of the first, second, and third driver sections includes:
a first switch in a signal path between a first power source and an output node; and
a second switch in a signal path between a second power source and the output node,
wherein each of the first second, and third driver sections is configured to:
set the output node thereof to the first voltage value by closing the first switch and opening the second switch;
set the output node thereof to the second voltage value by opening the first switch and closing the second switch; and
set the output node thereof to the third voltage value by opening both the first switch and the second switch.

13. The transmitter of claim 2,
wherein the first transmitting section includes:
a first driver section configured to set the voltage of the first output terminal, and
a first control circuit configured to control the first driver section such that the voltage of the first output terminal is set to the third voltage value when the first and third signals are equal, and the voltage of the first output terminal is set to one of the first and second voltage values based on the first signal when the first and third signals are different, the second transmitting section includes:

a second driver section configured to set the voltage of the second output terminal, and a second control circuit configured to control the second driver section such that the voltage of the second output terminal is set to the third voltage value when the first and second signals are equal, and the voltage of the second output terminal is set to one of the first and second voltage values based on the second signal when the first and second signals are different, and the third transmitting section includes:

a third driver section configured to set the voltage of the third output terminal, and a third control circuit configured to control the third driver section such that the voltage of the third output terminal is set to the third voltage value when the third and second signals are equal, and the voltage of the third output terminal is set to one of the first and second voltage values based on the third signal when the third and second signals are different.

14. The transmitter of claim 13, wherein each of the first, second, and third driver sections includes:

a first switch in a first signal path between a first power source and an output node;

a second switch in a second signal path between the first power source and the output node;

a third switch in a third signal path between a second power source and the output node; and a fourth switch in a fourth signal path between the second power source and the output node, and wherein each of the first second, and third driver sections is configured to:

set the output node thereof to the first voltage value by closing the first and second switches and opening the third and fourth switches;

set the output node thereof to the second voltage value by opening the first and second switches and closing the third and fourth switches; and set the output node thereof to the third voltage value by closing one of the first and second switches and closing one of the third and fourth switches.

15. A transmitter that sets voltages of first, second, and third output terminals based on first, second, and third signals, the transmitter being operable in at least a differential transmission mode and a three-phase transmission mode, the transmitter comprising:

a first transmitting section configured to:

set the voltage of the first output terminal based on the first signal when the transmitter is operating in the differential transmission mode, and set the voltage of the first output terminal based on the first and third signals when the transmitter is operating in the three-phase transmission mode;

a second transmitting section configured to:

set the voltage of the second output terminal based on the second signal when the transmitter is operating in the differential transmission mode, and set the voltage of the second output terminal based on the first and second signals when the transmitter is operating in the three-phase transmission mode; and a third transmitting section configured to:

set the voltage of the third output terminal based on the third signal when the transmitter is operating in the differential transmission mode, and set the voltage of the third output terminal based on the third and second signals when the transmitter is operating in the three-phase transmission mode.

16. The transmitter of claim 15, wherein, when the transmitter is operating in the three-phase transmission mode, the voltages of the first, second, and third output terminals are each set to one of a first voltage value, a second voltage value, and a third voltage value that is between the first and second voltages values.

17. The transmitter of claim 16, wherein the first transmitting section is configured such that, when the transmitter is operating in the three-phase transmission mode, a result of a comparison between the first and third signals controls whether the voltage of the first output terminal is set to the third voltage value, the second transmitting section is configured such that, when the transmitter is operating in the three-phase transmission mode, a result of a comparison between the second and first signals controls whether the voltage of the second output terminal is set to the third voltage value, and the third transmitting section is configured such that, when the transmitter is operating in the three-phase transmission mode, a result of a comparison between the third and second signals controls whether the voltage of the third output terminal is set to the third voltage value.

18. The transmitter of claim 17, wherein the first transmitting section is configured such that, when the transmitter is operating in the three-phase transmission mode and the voltage of the first output terminal is not set to the third voltage value, the first signal controls which of the first and second voltage values the voltage of the first output terminal is set to, the second transmitting section is configured such that, when the transmitter is operating in the three-phase transmission mode and the voltage of the second output terminal is not set to the third voltage value, the second signal controls which of the first and second voltage values the voltage of the second output terminal is set to, and the third transmitting section is configured such that, when the transmitter is operating in the three-phase transmission mode and the voltage of the third output terminal is not set to the third voltage value, the third signal controls which of the first and second voltage values the voltage of the third output terminal is set to.

19. A communication system comprising:

a transmitter that sets voltages of first, second, and third output terminals based on first, second, and third signals, the transmitter comprising:

a first transmitting section configured to set the voltage of the first output terminal based on the first and third signals;

a second transmitting section configured to set the voltage of the second output terminal based on the first and second signals; and a third transmitting section configured to set the voltage of the third output terminal based on the second and third signals; and a receiver connected to at least one of the first, second, and third, output terminals.

20. An electronic apparatus comprising:

the communication system of claim 19, an image sensor that acquires image data and transmits the image data via the transmitter, and a processor that receives the image data via the receiver and performs processing on the image data.

* * * * *